US012545890B2

(12) United States Patent
Rao et al.

(10) Patent No.: US 12,545,890 B2
(45) Date of Patent: Feb. 10, 2026

(54) COMPOSITIONS AND METHODS FOR DERIVATION OF TROPHOBLAST STEM CELLS

(71) Applicant: North Carolina State University, Raleigh, NC (US)

(72) Inventors: Balaji Rao, Raleigh, NC (US); Adam Mischler, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 951 days.

(21) Appl. No.: 17/638,015

(22) PCT Filed: Aug. 28, 2020

(86) PCT No.: PCT/US2020/048441
§ 371 (c)(1),
(2) Date: Feb. 24, 2022

(87) PCT Pub. No.: WO2021/041835
PCT Pub. Date: Mar. 4, 2021

(65) Prior Publication Data
US 2022/0275330 A1      Sep. 1, 2022

Related U.S. Application Data

(60) Provisional application No. 62/894,433, filed on Aug. 30, 2019.

(51) Int. Cl.
*C12N 5/0735* (2010.01)
*C12N 5/08* (2006.01)
*C12Q 1/6869* (2018.01)

(52) U.S. Cl.
CPC ......... *C12N 5/0606* (2013.01); *C12Q 1/6869* (2013.01); *C12N 2501/11* (2013.01); *C12N 2501/117* (2013.01); *C12N 2501/119* (2013.01); *C12N 2501/155* (2013.01); *C12N 2501/16* (2013.01); *C12N 2506/02* (2013.01); *C12N 2506/025* (2013.01)

(58) Field of Classification Search
None
See application file for complete search history.

(56) References Cited

PUBLICATIONS

Chen, Guokai, et al. "Chemically defined conditions for human iPSC derivation and culture." Nature methods 8.5 (2011): 424-429. (Year: 2011).*
Sarkar, Prasenjit, et al. "Activin/nodal signaling switches the terminal fate of human embryonic stem cell-derived trophoblasts." Journal of Biological Chemistry 290.14 (2015): 8834-8848. (Year: 2015).*
Johnstone, Edward D., et al. "Sphingosine-1-phosphate inhibition of placental trophoblast differentiation through a Gi-coupled receptor response." Journal of lipid research 46.9 (2005): 1833-1839. (Year: 2005).*
Epstein, Richard J., Li Jun Tian, and Yan Fei Gu. "2b or not 2b: how opposing FGF receptor splice variants are blocking progress in precision oncology." Journal of Oncology 2021.1 (2021): 9955456. (Year: 2021).*
Okae, Hiroaki, et al. "Derivation of human trophoblast stem cells." Cell stem cell 22.1 (2018): 50-63. (Year: 2018).*
Singh, Ambika T., et al. "Sphingosine-sphingosine-1-phosphate pathway regulates trophoblast differentiation and syncytialization." Reproductive biomedicine online 24.2 (2012): 224-234. (Year: 2012).*
ThermoFisher "DMEM/F-12 product sheet" (Year: 2025).*
Chen et al Supplementary Material. (Year: 2011).*
Bryan, Arielle M., and Maurizio Del Poeta. "Sphingosine-1-phosphate receptors and innate immunity." Cellular microbiology 20.5 (2018): e12836. (Year: 2018).*
ThermoFisher "Essential 6™ Medium product sheet" (Year: 2025).*
International Search Report and Written Opinion for PCT/US20/48441. Mailed Dec. 2, 2020. 9 pages.
Amita et al., Complete and unidirectional conversion of human embryonic stem cells to trophoblast by BMP4. Proc Natl Acad Sci U S A. Mar. 26, 2013;110(13):E1212-21.
Aplin et al., Embryo-epithelium interactions during implantation at a glance. J Cell Sci. Jan. 1, 2017;130(1):15-22.
Benirschke et al., Pathology of the human placenta. Heidelberg: Springer,. 2022. TOC only. 5 pages.
Bernardo et al., BRACHYURY and CDX2 mediate BMP-induced differentiation of human and mouse pluripotent stem cells into embryonic and extraembryonic lineages. Cell Stem Cell. Aug. 5, 2011;9(2):144-55.
Bischof et al., The human cytotrophoblastic cell, a mononuclear chameleon. Int J Biochem Cell Biol. Jan. 2005;37(1):1-16.
Blakeley et al., Defining the three cell lineages of the human blastocyst by single-cell RNA-seq. Development. Sep. 15, 2015;142(18):3151-65.
Brosens et al., Uterine selection of human embryos at implantation. Sci Rep. Feb. 6, 2014;4:3894.
Cha et al., Mechanisms of implantation: strategies for successful pregnancy. Nat Med. Dec. 2012;18(12):1754-67.
Chavatte-Palmer et al., Placentation in different mammalian species. Ann Endocrinol (Paris). Jun. 2016;77(2):67-74.
Chi et al., Glycolysis-Independent Glucose Metabolism Distinguishes TE from ICM Fate during Mammalian Embryogenesis. Dev Cell. Apr. 6, 2020;53(1):9-26.e4.

(Continued)

*Primary Examiner* — Tracy Vivlemore
*Assistant Examiner* — Fatimah Khalaf Matalkah
(74) *Attorney, Agent, or Firm* — Casimir Jones, S.C.; Peter J. Schlueter

(57) ABSTRACT

The present disclosure provides compositions and methods related to the derivation of trophoblast stem cells. In particular, the present disclosure provides novel formulations and methods for deriving and maintaining trophoblast stem cells from human pluripotent stem cells, which can be used for basic research purposes as well as for developing treatments for pregnancy-associated pathologies such as preeclampsia, recurrent loss of pregnancy, placenta accreta, and intrauterine growth restriction.

10 Claims, 25 Drawing Sheets

Specification includes a Sequence Listing.

(56) References Cited

PUBLICATIONS

Choi et al., Transcription factor AP-2γ is a core regulator of tight junction biogenesis and cavity formation during mouse early embryogenesis. Development. Dec. 2012;139(24):4623-32.

Conrad et al., Emerging role for dysregulated decidualization in the genesis of preeclampsia. Placenta. Dec. 2017;60:119-129.

Cornacchia et al., Lipid Deprivation Induces a Stable, Naive-to-Primed Intermediate State of Pluripotency in Human PSCs. Cell Stem Cell. Jul. 3, 2019;25(1):120-136.e10.

Das et al., Effects of fgf2 and oxygen in the bmp4-driven differentiation of trophoblast from human embryonic stem cells. Stem Cell Res. Oct. 2007;1(1):61-74.

Dong et al., Derivation of trophoblast stem cells from naïve human pluripotent stem cells. Elife. Feb. 12, 2020;9:e52504. 26 pages.

Du Toit. Restrictions on fetal tissue research. Nat Rev Microbiol. Aug. 2019;17(8):462. 1 page.

Evans et al., A novel "embryo-endometrial" adhesion model can potentially predict "receptive" or "non-receptive" endometrium. J Assist Reprod Genet. Jan. 2020;37(1):5-16.

Gao et al., Establishment of porcine and human expanded potential stem cells. Nat Cell Biol. Jun. 2019;21(6):687-699.

Garrido-Gomez et al., Defective decidualization during and after severe preeclampsia reveals a possible maternal contribution to the etiology. Proc Natl Acad Sci U S A. Oct. 3, 2017;114(40): E8468-E8477.

Haider et al., Self-Renewing Trophoblast Organoids Recapitulate the Developmental Program of the Early Human Placenta. Stem Cell Reports. Aug. 14, 2018;11(2):537-551.

Hannan et al., Models for study of human embryo implantation: choice of cell lines? Biol Reprod. Feb. 2010;82(2):235-45.

Hemberger et al., ELF5-enforced transcriptional networks define an epigenetically regulated trophoblast stem cell compartment in the human placenta. Hum Mol Genet. Jun. 15, 2010;19(12):2456-67.

Home et al., Altered subcellular localization of transcription factor TEAD4 regulates first mammalian cell lineage commitment. Proc Natl Acad Sci U S A. May 8, 2012;109(19):7362-7.

Horii et al., Human pluripotent stem cells as a model of trophoblast differentiation in both normal development and disease. Proc Natl Acad Sci U S A. Jul. 5, 2016;113(27):E3882-91.

Hsiao et al., Human pluripotent stem cell culture density modulates YAP signaling. Biotechnol J. May 2016;11(5):662-75.

Johnstone et al., Sphingosine-1-phosphate inhibition of placental trophoblast differentiation through a G(i)-coupled receptor response. J Lipid Res. Sep. 2005;46(9):1833-9.

Klaren et al., Identifying Attributes That Influence In Vitro-to-In Vivo Concordance by Comparing In Vitro Tox21 Bioactivity Versus In Vivo DrugMatrix Transcriptomic Responses Across 130 Chemicals. Toxicol Sci. Jan. 1, 2019;167(1):157-171.

Knöfler et al., Human placenta and trophoblast development: key molecular mechanisms and model systems. Cell Mol Life Sci. Sep. 2019;76(18):3479-3496.

Knott et al., Transcriptional regulators of the trophoblast lineage in mammals with hemochorial placentation. Reproduction. Dec. 2014;148(6):R121-36.

Kono et al., Inhibition of RHO-ROCK signaling enhances ICM and suppresses TE characteristics through activation of Hippo signaling in the mouse blastocyst. Dev Biol. Oct. 1, 2014;394(1):142-55.

Krivega et al., WNT3 and membrane-associated β-catenin regulate trophectoderm lineage differentiation in human blastocysts. Mol Hum Reprod. Sep. 2015;21(9):711-22.

Lee et al., Establishment of a novel human embryonic stem cell-derived trophoblastic spheroid implantation model. Hum Reprod. Nov. 2015;30(11):2614-26.

Li et al., Development of trophoblast cystic structures from human induced pluripotent stem cells in limited-area cell culture. Biochem Biophys Res Commun. Nov. 2, 2018;505(3):671-676.

Livak et al., Analysis of relative gene expression data using real-time quantitative PCR and the 2(-Delta Delta C(T)) Method. Methods. Dec. 2001;25(4):402-8.

Love et al., Moderated estimation of fold change and dispersion for RNA-seq data with DESeq2. Genome Biol. 2014;15(12):550.

Maceyka et al., Sphingosine-1-phosphate signaling and its role in disease. Trends Cell Biol. Jan. 2012;22(1):50-60.

Mendelson et al., Sphingosine 1-phosphate signalling. Development. Jan. 2014;141(1):5-9.

Mischler et al., Two Distinct Trophectoderm Lineage Stem Cells from Human Pluripotent Stem Cells. bioRxiv 2019, 762542. 38 pages.

Mischler. A pluipotent stem cell model of human placental development. Dissertatin. North Carolina State University. Mar. 20, 2019. Published online. Https://repository.lib.ncsu.edu/bitstream/handle/1840.20/36980. 200 pages.

Mo et al., Regulation of the Hippo-YAP pathway by protease-activated receptors (PARs). Genes Dev. Oct. 1, 2012;26(19):2138-43.

Moser et al., The art of identification of extravillous trophoblast. Placenta. Feb. 2011;32(2):197-9.

Nishioka et al., Tead4 is required for specification of trophectoderm in pre-implantation mouse embryos. Mech Dev. Mar.-Apr. 2008;125(3-4):270-83.

Nishioka et al., The Hippo signaling pathway components Lats and Yap pattern Tead4 activity to distinguish mouse trophectoderm from inner cell mass. Dev Cell. Mar. 2009;16(3):398-410.

Niwa et al., Interaction between Oct3/4 and Cdx2 determines trophectoderm differentiation. Cell. Dec. 2, 2005;123(5):917-29.

Ohgushi et al., Rho-Signaling-Directed YAP/TAZ Activity Underlies the Long-Term Survival and Expansion of Human Embryonic Stem Cells. Cell Stem Cell. Oct. 1, 2015;17(4):448-61.

Okae et al., Derivation of Human Trophoblast Stem Cells. Cell Stem Cell. Jan. 4, 2018;22(1):50-63.e6.

Pennington et al., Preeclampsia: multiple approaches for a multifactorial disease. Dis Model Mech. Jan. 2012;5(1):9-18.

Petropoulos et al., Single-Cell RNA-Seq Reveals Lineage and X Chromosome Dynamics in Human Preimplantation Embryos. Cell. May 5, 2016;165(4):1012-26.

Rager et al., Review of transcriptomic responses to hexavalent chromium exposure in lung cells supports a role of epigenetic mediators in carcinogenesis. Toxicol Lett. May 1, 2019;305:40-50.

Ralston et al., Gata3 regulates trophoblast development downstream of Tead4 and in parallel to Cdx2. Development. Feb. 2010;137(3):395-403.

R-core. 2019. prcomp function | R Documentation. Retrieved from the internet Jun. 28, 2022. 5 pages.

Roberts et al., Differentiation of trophoblast cells from human embryonic stem cells: to be or not to be? Reproduction. Apr. 10, 2014;147(5):D1-12.

Roberts et al., Specification of trophoblast from embryonic stem cells exposed to BMP4. Biol Reprod. Jul. 1, 2018;99(1):212-224.

Romani et al., S1P promotes migration, differentiation and immune regulatory activity in amniotic-fluid derived stem cells. European Journal of Pharmacology. 2018. vol. 833. pp. 173-182.

Sarkar et al., Activin/nodal signaling switches the terminal fate of human embryonic stem cell-derived trophoblasts. J Biol Chem. Apr. 3, 2015;290(14):8834-48.

Sarkar et al., Identification of Epigenetic Factor Proteins Expressed in Human Embryonic Stem Cell-Derived Trophoblasts and in Human Placental Trophoblasts. J Proteome Res. Aug. 5, 2016;15(8):2433-44.

Sheridan et al., Early onset preeclampsia in a model for human placental trophoblast. Proc Natl Acad Sci U S A. Mar. 5, 2019;116(10):4336-4345.

Storey. The positive false discovery rate: a Bayesian interpretation and the q-value. Ann Stat. 2003; 31:2013-2035.

The Broad Institute. 2019. GSEA | MSigDB | MSigDB Collections. Retrieved from the internet Jun. 28, 2022. 4 pages.

The R Foundation. 2019. R: The R Project for Statistical Computing. Retrieved from the internet Jun. 28, 2022. 3 pages.

Turco et al., Trophoblast organoids as a model for maternal-fetal interactions during human placentation. Nature. Dec. 2018;564(7735):263-267.

(56) References Cited

PUBLICATIONS

Van Brocklyn et al., Dual actions of sphingosine-1-phosphate: extracellular through the Gi-coupled receptor Edg-1 and intracellular to regulate proliferation and survival. J Cell Biol. Jul. 13, 1998;142(1):229-40.

Väremo et al., Enriching the gene set analysis of genome-wide data by incorporating directionality of gene expression and combining statistical hypotheses and methods. Nucleic Acids Res. Apr. 2013;41(8):4378-91.

West et al., Dynamics of trophoblast differentiation in peri-implantation-stage human embryos. Proc Natl Acad Sci U S A. Nov. 5, 2019;116(45):22635-22644.

Yabe et al., Comparison of syncytiotrophoblast generated from human embryonic stem cells and from term placentas. Proc Natl Acad Sci U S A. May 10, 2016;113(19):E2598-607.

Yagi et al., Transcription factor TEAD4 specifies the trophectoderm lineage at the beginning of mammalian development. Development. Nov. 2007;134(21):3827-36.

Yu et al., Regulation of the Hippo-YAP pathway by G-protein-coupled receptor signaling. Cell. Aug. 17, 2012;150(4):780-91.

\* cited by examiner

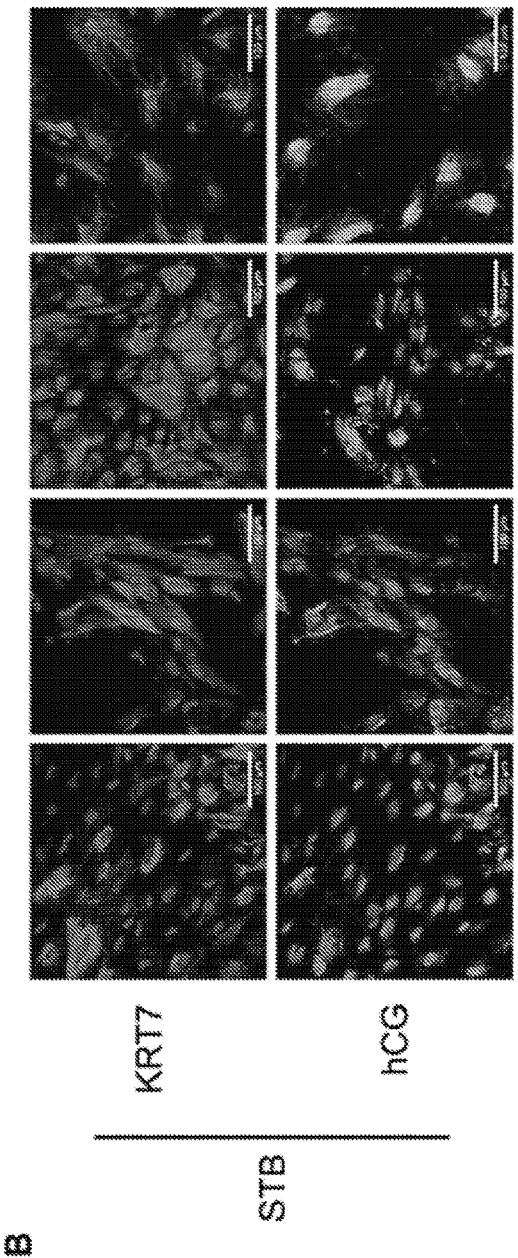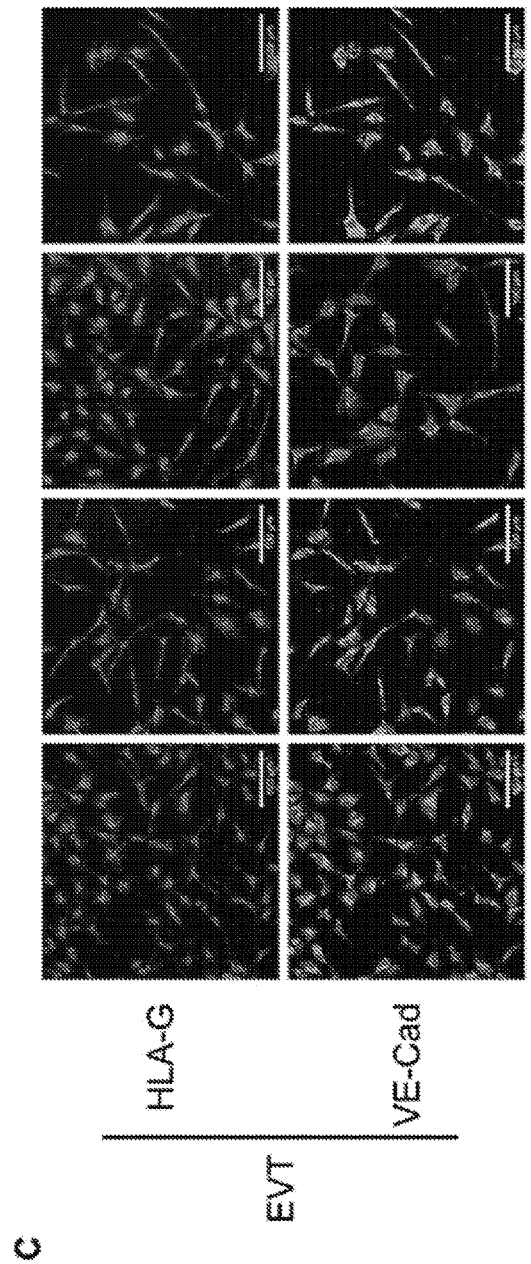
FIGS. 2A-2C

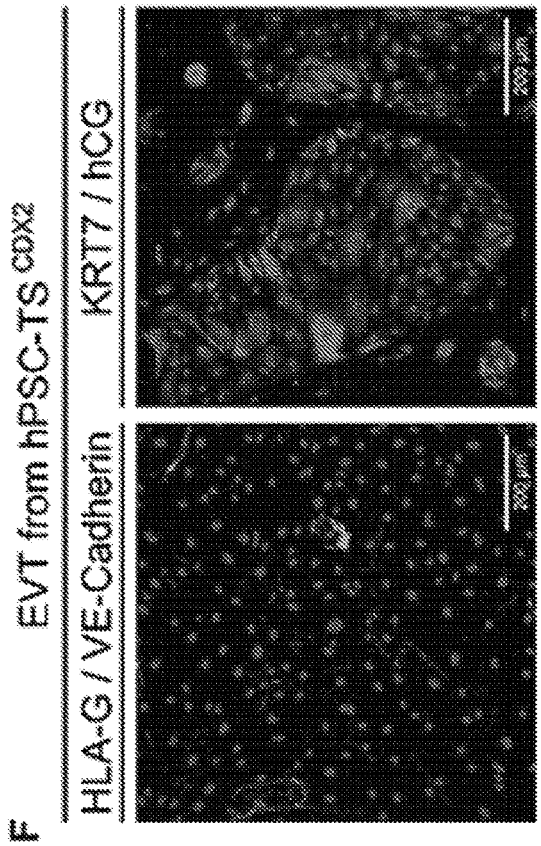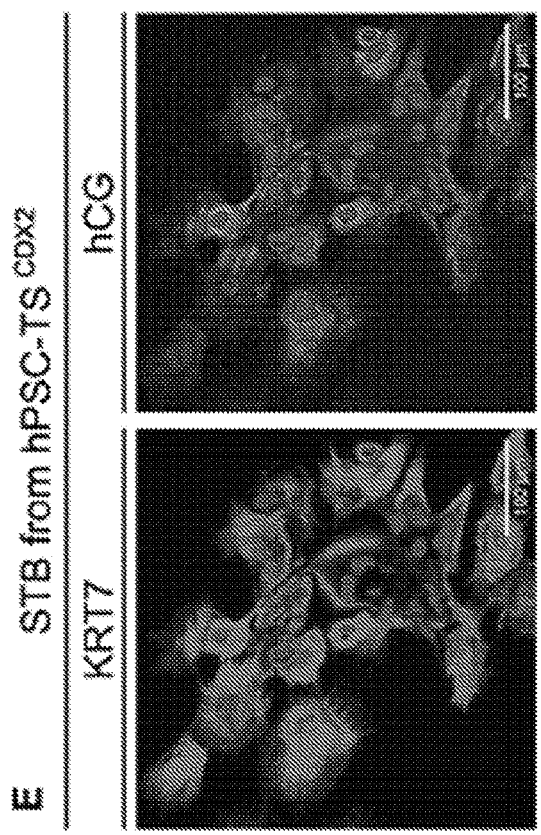
FIGS. 3A-3F

COMPOSITIONS AND METHODS FOR DERIVATION OF TROPHOBLAST STEM CELLS

CROSS REFERENCE TO RELATED APPLICATION

This application claims priority to and the benefit of U.S. Provisional Patent Application No. 62/894,433 filed Aug. 30, 2019, which is incorporated herein by reference in its entirety for all purposes.

GOVERNMENT SUPPORT

This invention was made with government support under grant numbers HD092741 and HD093982 awarded by the National Institutes of Health (NIH). The government has certain rights in the invention.

INCORPORATION-BY-REFERENCE OF MATERIAL SUBMITTED ELECTRONICALLY

Incorporated by reference in its entirety herein is a computer-readable nucleotide/amino acid sequence listing submitted concurrently herewith and identified as follows: One 6,447 Byte ASCII (Text) file named "2020-08-26_37993-601_SQL_ST25," created on Aug. 26, 2020.

FIELD

The present disclosure provides compositions and methods related to the derivation of trophoblast stem cells. In particular, the present disclosure provides novel formulations and methods for deriving and maintaining trophoblast stem cells from human pluripotent stem cells, which can be used for basic research purposes, for developing treatments for pregnancy-associated pathologies such as preeclampsia, recurrent loss of pregnancy, placenta accreta, and intrauterine growth restriction, and developing diagnostics for assessing endometrial receptivity to embryo implantation.

BACKGROUND

Specification of the trophectoderm and the inner cell mass is the first differentiation event during human embryonic development. The trophectoderm mediates blastocyst implantation in the uterus and is the precursor to all trophoblast cells in the placenta. Upon embryo implantation, the trophectoderm forms the cytotrophoblast (CTB), a putative stem cell that can differentiate to form the two major cell types in the placenta—the extravillous trophoblast (EVT) and the syncytiotrophoblast (STB). The EVTs are involved in remodeling of uterine arteries, which is critical to ensure adequate perfusion of the placenta with maternal blood, whereas the multinucleated STB mediates the nutrient and gas exchange at the maternal-fetal interface. Abnormalities in trophoblast development are associated with pregnancy-related pathologies such as miscarriage, preeclampsia and placenta accreta. Yet, despite its relevance to maternal and fetal health, constraints on research with human embryos and early fetal tissue impede mechanistic insight into early trophoblast development.

Trophoblast stem (TS) cells derived from first trimester human placental samples and blastocyst-stage embryos have emerged as an attractive in vitro model system for early human trophoblast. However, restricted accessibility of embryos and placental samples from early gestation and low genetic diversity of existing cell lines limit the use of this model. In contrast, human pluripotent stem cells (hPSCs) are a more accessible source for generating in vitro models of human trophoblast. More importantly, unlike early gestation primary samples where the projected pregnancy outcome is uncertain, human induced pluripotent stem cells (hiPSCs) can potentially provide models of validated normal and pathological trophoblast development. However, whether bonafide trophoblast can be obtained from pluripotent stem cells has been a subject of intense debate. A rigorous head-to-head comparison between trophoblast derived from pluripotent stem cells and their in vivo counterparts has proven difficult due to multiple reasons. Previous studies have used varying experimental protocols, both primary placental samples and cultures of terminally differentiated trophoblast obtained from pluripotent stem cells exhibit heterogeneity and contain many cell types, and until recently self-renewing TS-like cells had not been derived from human pluripotent stem cells.

SUMMARY

Embodiments of the present disclosure include a chemically defined cell culture medium for inducing differentiation of human embryonic stem cells (hESCs) into cytotrophoblasts (CTBs) or CTB-like cells. In accordance with these embodiments, the medium includes a sphingosine 1-phosphate receptor (S1PR) agonist, an activin/nodal inhibitor, and at least one growth factor.

In some embodiments, the S1PR agonist is an agonist of S1PR1 or S1PR3.

In some embodiments, the S1PR agonist is selected from the group consisting of CYM5442, CYM5541, CYM55220, A971432, Ceralifimod, CS2100, CYM50260, CYM50308, FTY720, GSK2018682, RP001, SEW2871, TC-G1006, TC-SP14, and any derivatives or variants thereof.

In some embodiments, the activin/nodal inhibitor is SB431542, A83-01, and any derivatives or variants thereof.

In some embodiments, the at least one growth factor is bone morphogenic protein-4 (BMP4).

In some embodiments, the medium comprises E7™ medium, TeSR™-E7™ medium, E6™ medium, or TeSR™-E6™ medium.

In some embodiments, the medium further comprises ascorbic acid at a concentration ranging from about 0.5 µg/ml to about 40 µg/ml. 8. In some embodiments, the medium further comprises glucose at a concentration of 20 mM or less.

In some embodiments, the CTBs exhibit altered expression of one or more of CDX2, TFAP2C, YAP, ELF5, TEAD4, KRT7, p63, GATA3, and HAND1.

In some embodiments, the CTBs or CTB-like cells are capable of forming a spherical structure.

Embodiments of the present disclosure also include a method for inducing differentiation of human embryonic stem cells (hESCs) into cytotrophoblasts (CTBs). In accordance with these embodiments, the method includes culturing the hESCs in the chemically defined cell culture medium described herein, and assessing the hESCs for one or more phenotypic characteristics of CTBs or CTB-like cells.

Embodiments of the present disclosure also include a chemically defined cell culture medium for inducing and maintaining differentiation of human cytotrophoblasts (CTBs) or CTB-like cells into trophoblast stem cells (hTSCs). In accordance with these embodiments, the medium includes a sphingosine 1-phosphate receptor (STPR) agonist, a GSK3β inhibitor, a TGFβ inhibitor, and at least one growth factor.

In some embodiments, the S1PR agonist is an agonist of S1PR1, S1PR2, or S1PR3. In some embodiments, the S1PR agonist is an agonist of S1PR3.

In some embodiments, the S1PR agonist is selected from the group consisting of CYM5442, CYM5541, CYM55220, A971432, Ceralifimod, CS2100, CYM50260, CYM50308, FTY720, GSK2018682, RP001, SEW2871, TC-G1006, TC-SP14, and any derivatives or variants thereof.

In some embodiments, the GSK3β inhibitor is CHIR99021 and any derivatives or variants thereof.

In some embodiments, the at least one growth factor is fibroblast growth factor 7 (FGF7), fibroblast growth factor 10 (FGF10), and any derivatives or variants thereof.

In some embodiments, the medium comprises E6™ medium or TeSR™-E6™ medium.

In some embodiments, the medium further comprises ascorbic acid at a concentration ranging from about 0.5 μg/ml to about 40 μg/ml. In some embodiments, the medium further comprises glucose at a concentration of 20 mM or less.

In some embodiments, the CTBs or CTB-like cells exhibit altered expression of one or more of CDX2, TFAP2C, YAP, ELF5, TEAD4, KRT7, p63, GATA3, and HAND1.

In some embodiments, the hTSCs are capable of forming a spherical structure.

Embodiments of the present disclosure also include a method for inducing and maintaining differentiation of human cytotrophoblasts (CTBs) or CTB-like cells into trophoblast stem cells (hTSCs). In accordance with these embodiments, the method includes culturing the CTBs or CTB-like cells in the chemically defined cell culture medium described herein, and assessing the CTBs or CTB-like cells for one or more phenotypic characteristics of hTSCs.

In some embodiments, assessing the CTBs or CTB-like cells comprises measuring or detecting at least one of CDX2, TFAP2C, YAP, ELF5, TEAD4, KRT7, p63, GATA3, and HAND1.

In some embodiments, assessing the CTBs or CTB-like cells comprises determining whether the hTSCs have formed a spherical structure.

Figures 1A, 1B, 1C, 1D, 1E, 1F:
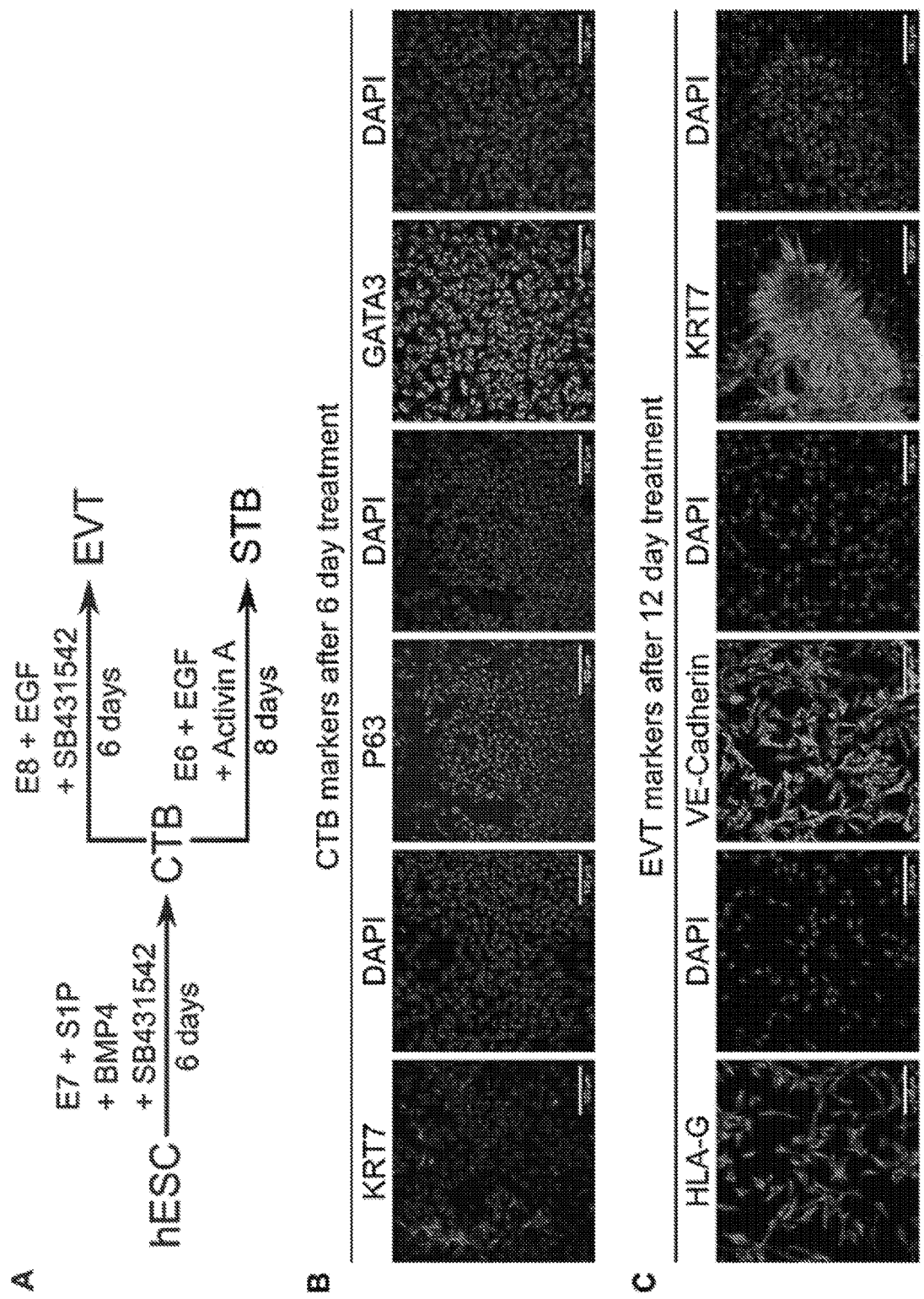
FIGS. 1A-1F: A chemically defined medium containing S1P enables differentiation of hESCs to CTB-like cells and terminally differentiated trophoblasts. (A) Schematic of protocol for hESC differentiation to trophoblast. (B) Confocal images of CTB from 6-day initial treatment of H9 hESCs, staining for KRT7, P63 and GATA3. Nuclei were stained with DAPI. (C) Confocal images of EVTs from 12-day treatment of H9 hESCs, staining for KRT7, HLA-G and VE-Cadherin. Nuclei were stained with DAPI. (D) Confocal images of STB from 14-day treatment of H9 hESCs, staining for KRT7 and hCG, and syncytin. Nuclei were stained with DAPI. Membrane was stained with CellMask deep red plasma membrane stain. (E) Confocal images of cells from 12-day EVT treatment of H9 hESCs upon removal of S1P, staining for HLA-G and VE-Cadherin. Nuclei were stained with DAPI. (F) Confocal images of cells from 14-day STB treatment of H9 hESCs upon removal of S1P, staining for KRT7 and syncytin. Nuclei were stained with DAPI. Scale bars are 100 μm for all images.

Pearson correlation coefficients for comparison between hESCs (H1 and H9), hESC after 3-day treatment (H1 and H9), hESC-derived hPSC-TS$^{CDX2}$ cultured in TM4, hESC-derived hPSC-TS (H1 and H9) and placenta-derived TS (CT30 and CT29) cultured in TSCM (p<0.00001). (C) Hierarchical clustering analysis of transcriptome data from H1 and H9 hESC-derived hPSC-TS and placenta-derived TS (CT30 and CT29, respectively). (D) Relative expression of trophectoderm-associated markers CDX2 and HAND1 and villous CTB-associated marker TP63 in hESC-derived hPSC-TS$^{CDX2}$ and hPSC-TS (H1 and H9) (*q<0.001).

FIGS. 6A-6D: hPSC-TS$^{CDX2}$ and hPSC-TS generated from hiPSCs. (A) Confocal image of SBli006-A hPSC-TS$^{CDX2}$ in TM4, staining for CDX2, TFAP2C, GATA3, YAP, TEAD4, and P63. Nuclei were stained with DAPI. Scale bars are 200 μm. (B) Confocal images of SBli006-A hPSC-TS in TSCM, staining for CDX2, TFAP2C, GATA3, YAP, TEAD4, and P63. Scale bars are 200 μm. (C) Flow cytometry histogram of KRT7 expression of SBli006-A hPSC-TS cells in TSCM compared to an isotype control. (D) Confocal images of EVTs from SBli006-A hPSC-TS, staining for HLA-G and VE-Cadherin. Scale bars are 100 μm. (E) Flow cytometry histogram of HLA-G expression of EVTs from SBli006-A hPSC-TS cells compared to an isotype control. (F) Gene expression of CGβ, SDC1, CSH1/2, HLA-G, MMP2, TEAD4, and TP63 of EVTs compared to TS cells from SBli006-A hPSC-TS and placenta-derived TS. Four biological replicates were used. Error bars, S.E., *p<0.05 for differential expression relative to TS cells. Data for placenta-derived TS cells is the same as used in FIG. 4. (G) Confocal images of STB from SBli006-A-derived hPSC-TS, staining for hCG and KRT7. Scale bars are 100 μm. (H) Gene expression of CGβ, SDC1, CSH1/2, HLA-G, MMP2, TEAD4, and TP63 of STBs compared to TS cells from SBli006-A hiPSC-derived hPSC-TS and placenta-derived TS. Four biological replicates were used. Error bars, S.E., *p<0.05.

FIGS. 7A-7E: A chemically defined medium containing S1P enables differentiation of hESCs to CTB and terminally differentiated trophoblasts (related to FIG. 1). (A) Gene expression of CTB: CDX2, ELF5; Mesoderm: KDR, LMO2, T (brachyury), TBX4 and neural genes: MSH1, NES (nestin), OLIG3 in H9 hESCs undergoing differentiation, compared to hESCs. Three biological replicates were used. Error bars, S.E., *p<0.05 for comparison with undifferentiated hESCs. (B) Gene expression of CTB: CDX2, ELF5; Mesoderm: KDR, LMO2, T (brachyury), TBX4 and neural genes: MSH1, NES (nestin), OLIG3 in H1 hESCs undergoing differentiation compared to hESCs. Three biological replicates were used. Error bars, S.E., *p<0.05 for comparison with undifferentiated hESCs. (C) Confocal images of CTB from 6-day initial treatment of H1 hESCs, staining for KRT7, P63 and GATA3. Nuclei were stained with DAPI. (D) Confocal images of EVTs from 12-day treatment of H1 hESCs, staining for KRT7, HLA-G and VE-Cadherin. Nuclei were stained with DAPI. (E) Confocal images of STB from 14-day treatment of H1 hESCs, staining for KRT7, syncytin and hCG. Nuclei were stained with DAPI. Membrane was stained with CellMask deep red plasma Membrane stain. Scale bars are 100 μm for all images.

Figures 8A, 8B, 8C:
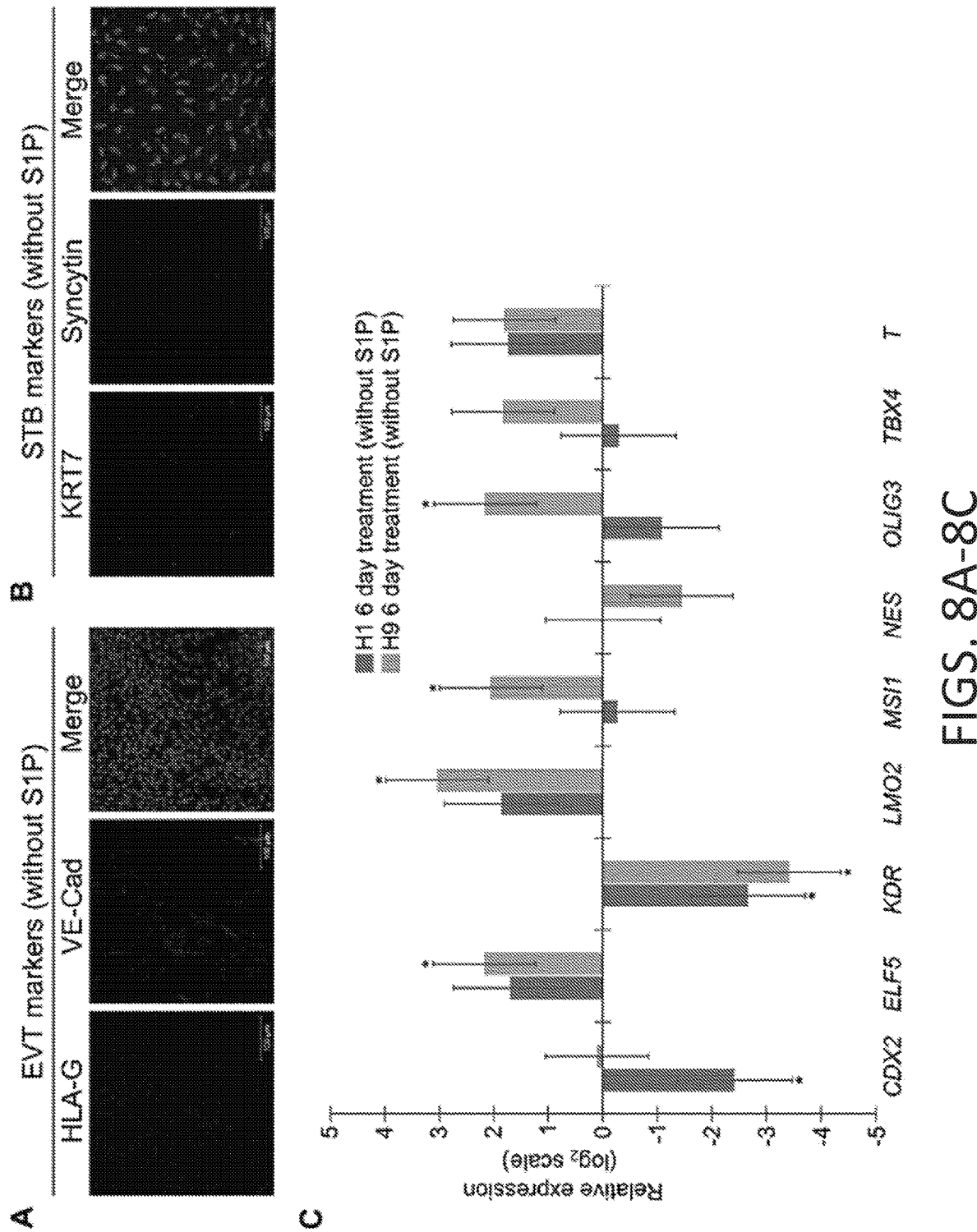
Figures 8A, 8B, 8C:
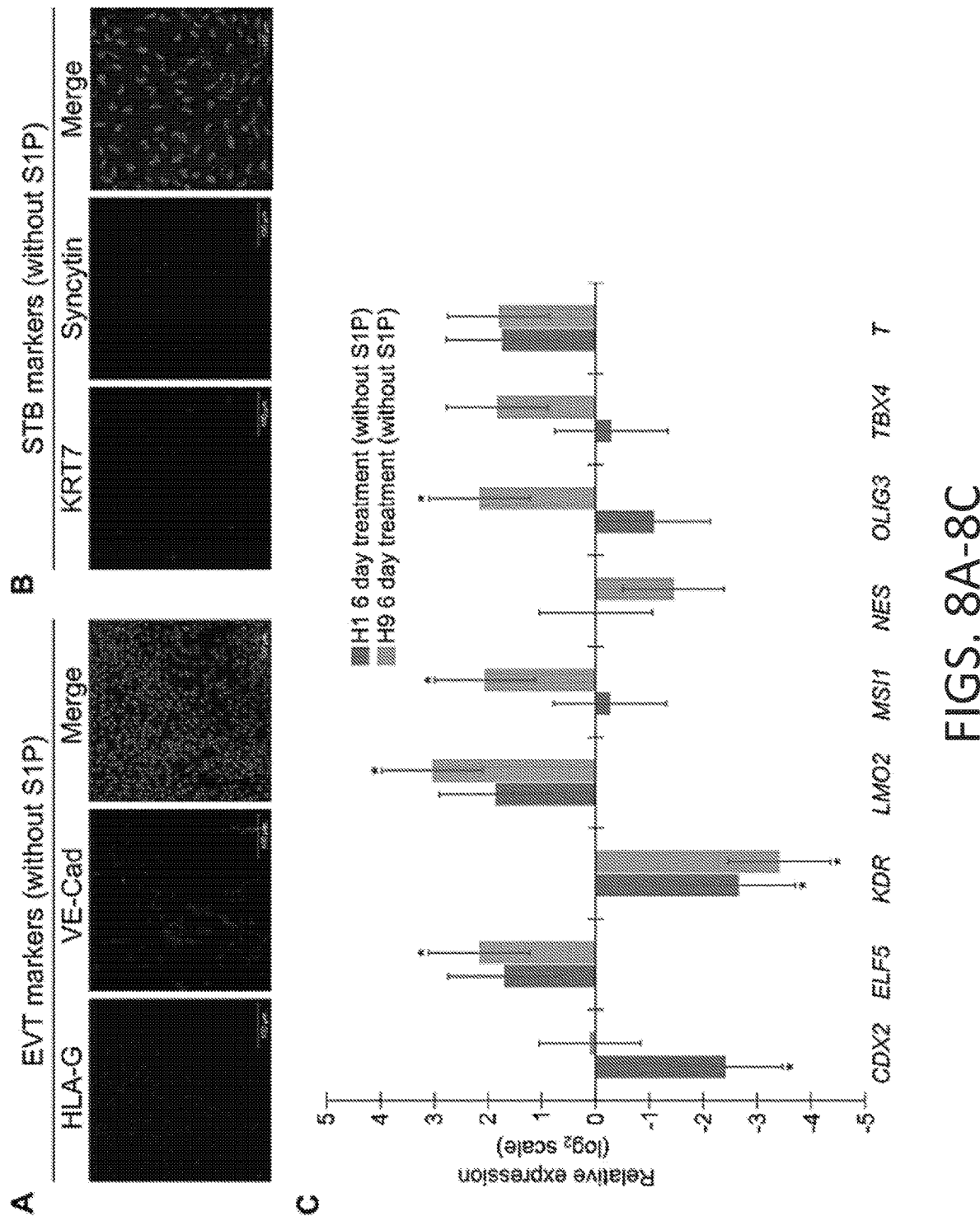

FIGS. 8A-8C: S1P is important for differentiation of hESCs to trophoblast (related to FIG. 1). (A) Confocal images of cells from 12-day EVT treatment of H1 hESCs upon removal of S1P, staining for HLA-G and VE-Cadherin. Nuclei were stained with DAPI. (B) Confocal images of cells from 14-day STB treatment of H1 hESCs upon removal of S1P staining for KRT7 and syncytin. Nuclei were stained with DAPI. (C) Gene expression of CDX2, ELF5, KDR, LMO2, MSH1, NES (nestin), OLIG3, and T (brachyury) in 6-day treatment of H9 and H1 hESCs upon removal of S1P, compared to 6-day treatment in the presence of S1P. Three biological replicates were used. Error bars are S.E., *p<0.05. Scale bars are 100 μm for all images.

Figures 2A, 2B, 2C:
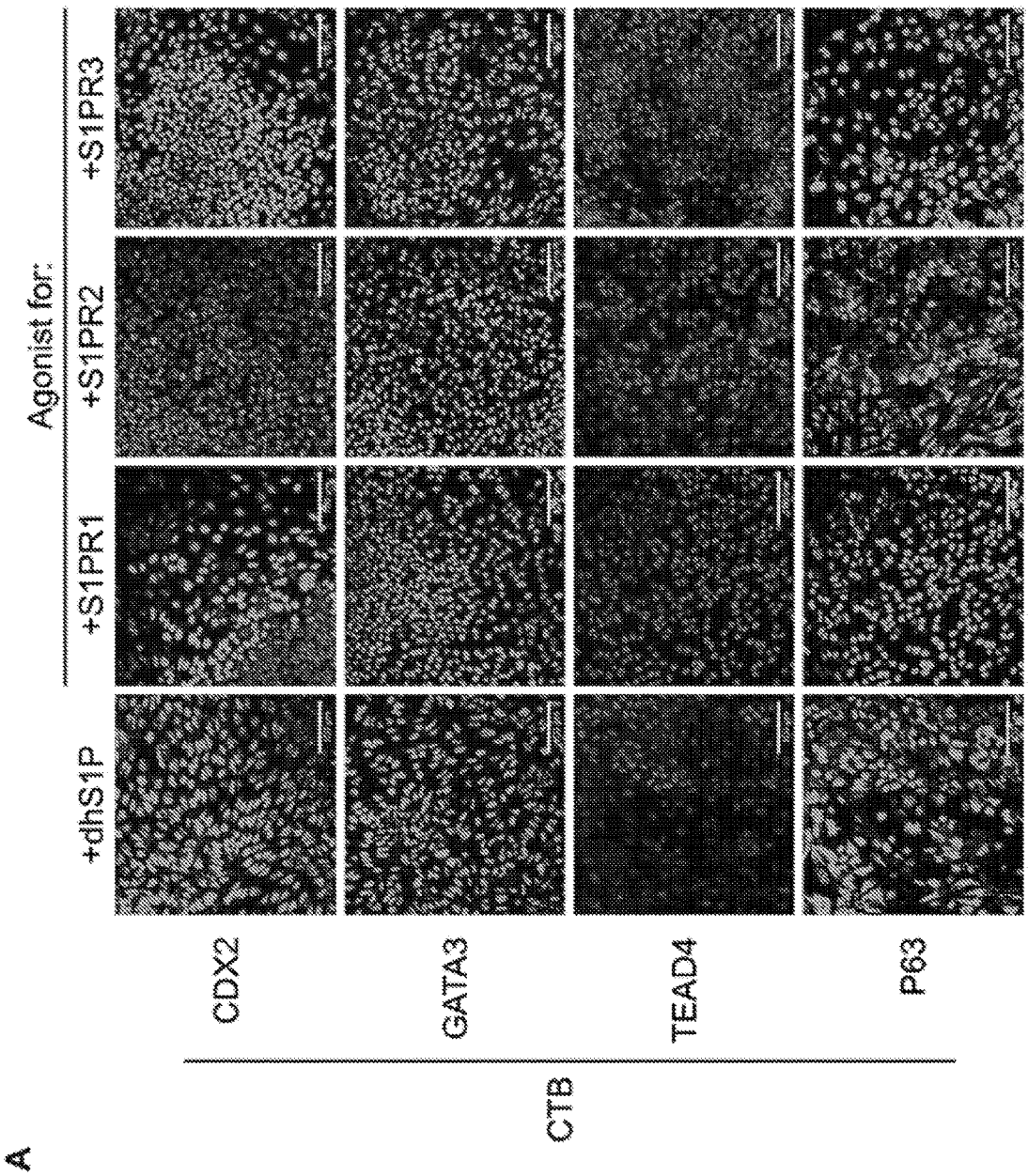
FIGS. 2A-2C: S1P mediates its effects on trophoblast differentiation of hESCs through its receptors. (A) Confocal images of CTB from 6-day treatment of H9 hESCs using D-erythro-dihydrospingosine-1-phosphate (dhS1P), CYM5442 (S1PR1 agonist), CYM5220 (S1PR2 agonist), and CYM5541 (S1PR3 agonist), staining for CDX2, GATA3, P63, and TEAD4. Nuclei were stained with DAPI. (B) Confocal images of STB from 14-day treatment of H9 hESCs using dhS1P, CYM5442, CYM5520, and CYM5541 during initial 6-day treatment, staining for KRT7 and hCG. Nuclei were stained with DAPI. (C) Confocal images of EVTs from 12-day treatment of H9 hESCs using dhS1P, CYM5442, CYM5220, and CYM5541 during initial 6-day treatment, staining for HLA-G and VE-Cadherin. Nuclei were stained with DAPI. Scale bars are 100 μm for all images.
Figures 9A, 9B, 9C:
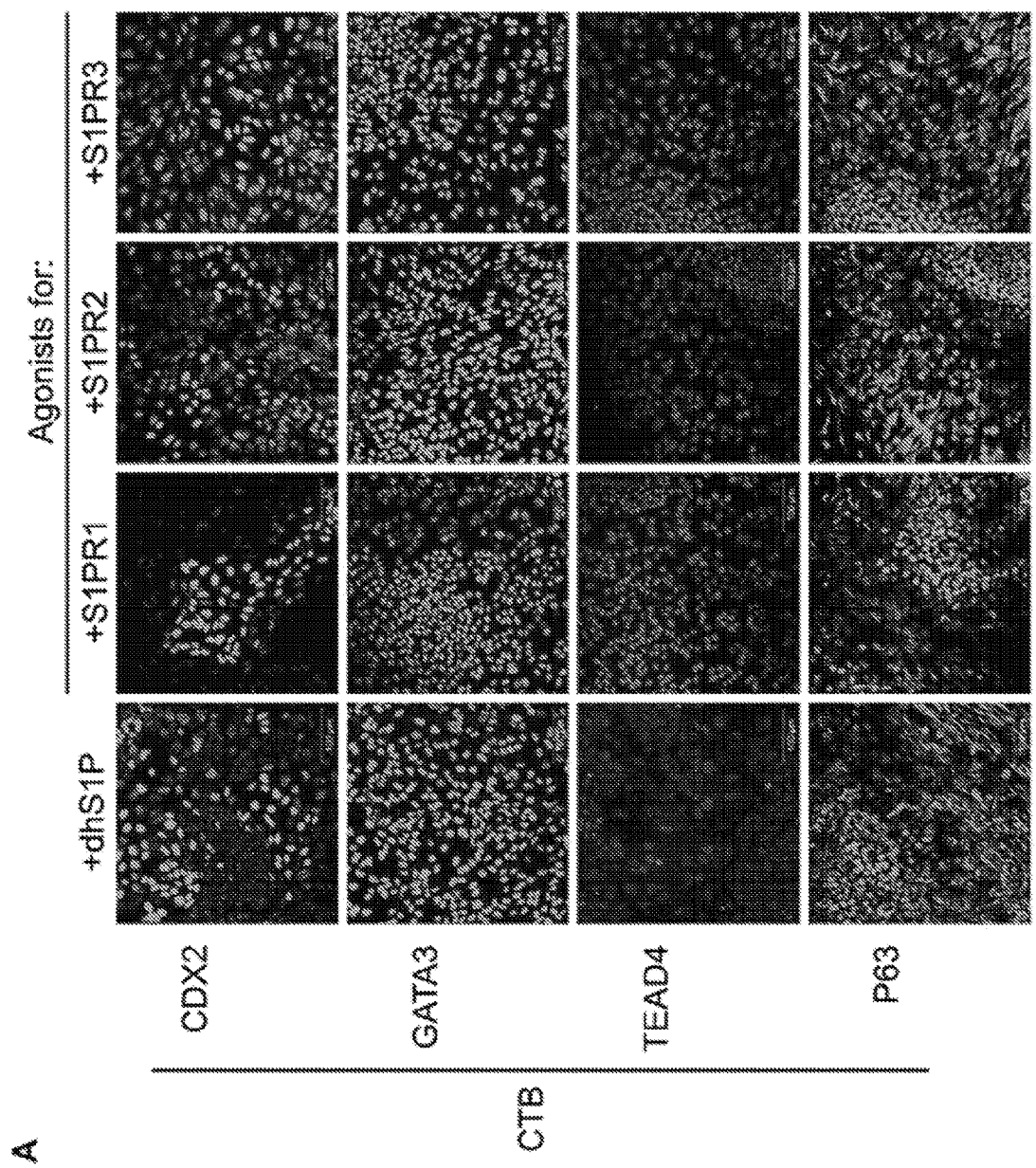
Figures 9A, 9B, 9C:
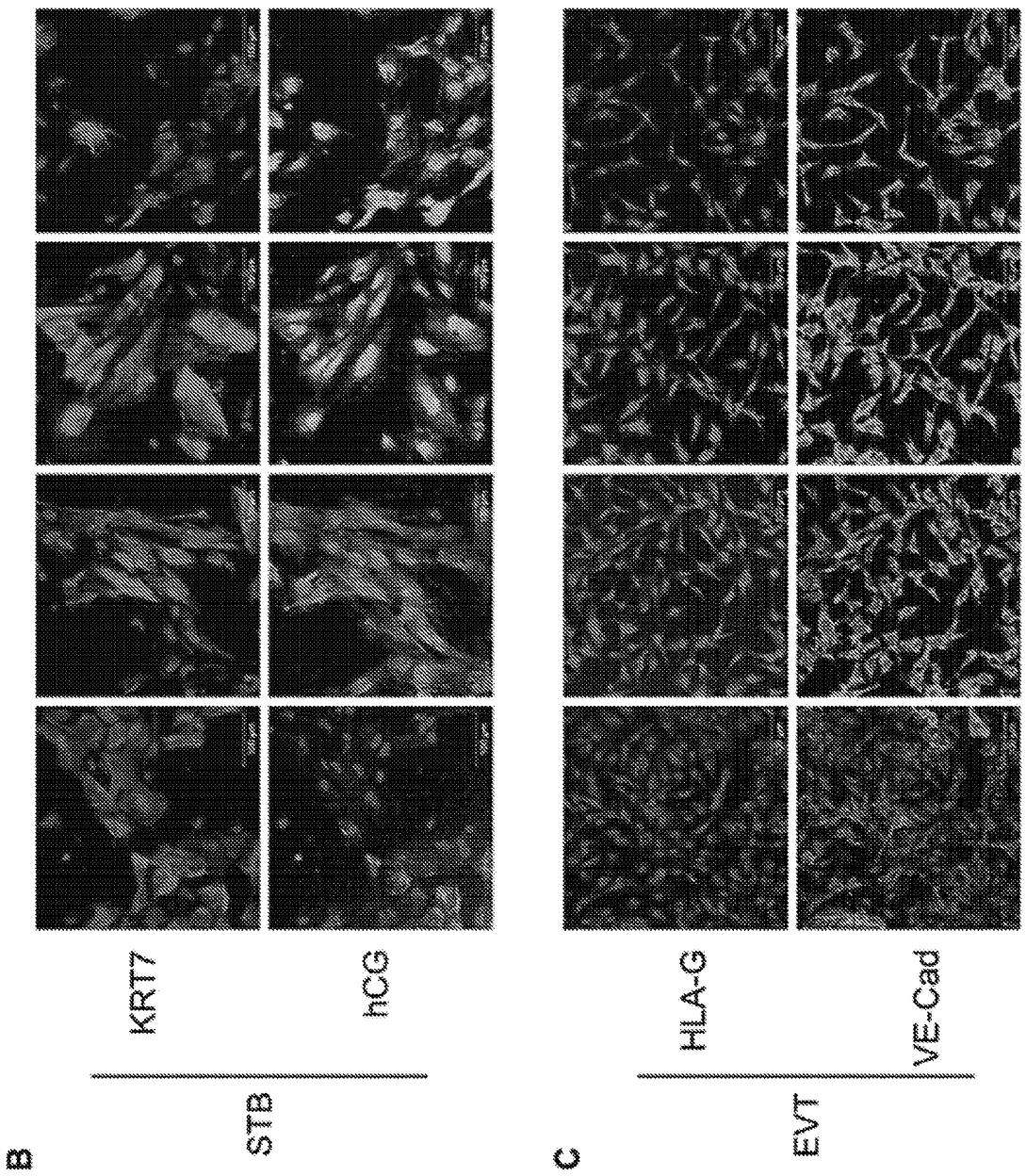

FIGS. 9A-9C: S1P mediates its effects on trophoblast differentiation of hESCs through its receptors (related to FIG. 2). (A) Confocal images of CTB from 6-day treatment of H1 hESCs using D-erythro-dihydrospingosine-1-phosphate (dhS1P), CYM5442 (S1PR1 agonist), CYM5220 (S1PR2 agonist), and CYM5541 (S1PR3 agonist), staining for CDX2, GATA3, P63, and TEAD4. Nuclei were stained with DAPI. (B) Confocal images of STB from 14-day treatment of H1 hESCs using dhS1P, CYM5442, CYM5520, and CYM5541 during initial 6-day treatment, staining for KRT7 and hCG. Nuclei were stained with DAPI. (C) Confocal images of EVTs from 12-day treatment of H1 hESCs using dhS1P, CYM5442, CYM5220, and CYM5541 during initial 6-day treatment, staining for HLA-G and VE-Cadherin. Nuclei were stained with DAPI. Scale bars are 100 μm for all images.

Figure 10:
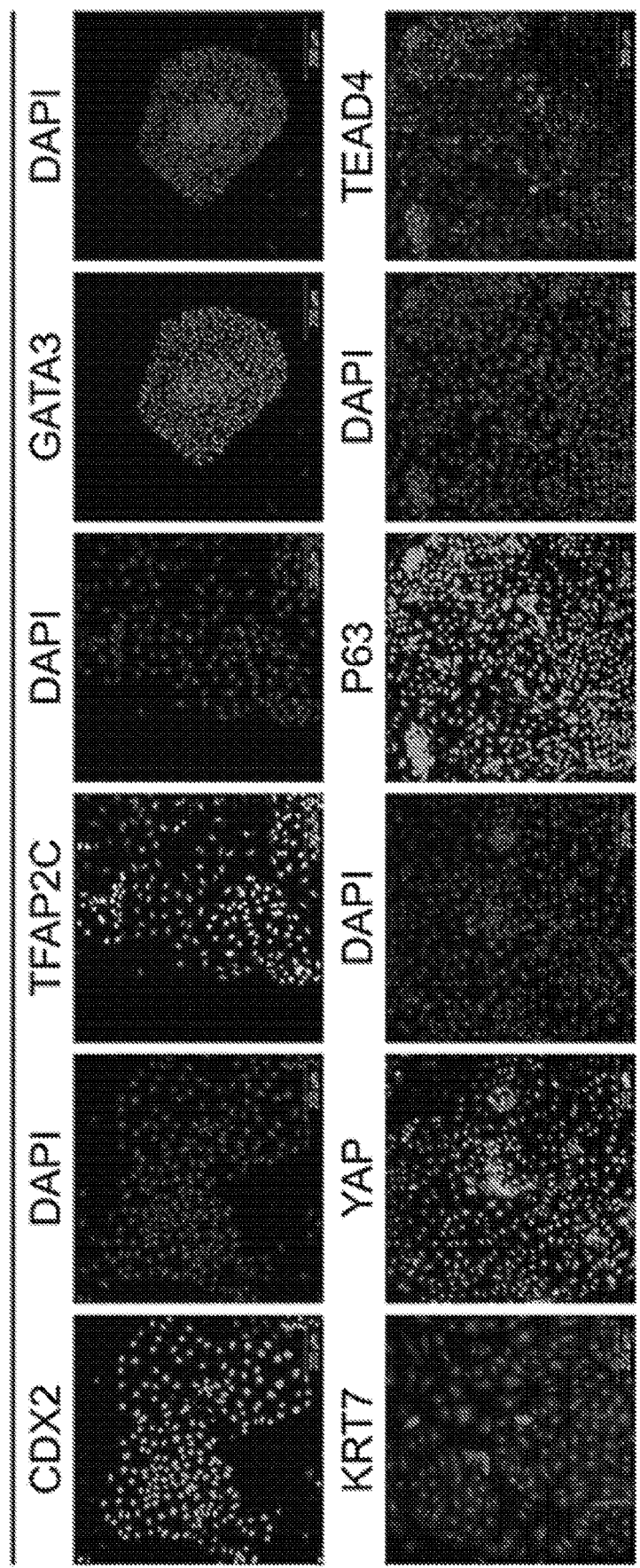

FIG. 10: Optimizing timing of hESC differentiation enables derivation of hPSC-TS$^{CDX2}$ cells (related to FIG. 3). Confocal images of H1 hPSC-TS$^{CDX2}$ in TM4, staining for CDX2, TFAP2C and GATA3, YAP, TEAD4, and P63. Nuclei were stained with DAPI. Scale bars are 200 μm.

FIGS. 11A-11E: Placenta-derived TS cells used as control. (A) Confocal images of primary-derived TS cells in TSCM, staining for CDX2, GATA3, TEAD4, and P63. Nuclei were stained with DAPI. Similar results were obtained with another placenta-derived TS cell line. Scale bars are 200 μm. (B) Flow cytometry histogram of KRT7 expression of primary-derived TS cells compared to isotype control. Similar results were obtained with another placenta-derived TS cell line. (C) Confocal images of EVTs from primary-derived TS cells, staining for HLA-G and VE-Cadherin. Nuclei were stained with DAPI. Similar results were obtained with another placenta-derived TS cell line. Scale bars are 200 μm. (D) Flow cytometry histogram of HLA-G expression of EVTs from primary-derived TS cells compared to isotype control. Similar results were obtained with another placenta-derived TS cell line. (E) Confocal images of STB from primary-derived TS cells, staining for KRT7 and hCG. Nuclei were stained with DAPI. Similar results were obtained with another placenta-derived TS cell line. Scale bars are 200 μm.

Figures 12A, 12B, 12C, 12D, 12E:
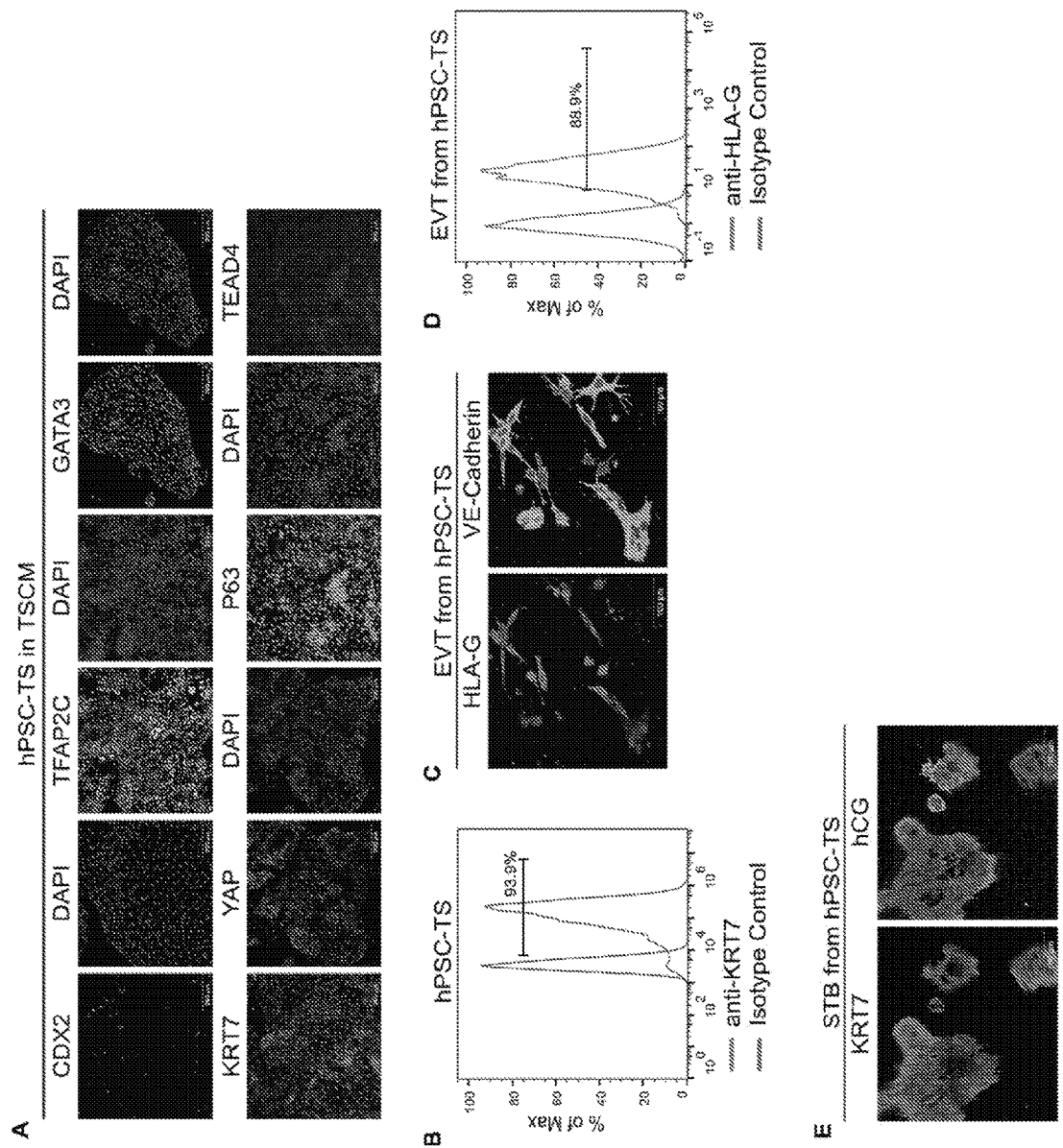

FIGS. 12A-12C: Formation of hPSC-TS cells (related to FIG. 4). (A) Confocal images of H1 hPSC-TS in TSCM, staining for CDX2, TFAP2C and GATA3, YAP, TEAD4, and P63. Nuclei were stained with DAPI. Scale bars are 200 μm. (B) Flow cytometry histogram of KRT7 expression of H1 hPSC-TS cells in TSCM compared to isotype control. (C) Confocal images of EVTs from H1 hPSC-TS cells, staining for HLA-G and VE-Cadherin. Nuclei were stained with DAPI. Scale bars are 100 μm. (D) Flow cytometry histogram of HLA-G expression of EVTs from H1 hPSC-TS cells compared to isotype control. (E) Confocal images of STB from H1 hPSC-TS cells, staining for hCG and KRT7. Nuclei were stained with DAPI. Scale bars are 100 μm.

Figures 13A, 13B:
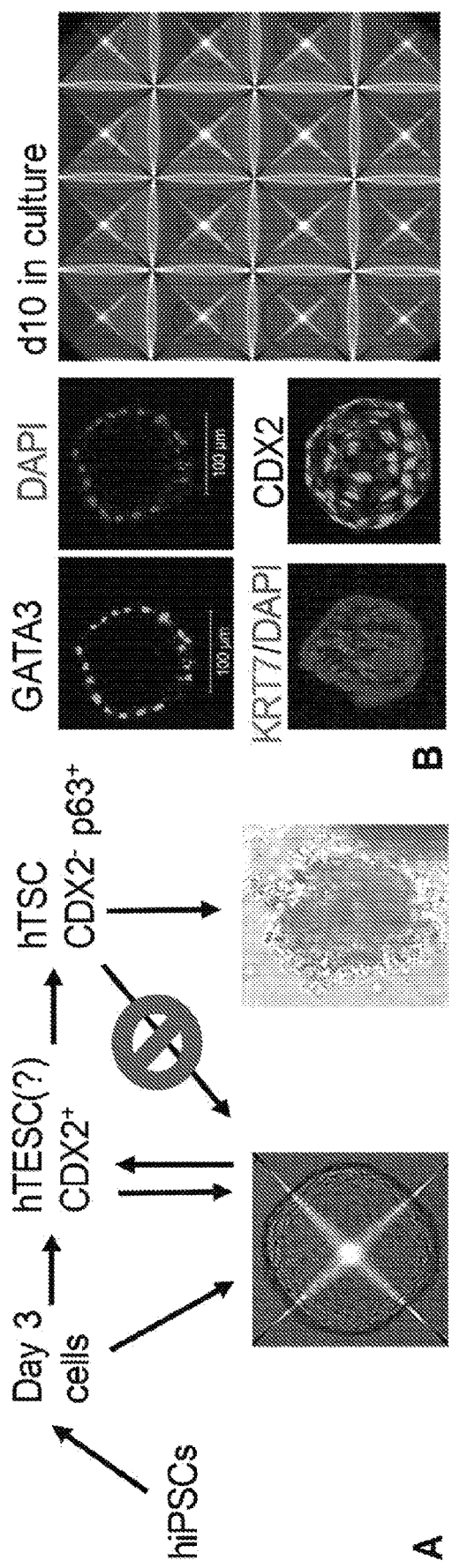

FIGS. 13A-13B: Generation of trophectospheres from human pluripotent stem cells. (A) Trophectospheres can be generated from day 3 cells and CDX2$^+$ cells but not CDX2$^-$/p63$^+$ hTSCs. (B) Trophectospheres express CDX2, GATA3 and KRT7, and are efficiently generated in a multi-well system.

Figure 14:
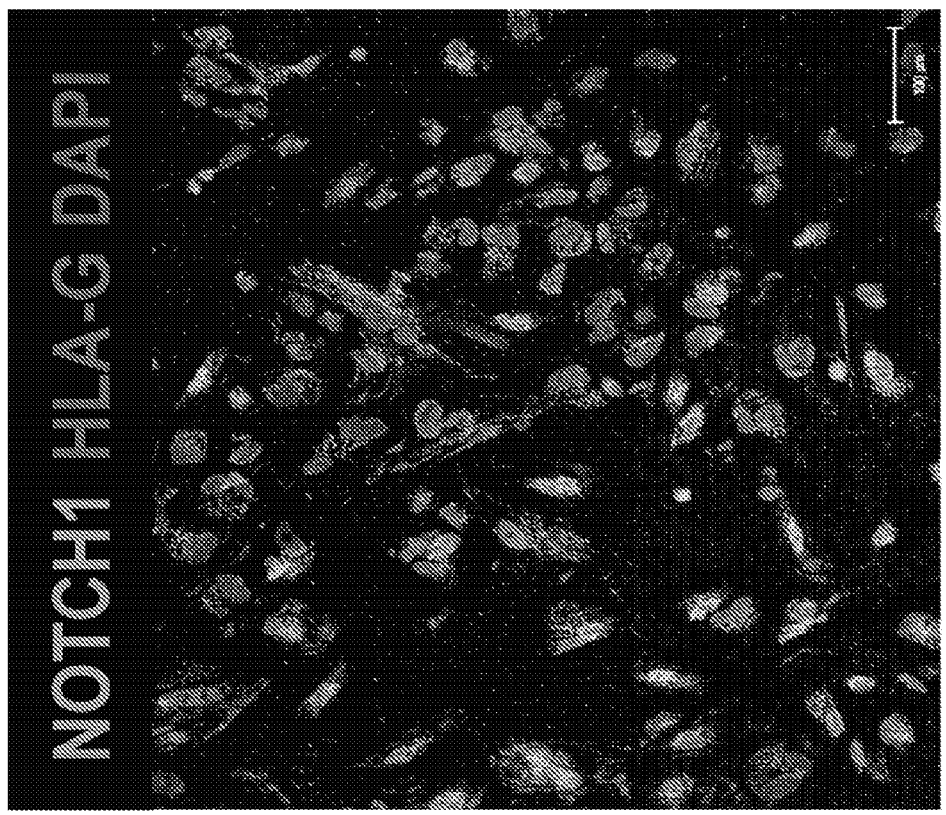
Figure 14:
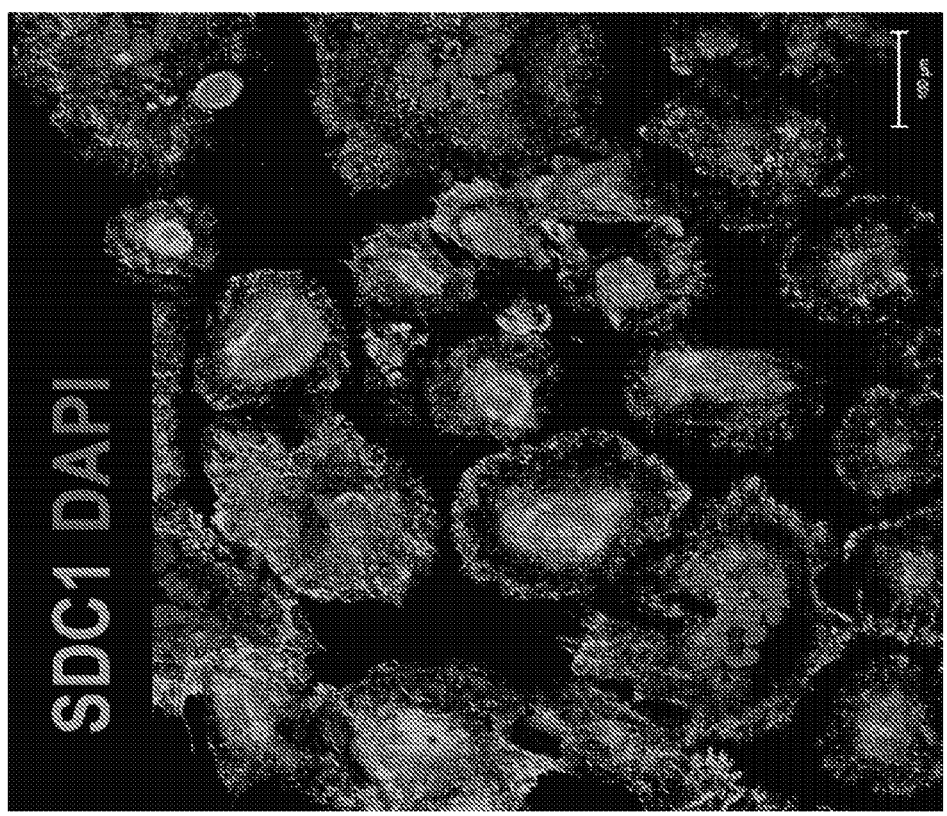

FIG. 14: Representative images showing attachment of trophectospheres to cell-free surfaces stained with SDC1 (left panel) and Notch (right panel). Scale bars are 100 μm.

Figure 15:
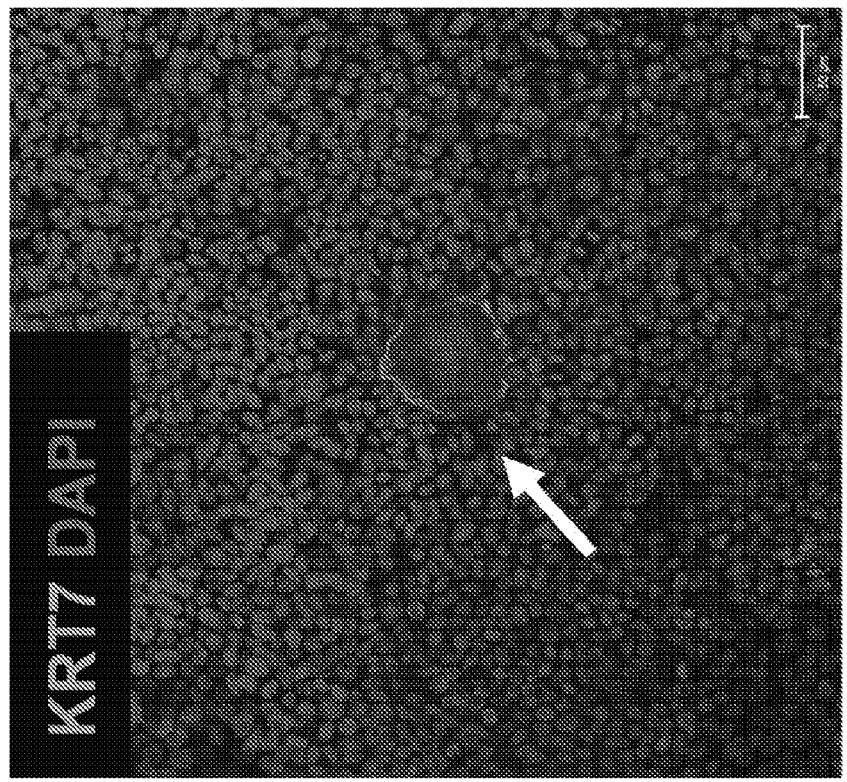
Figure 15:
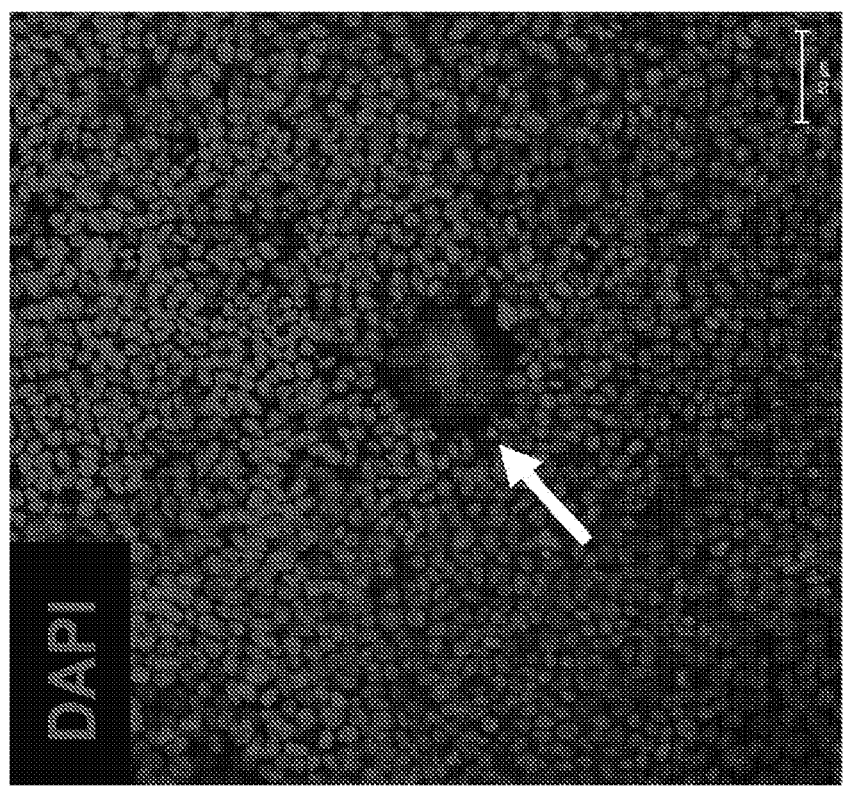

FIG. 15: Representative images showing attachment of trophectospheres to Ishikawa cells stained with DAPI alone (left panel) or with DAPI and KRT7 (right panel). Scale bars are 50 μm. Arrow shows attachment site.

Figure 16:
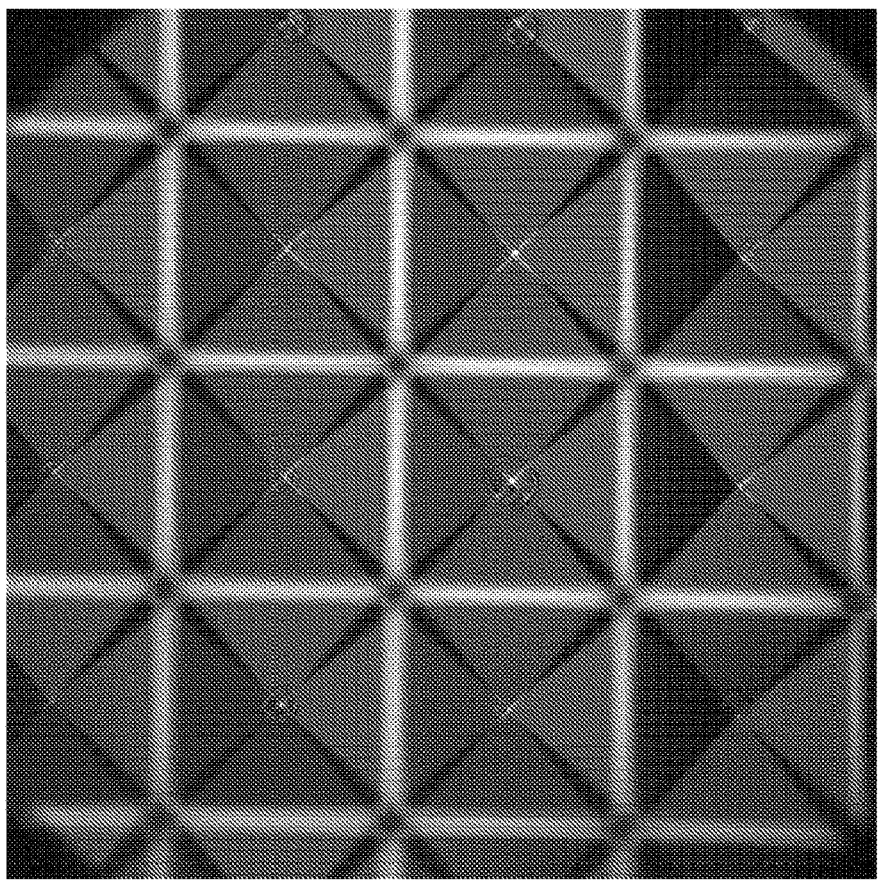
Figure 16:
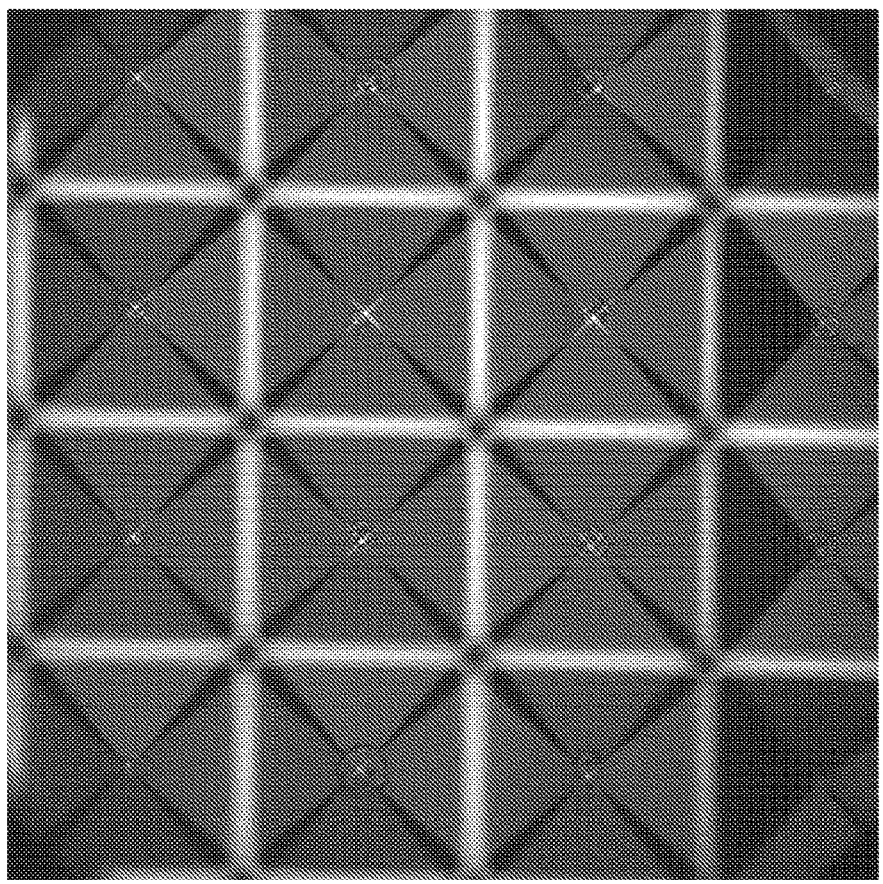

FIG. 16: Representative images of trophectosphere formation in low glucose medium (e.g., 5 mM glucose in TM4 medium).

DETAILED DESCRIPTION

The use of human trophoblast stem (TS) cells as a model for studies of early placental development is hampered by limited genetic diversity of existing TS cell lines, and constraints on using human fetal tissue or embryos needed to generate additional lines. Embodiments of the present disclosure report the derivation of two distinct stem cells of the trophectoderm lineage from human pluripotent stem cells. Analogous to villous cytotrophoblasts in vivo, the first is a $CDX2^-$ stem cell comparable to placenta-derived TS cells—they both exhibit identical expression of key markers, are maintained in culture and differentiate under similar conditions, and share high transcriptome similarity. The second is a more primitive $CDX2^+$ stem cell with distinct cell culture requirements, and differences in gene expression and differentiation, relative to $CDX2^-$ stem cells. As described further herein, the compositions and methods of the present disclosure facilitate the derivation and maintenance of these two distinct trophectoderm lineage stem cells from human embryonic stem cells (hESCs) and hiPSCs in chemically defined culture conditions. The isolation of self-renewing stem cell populations allowed a direct comparison of placenta-derived TS cells with TS cells from hPSCs; genome wide transcriptomic analysis and functional differentiation assays demonstrated very high similarity between placenta- and hPSC-derived $CDX2^-$ TS cells. The routine derivation of TS cells from hPSCs will provide powerful tools for mechanistic studies on normal and pathological early trophoblast development. In particular, derivation of TS cells from pluripotent stem cells will enable construction of models for normal and pathological placental development.

Embodiments of the present disclosure demonstrate that two distinct stem cell populations of the trophectoderm lineage—hPSC-TS and hPSC-TS$^{CDX2}$—can be derived from hESCs and hiPSCs under chemically defined culture conditions. Whether bonafide trophoblast could be obtained from hPSCs has been a subject of debate. Despite extensive research in this area, conducting a rigorous head-to-head comparison between hPSC-derived and primary trophoblasts has been challenging. The isolation of trophoblast stem cell populations from hPSCs in the present disclosure, in conjunction with the recent derivation of primary TS cells from blastocysts and early gestation placental samples (e.g., Okae et al., 2018) enables such a comparison. Embodiments of the present disclosure demonstrate that hPSCs can be differentiated to TS cells that express markers consistent with primary (placenta-derived) TS cells (P63, TEAD4, TFAP2C, YAP, and GATA3). The hPSC-derived hPSC-TS cells are cultured in the same medium as primary TS cells. They differentiate to EVT and STB using similar protocols as those used for primary TS cells. Further, hPSC-derived hPSC-TS and primary TS have highly similar transcriptomes. Taken together, these results demonstrate that hPSC-derived TS cells are analogous to primary TS cells, and that hPSCs can indeed differentiate to bonafide trophoblasts.

Role of culture medium in trophoblast differentiation of hESCs. Previous studies on trophoblast differentiation of hESCs have employed differing protocols, resulting in significantly different outcomes in some cases. Notably, Benardo et al. (2011) reported that BMP treatment of hESCs results in differentiation of hESCs to mesoderm and not trophoblast. The results provided herein demonstrate two potential explanations for discrepancies in previous studies. First, data provided herein demonstrate that receptor-mediated signaling by the albumin-associated sphingolipid S1P plays a critical role in hESC differentiation to trophoblast in the medium. Differences in results reported by previous studies may be due to variability in the lipid composition of media used during trophoblast differentiation of hESCs. Second, the medium used for routine maintenance of undifferentiated hESCs likely contributes significantly to their differentiation potential. For instance, unlike hESCs cultured in the presence of KSR, hESCs in E8™ medium exhibit features of naïve pluripotency. Recent studies report the conversion of hESCs to expanded potential stem cells (EPSCs) by transitioning hESCs to a human EPSC medium. Significantly, TS-like cells can be obtained by passaging EPSCs—but not hESCs in KSR containing medium—in TSCM used for culture of primary TS (Gao et al., 2019). Along similar lines, Dong et al. report the derivation of TS cells from naïve hPSCs, but not primed hPSCs routinely cultured under conditions different from those used in this study (Dong et al., 2020). Taken together these studies underscore the importance of hPSC culture conditions in their differentiation potential. Differences in hPSC culture conditions may lead to inconsistent results during trophoblast differentiation.

Differences between hPSC-TS$^{CDX2}$ and hPSC-TS cells. Marker expression analysis, functional differentiation assays, and genome-wide transcriptome analysis confirm the high similarity between hPSC-TS and placenta-derived TS cells that are similar to villous CTB. However, hPSC-TS$^{CDX2}$ cells differ significantly from hPSC-TS cells. They do not undergo differentiation to EVTs under the culture conditions used for differentiating hPSC-TS and primary TS cells. Transcriptome analysis shows that genes associated with several key pathways and biological processes are differentially regulated between hPSC-TS$^{CDX2}$ and hPSC-TS cells. Significantly, hPSC-TS$^{CDX2}$ cells, but not hPSC-TS, express high levels of the trophectoderm-associated markers CDX2 and HAND1, associated with putative trophectoderm stem cells as proposed by Knöfler et al. (2019). Consistent with the more primitive nature of hPSC-TS$^{CDX2}$, they can be readily transitioned into TSCM used for culturing hPSC-TS, as was seen by Okae et al. (2018) when transitioning trophectoderm cells of blastocysts into TSCM. Subsequently, hPSC-TS$^{CDX2}$ lose expression of CDX2 and express higher levels of P63 in TSCM, and can differentiate to form EVTs and STB. Note that TS cells derived from the trophectoderm in the blastocyst stage embryo lose expression of CDX2 (Okae et al., 2018). On the other hand, it has not been possible yet to revert hPSC-TS to hPSC-TS$^{CDX2}$ by culturing in TM4 medium. Overall, the results provided herein clearly demonstrate that hPSC-TS$^{CDX2}$ Cells are a more primitive cell type than hPSC-TS cells.

Transcriptome data for hPSC-TS, hPSC-TS$^{CDX2}$ and placenta-derived TS cells were compared with previously published data for trophectoderm cells from human embryos (Petropoulos et al., 2016). However, analysis from the present disclosure demonstrated greater similarity in average expression levels among different TS cell types in culture than between hPSC-TS$^{CDX2}$ and primary trophectoderm cells. This could be due to differences between cells in culture and primary human embryos, and experimental protocols for transcriptome analysis.

Considerations for derivation and culture of hPSC-TS$^{CDX2}$ cells. To derive hPSC-TS$^{CDX2}$ Cells, undifferentiated hESCs maintained in E8™ medium were treated for 3 days with the S1PR3 agonist, BMP4 and the activin/nodal inhibitor SB4315432, to obtain CDX2$^+$ cells. Subsequently, CDX2$^+$ cells were passaged in TM4 medium to obtain hPSC-TS$^{CDX2}$. Using this protocol, increased differentiation of H1 hESC-derived cells were observed upon passage into TM4 medium, relative to H9 hESC- and SBli006-A hiPSC-derived cells. Shortening the initial treatment step in case of H1 hESCs to 2 days eliminated excessive differentiation and facilitated derivation of hPSC-TS$^{CDX2}$ Cells.

The initial hESC differentiation step was carried out in E7™ medium that contains bFGF. Differentiation of hESCs to trophoblast has been carried out in the presence or absence of exogenous FGF (Amita et al., 2013; Das et al., 2007). Consistent with this, it was found that hPSC-TS$^{CDX2}$ could be formed even if the initial treatment was carried out in E6™ medium lacking bFGF, instead of E7™ medium.

In some cases, hPSC-TS$^{CDX2}$ cells proliferated more slowly in culture than hPSC-TS cells. Attachment of hPSC-TS$^{CDX2}$ cells to tissue culture plates was less efficient than TS cells. Additionally, excessive differentiation in TM4 medium during early passages could be countered by reducing the concentration of ascorbic acid (32 µg/mL instead of 64 µg/mL) in TM4. Additional studies on composition of TM4 medium or the substrates used to coat tissue culture plates may lead to improved growth rate and attachment efficiency. Alternatively, the slower growth rate and less efficient attachment characteristics may be an inherent feature of the hPSC-TS$^{CDX2}$ state. Nonetheless, data provided herein demonstrate successful maintenance of hPSC-TS$^{CDX2}$ derived from all cell lines studied for at least 20 passages, in several independent runs over 5+ months.

Derivation of hPSC-TS$^{CDX2}$ and hPSC-TS cells from hiPSCs. Embodiments of the present disclosure demonstrate that hPSC-TS$^{CDX2}$ and hPSC-TS cells can be derived from hiPSCs. Since hiPSCs can be derived by reprogramming easily accessible somatic tissues, hPSC-TS and hPSC-TS$^{CDX2}$ cells derived from hiPSCs can greatly accelerate research in placental biology. Further, arguably a limitation of blastocyst- or placenta-derived hPSC-TS cells is that pregnancy outcomes at term for the early gestation placental samples or blastocyst stage embryos used cannot be predicted accurately. In contrast, hiPSC-derived hPSC-TS and hPSC-TS$^{CDX2}$, from hiPSCs generated using somatic tissues obtained at term, will potentially enable development of models of validated normal and pathological trophoblast development. Pertinently, Sheridan et al. (2019) have derived hiPSCs from umbilical cords of normal pregnancies and those associated with early onset preeclampsia. The results provided herein also gain particular significance in light of restrictions on research with fetal tissue.

Taken together, using optimized cell culture protocols detailed in the various embodiments of the present disclosure, two distinct stem cell populations of the trophectoderm lineage—hPSC-TS$^{CDX2}$ and hPSC-TS—have been derived from human pluripotent stem cells. These stem cell models will be powerful tools for in vitro studies on human trophoblast development Section headings as used in this section and the entire disclosure herein are merely for organizational purposes and are not intended to be limiting.

1. DEFINITIONS

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present disclosure. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

"Correlated to" as used herein refers to compared to.

As used herein, the term "animal" refers to any animal (e.g., a mammal), including, but not limited to, humans, non-human primates, pigs, rodents (e.g., mice, rats, etc.), flies, and the like.

The term "cell culture process" generally refers to the process by which cells are grown or maintained under controlled conditions. The cell culture process may take place in vitro or ex vivo. In some embodiments, a cell culture process has both an expansion phase and a production phase. In some embodiments, the expansion and production phases are separated by a transition or shift phase. "Culturing" a cell refers to contacting a cell with a cell culture medium under conditions suitable to for growing or maintaining the cell. A "cell culture" can also refer to a solution containing cells.

The terms "medium" and "cell culture medium" (plural, "media") generally refer to a nutrient source used for growing or maintaining cells. As is understood by a person of ordinary skill in the art, the nutrient source may contain components required by the cell for growth and/or survival or may contain components that aid in cell growth and/or survival. Vitamins, essential or non-essential amino acids (e.g., cysteine and cystine), and trace elements (e.g., copper) are examples of medium components. A cell culture medium may also be supplemented (e.g., with a "medium supplement" or "supplement" with any one or more of a component that aids the cell culture process.

As used herein, the term "subject" and "patient" as used herein interchangeably refers to any vertebrate, including, but not limited to, a mammal (e.g., cow, pig, camel, llama, horse, goat, rabbit, sheep, hamsters, guinea pig, cat, dog, rat, and mouse, a non-human primate (e.g., a monkey, such as a cynomolgus or rhesus monkey, chimpanzee, etc.) and a human). In some embodiments, the subject may be a human or a non-human. In one embodiment, the subject is a human. The subject or patient may be undergoing various forms of treatment.

As used herein, the term "treat," "treating" or "treatment" are each used interchangeably herein to describe reversing, alleviating, or inhibiting the progress of a disease and/or injury, or one or more symptoms of such disease, to which such term applies. Depending on the condition of the subject, the term also refers to preventing a disease, and includes preventing the onset of a disease, or preventing the symptoms associated with a disease. A treatment may be either performed in an acute or chronic way. The term also refers to reducing the severity of a disease or symptoms associated with such disease prior to affliction with the disease. Such prevention or reduction of the severity of a disease prior to affliction refers to administration of a treatment to a subject that is not at the time of administration afflicted with the disease. "Preventing" also refers to preventing the recurrence of a disease or of one or more symptoms associated with such disease.

Unless otherwise defined herein, scientific and technical terms used in connection with the present disclosure shall have the meanings that are commonly understood by those of ordinary skill in the art. For example, any nomenclatures used in connection with, and techniques of, cell and tissue culture, molecular biology, immunology, microbiology, genetics and protein and nucleic acid chemistry and hybridization described herein are those that are well known and commonly used in the art. The meaning and scope of the terms should be clear; in the event, however of any latent ambiguity, definitions provided herein take precedent over any dictionary or extrinsic definition. Further, unless otherwise required by context, singular terms shall include pluralities and plural terms shall include the singular.

2. COMPOSITIONS AND METHODS

Embodiments of the present disclosure include compositions and methods related to the derivation of trophoblast stem cells. In particular, the present disclosure provides novel formulations and methods for deriving and maintaining trophoblast stem cells from human pluripotent stem cells, which can be used for basic research purposes, for developing treatments for pregnancy-associated pathologies such as preeclampsia, recurrent loss of pregnancy, placenta accreta, and intrauterine growth restriction, and developing diagnostics for assessing endometrial receptivity to embryo implantation.

In accordance with these embodiments, the cell culture medium formulations provided herein generally include chemically defined medium, or growth medium suitable for the in vitro cell culture of human or animal cells. As would be recognized by one of ordinary skill in the art, serum-free media and chemically defined media are distinct. For example, serum-free media may contain undefined animal-derived products such as serum (purified from blood), hydrolysates, growth factors, hormones, carrier proteins, and attachment factors. These undefined animal-derived products will contain complex contaminants, such as the lipid content of albumin. In contrast, chemically defined media requires that the components be identified and have their exact concentrations known and is generally free of animal-derived components (e.g., fetal bovine serum, bovine serum, human serum).

As described herein, one embodiment of the chemically defined cell culture medium used in the formulations of the present disclosure includes E7TM medium, which is E8™ medium that lacks TGFβ. In some embodiments, the chemically defined cell culture medium used in the formulations of the present disclosure includes TeSR™-E7™ medium. In other embodiments, the chemically defined cell culture medium used in the formulations of the present disclosure includes E6™ medium, which is E7™ medium that lacks FGF2. In some embodiments, the chemically defined cell culture medium used in the formulations of the present disclosure includes TeSR™-E6™ medium.

In some embodiments, the chemically defined cell culture medium of the present disclosure is capable of inducing differentiation of human embryonic stem cells (hESCs) into cytotrophoblasts (CTBs) or CTB-like cells. In accordance with these embodiments, the medium can include a sphingosine 1-phosphate receptor (STPR) agonist, an activin/nodal inhibitor, and at least one growth factor.

In some embodiments, the S1PR agonist is an agonist of S1PR1 or S1PR3. In some embodiments, the S1PR agonist can include, but is not limited to, CYM5442, CYM5541, CYM55220, A971432, Ceralifimod, CS2100, CYM50260, CYM50308, FTY720, GSK2018682, RP001, SEW2871, TC-G1006, TC-SP14, and any derivatives or variants thereof. In some embodiments, a combination of S1PR agonists can be used.

In some embodiments, the activin/nodal inhibitor can include, but is not limited to, SB431542, A83-01, and any derivatives or variants thereof. In some embodiments, a combination of activin/nodal inhibitors can be used.

In some embodiments, the chemically defined cell culture medium used in the formulations of the present disclosure can include one or more growth factors. In some embodiments, the growth factor is bone morphogenic protein-4 (BMP4).

In some embodiments, the chemically defined cell culture medium used in the formulations of the present disclosure can include one or more chemical compounds to enhance one or more aspects of the formulation. In some embodiments, the medium can include ascorbic acid. In some embodiments, the ascorbic acid is present in the medium at a concentration ranging from about 0.5 µg/ml to about 40 µg/ml.

In some embodiments, the medium further comprises glucose. In some embodiments, the medium includes glucose at a concentration of 20 mM or less. In some embodiments, the medium includes glucose at a concentration of 19 mM or less. In some embodiments, the medium includes glucose at a concentration of 18 mM or less. In some embodiments, the medium includes glucose at a concentration of 17 mM or less. In some embodiments, the medium includes glucose at a concentration of 16 mM or less. In some embodiments, the medium includes glucose at a concentration of 15 mM or less. In some embodiments, the medium includes glucose at a concentration of 14 mM or less. In some embodiments, the medium includes glucose at a concentration of 13 mM or less. In some embodiments, the medium includes glucose at a concentration of 12 mM or less. In some embodiments, the medium includes glucose at a concentration of 11 mM or less. In some embodiments, the medium includes glucose at a concentration of 10 mM or less. In some embodiments, the medium includes glucose at a concentration of 9 mM or less. In some embodiments, the medium includes glucose at a concentration of 8 mM or less. In some embodiments, the medium includes glucose at a concentration of 7 mM or less. In some embodiments, the medium includes glucose at a concentration of 6 mM or less. In some embodiments, the medium includes glucose at a concentration of 5 mM or less. In some embodiments, the medium includes glucose at a concentration of 4 mM or less. In some embodiments, the medium includes glucose at a concentration of 3 mM or less. In some embodiments, the medium includes glucose at a concentration of 2 mM or less. In some embodiments, the medium includes glucose at a concentration of 1 mM or less.

In some embodiments, the medium includes glucose at a concentration ranging from about 1 mM to about 20 mM. In some embodiments, the medium includes glucose at a concentration ranging from about 1 mM to about 18 mM. In some embodiments, the medium includes glucose at a concentration ranging from about 1 mM to about 16 mM. In some embodiments, the medium includes glucose at a concentration ranging from about 1 mM to about 14 mM. In some embodiments, the medium includes glucose at a concentration ranging from about 1 mM to about 12 mM. In some embodiments, the medium includes glucose at a concentration ranging from about 1 mM to about 10 mM. In some embodiments, the medium includes glucose at a concentration ranging from about 1 mM to about 9 mM. In some embodiments, the medium includes glucose at a concentration ranging from about 1 mM to about 8 mM. In some embodiments, the medium includes glucose at a concentration ranging from about 1 mM to about 7 mM. In some embodiments, the medium includes glucose at a concentration ranging from about 1 mM to about 6 mM. In some embodiments, the medium includes glucose at a concentration ranging from about 1 mM to about 5 mM. In some embodiments, the medium includes glucose at a concentration ranging from about 2 mM to about 20 mM. In some embodiments, the medium includes glucose at a concentration ranging from about 3 mM to about 15 mM. In some embodiments, the medium includes glucose at a concentration ranging from about 4 mM to about 10 mM. In some embodiments, the medium includes glucose at a concentration ranging from about 5 mM to about 20 mM. In some embodiments, the medium includes glucose at a concentration ranging from about 5 mM to about 15 mM. In some embodiments, the medium includes glucose at a concentration ranging from about 5 mM to about 10 mM. In some embodiments, the medium includes glucose at a concentration ranging from about 2 mM to about 8 mM. In some embodiments, the medium includes glucose at a concentration ranging from about 3 mM to about 6 mM. In some embodiments, the medium includes glucose at a concentration ranging from about 4 mM to about 5 mM.

In some embodiments, CTBs cultured in the chemically defined cell culture medium of the present disclosure can exhibit altered expression of one or more of CDX2, TFAP2C, YAP, ELF5, TEAD4, KRT7, p63, GATA3, HAND1, or any combinations thereof. Altered expression can include decreases or increases in expression of these genes/proteins, which reflect, or are characteristic of, CTBs or CTB-like cells. Other phenotypic characteristics of CTBs or CTB-like cells can also be assessed. For example, in some embodiments, the CTBs can form a spherical structure (e.g., trophectoderm sphere).

Embodiments of the present disclosure also include methods for inducing differentiation of human embryonic stem cells (hESCs) into cytotrophoblasts (CTBs) or CTB like cells. In accordance with these embodiments, the method can include culturing the hESCs in the chemically defined cell culture medium described herein, and assessing the hESCs for one or more phenotypic characteristics of CTBs (e.g., biomarker expression, trophectoderm sphere formation, etc.).

In some embodiments, the chemically defined cell culture medium of the present disclosure is capable of inducing and maintaining differentiation of human cytotrophoblasts (CTBs) or CTB-like cells into trophoblast stem cells (hTSCs). In accordance with these embodiments, the medium can include a sphingosine 1-phosphate receptor (STPR) agonist, a GSK3β inhibitor, a TGFβ inhibitor, and at least one growth factor.

In some embodiments, the S1PR agonist is an agonist of S1PR1, S1PR2, or S1PR3. In some embodiments, the S1PR agonist is an agonist of S1PR3. In some embodiments, the S1PR agonist includes, but is not limited to, CYM5442, CYM5541, CYM55220, A971432, Ceralifimod, CS2100, CYM50260, CYM50308, FTY720, GSK2018682, RP001, SEW2871, TC-G1006, TC-SP14, and any derivatives or variants thereof. In some embodiments, a combination of S1PR1, S1PR2, or S1PR3 agonists can be used.

In some embodiments, the GSK3β inhibitor can include, but is not limited to, CHIR99021 and any derivatives or variants thereof.

In some embodiments, the chemically defined cell culture medium used in the formulations of the present disclosure can include one or more growth factors. In some embodiments, the at least one growth factor is from the fibroblast growth factor (FGF) family of growth factors. In some embodiments, the growth factor includes fibroblast growth factor 7 (FGF7), fibroblast growth factor 10 (FGF10), and any derivatives or variants thereof. In some embodiments, a combination of FGF growth factors can be used.

In some embodiments, the chemically defined cell culture medium used in the formulations of the present disclosure can include one or more chemical compounds to enhance one or more aspects of the formulation. In some embodiments, the medium can include ascorbic acid. In some embodiments, the ascorbic acid is present in the medium at a concentration ranging from about 0.5 µg/ml to about 40 µg/ml.

In some embodiments, hTSCs cultured in the chemically defined cell culture medium of the present disclosure can exhibit altered expression of one or more of CDX2, TFAP2C, YAP, ELF5, TEAD4, KRT7, p63, GATA3, HAND1, or any combinations thereof. Altered expression can include decreases or increases in expression of these genes/proteins, which reflect, or are characteristic of, hTSCs or hTSC-like cells. Other phenotypic characteristics of hTSCs or hTSC-like cells can also be assessed. For example, in some embodiments, the hTSCs or hTSC-like cells can form a spherical structure (e.g., trophectoderm sphere).

Embodiments of the present disclosure also include methods for inducing and maintaining differentiation of human cytotrophoblasts (CTBs) or CTB-like cells into trophoblast stem cells (hTSCs). In accordance with these embodiments, the method can include culturing the CTBs or CTB-like cells in the chemically defined cell culture medium described herein, and assessing the CTBs or CTB-like cells for one or more phenotypic characteristics of hTSCs (e.g., biomarker expression, trophectoderm sphere formation, etc.).

In some embodiments, assessing the CTBs or CTB-like cells comprises measuring or detecting at least one of CDX2, TFAP2C, YAP, ELF5, TEAD4, KRT7, p63, GATA3, and HAND1. In some embodiments, assessing the CTBs or CTB-like cells comprises measuring or detecting at least two of CDX2, TFAP2C, YAP, ELF5, TEAD4, KRT7, p63, GATA3, and HAND1. In some embodiments, assessing the CTBs or CTB-like cells comprises measuring or detecting at least three of CDX2, TFAP2C, YAP, ELF5, TEAD4, KRT7, p63, GATA3, and HAND1. In some embodiments, assessing the CTBs or CTB-like cells comprises measuring or detecting at least four of CDX2, TFAP2C, YAP, ELF5, TEAD4, KRT7, p63, GATA3, and HAND1. In some embodiments, assessing the CTBs or CTB-like cells comprises measuring or detecting at least five of CDX2, TFAP2C, YAP, ELF5, TEAD4, KRT7, p63, GATA3, and HAND1. In some embodiments, assessing the CTBs or CTB-like cells comprises measuring or detecting at least six of CDX2, TFAP2C, YAP, ELF5, TEAD4, KRT7, p63, GATA3, and HAND1. In some embodiments, assessing the CTBs or CTB-like cells comprises measuring or detecting at least seven of CDX2, TFAP2C, YAP, ELF5, TEAD4, KRT7, p63, GATA3, and HAND1. In some embodiments, assessing the CTBs or CTB-like cells comprises measuring or detecting at least eight of CDX2, TFAP2C, YAP, ELF5, TEAD4, KRT7, p63, GATA3, and HAND1. In some embodiments, assessing the CTBs or CTB-like cells comprises measuring or detecting all nine of CDX2, TFAP2C, YAP, ELF5, TEAD4, KRT7, p63, GATA3, and HAND1.

In some embodiments, assessing the CTBs or CTB-like cells comprises determining the shape or dimensions of the CTBs or CTB-like cells. In some embodiments, determining the shape or dimensions of the CTBs or CTB-like cells indicates whether they have formed a spherical structure and are considered hTSCs.

3. MATERIALS AND METHODS

Culture of hESCs and hiPSCs. H1 and H9 hESCs and SBli006-A hiPSCs were cultured on plates coated with vitronectin (5 μg/ml) at room temperature for at least one hour. Cells were cultured in 2 ml of TeSR™-E8™ medium at 37° C. in 5% $CO_2$ in 6-well plates and culture medium was replaced every day. When cells reached confluency, they were passaged using ReLeSR™ according to the manufacturer's protocol, at a 1:10 split ratio.

Differentiation of hPSCs (6 days protocol). The day after passaging, differentiation was initiated in H1 or H9 hESCs by treatment with S1P (10 μM), SB431542 (25 μM) and BMP4 (20 ng/ml) in TeSR™-E7™ for 6 days. In some experiments, the S1PR agonists CYM5442 hydrochloride (10 nM), CYM5520 (5 μM), or CYM5541 (2 μM) was added during the differentiation process. The medium was replaced every day. At day 6 of treatment, cells were dissociated with TrypLE™ for 5 min at 37° C. For differentiation to EVTs, cells were seeded in a 6-well plate pre-coated with 5 μg/ml of vitronectin at a density of $7 \times 10^4$ cells per well and cultured in 2 ml of EVT medium (TeSR™-E8™ medium supplemented with SB431542 (25 μM) and EGF (2.5 ng/ml)). Medium was replaced every other day and analyzed at day 12 of total treatment. For differentiation to STB, cells were seeded in a 6-well plate pre-coated with 5 μg/ml of vitronectin at a density of $4 \times 10^4$ cells per well and cultured in 2 ml of STB medium (TeSR™-E6™ supplemented with Activin A (20 ng/ml) and EGF (50 ng/ml)). Medium was replaced every other day and analyzed at day 14 of total treatment.

Differentiation of hPSCs to hPSC-TS$^{CDX2}$ and hPSC-TS cells. The day after passaging, hESCs or hiPSCs were differentiated by treatment with CYM5541 (2 μM), SB431542 (25 μM), BMP4 (20 ng/ml) in TeSR™-E7™ for 2 and 3 days for H1 and H9 hESCs, respectively. The medium was replaced every day. After 2 or 3 days of treatment, cells were dissociated with TrypLE™ for 5 minutes at 37° C. For propagation of hPSC-TS$^{CDX2}$ cells, all cells were seeded in a 6-well plate pre-coated with 3 μg/ml of vitronectin and 1 μg/ml of Laminin 521 at a density of $\sim 5 \times 10^4$ cells per well and cultured in 2 ml of TM4 medium (TeSR™-E6™ medium supplemented with CYM5541 (2 μM), A 83-01 (0.5 μM), FGF10 (25 ng/ml) and CHIR99021 (2 μM)). For establishment of hPSC-TS cells, all cells were seeded in a 6-well plate pre-coated with 3 μg/ml of vitronectin and 1 μg/ml of Laminin 521 at a density of $\sim 5 \times 10^4$ cells per well and cultured in 2 ml of TSCM developed by Okae et al. (2018) (DMEM/F12 supplemented with 0.1 mM 2-mercaptoethanol, 0.2% FBS, 0.5% Penicillin-Streptomycin, 0.3% BSA, 1% ITS-X supplement, 1.5 μg/ml L-ascorbic acid, 50 ng/ml EGF, 2 μM CHIR99021, 0.5 μM A83-01, 1 μM SB431542, 0.8 mM VPA and 5 μM Y27632). hPSC-TS$^{CDX2}$ cells were directly passaged into TSCM for formation of hPSC-TS cells s; complete transition took ~5 passages. Alternatively, hPSCs after 2 or 3 days of differentiation were directly passaged into TSCM.

Culture of hPSC-TS$^{CDX2}$ and hPSC-TS cells. hPSC-TS$^{CDX2}$ and hPSC-TS cells were cultured in TM4 and TSCM, respectively, in 2 ml of culture medium at 37C in 5% $CO_2$. Culture medium was replaced every 2 days. When hPSC-TS$^{CDX2}$ and hPSC-TS cells reached 70-90% confluence, they were dissociated with TrypLE™ at 37° C. for 5-10 minutes and passaged to a new 6-well plate pre-coated with 3 μg/ml of vitronectin and 1 μg/ml of Laminin 521 at a 1:3-1:4 split ratio for hPSC-TS$^{CDX2}$ and 1:4-1:6 split ratio for hPSC-TS cells. hPSC-TS$^{CDX2}$ cells grown in TM4 medium were supplemented with Y-27632 upon passage to aid in single cell attachment. Cells were routinely passaged approximately every 4-6 days. hPSC-TS$^{CDX2}$ and hPSC-TS cells at passages 5$^+$ were used for analysis, with the exception of one replicate of H1-derived hPSC-TS$^{CDX2}$ used in RNA-sequencing analysis where cells at passage 2 in TM4 were used. Placenta-derived TS cells—CT30 (female) and CT29 (male), a kind gift from Drs. Hiroaki Okae and Takahiro Arima (Tohoku University, (Okae et al., 2018))—were grown and passaged the same way in TSCM as hPSC-TS cells.

Differentiation of hPSC-TS$^{CDX2}$ and hPSC-TS cells. hPSC-TS cells were grown to ~80-90% confluence in TSCM and dissociated with TrypLE™ for 10 min at 37° C. For differentiation to EVTs and STB, slightly modified versions of protocols developed by Okae et al. (2018) were used. For differentiation to EVTs, hPSC-TS cells were seeded in 6-well plates pre-coated with 3 μg/ml vitronectin and 1 μg/ml of Laminin 521 at a density of $1.25 \times 10^5$ cells per well and cultured in 2 mL of EVT medium (DMEM/F12 supplemented with 0.1 mM 2-mercaptoethanol, 0.5% Penicillin-Streptomycin, 0.3% BSA, 1% ITS-X supplement, 100 ng/ml NRG1, 7.5 μM A83-01, 2.5 μM Y27632, and 4% KSR). MATRIGEL was added to a final media concentration of 2% after suspending the cells in EVT medium. At day 3, the medium was replaced with the EVT medium without NRG1, and MATRIGEL was added to a final concentration of 0.5%. At day 6, cells were dissociated with TrypLE™ for 15 min at 37° C. and passaged to a new vitronectin/laminin-coated 6-well plates at a 1:2 split ratio. The cells were suspended in the EVT medium without NRG1 and KSR.

MATRIGEL was added to a final concentration of 0.5%, and cells were analyzed after two additional days of culturing. For differentiation to STB, cells were seeded in 6-well plates pre-coated 3 µg/ml vitronectin and 1 µg/ml of Laminin 521 at a density of 1.5 $\lambda 10^5$ cells per well and cultured in 2 mL of DMEM/F12 supplemented with 0.1 mM 2-mercaptoethanol, 0.5% Penicillin-Streptomycin, 0.3% BSA, 1% ITS-X supplement, 2.5 µM Y27632, 2 µM forskolin, and 4% KSR. The medium was replaced at day 3, and cells were analyzed at day 6.

RNA Isolation, cDNA synthesis and Quantitative PCR. RNA was isolated using TRIZOL™ reagent using the manufacturer's protocol. For cDNA synthesis, the RNA pellet was dissolved in diethyl pyrocarbonate (DEPC)-treated water. The RNA was purified using Baseline-ZERO DNase buffer and Baseline-ZERO DNase enzyme and incubating at 37° C. for 30 min. The purification was stopped with Baseline-ZERO DNase stop solution and heated at 65° C. for 10 min. cDNA was synthesized using 18-mer Oligo-dT and dNTP mix and heated to 65° C. for 5 min and quickly chilled on ice. First strand buffer and DTT was added and incubated at 42° C. for 2 min then superscript II RT enzyme was added and incubated at 42° C. for 50 min. The enzyme was inactivated at 70° C. for 15 min. The cDNA was stored at −20° C. until further used. The Quantitative PCR (qPCR) reaction was carried out using SYBR Green Supermix in a C1000 Touch Thermal Cycler CFX384 Real-Time System (Rio-Rad). The primers used for qPCR analysis are listed below. ANOVA analysis of gene expression data was carried out with SAS and package PCR in R software using the ΔΔCt method to determine gene expression changes (Livak and Schmittgen, 2001). QPCR analysis was carryout out using at least 3 biological replicates.

Immunofluorescence analysis. For immunofluorescence analysis, cells were grown on glass-bottom culture dishes coated with 3 µg/ml vitronectin and 1 µg/ml of Laminin 521. Cells were fixed either using 4% paraformaldehyde in PBS for 10 min, permeabilized with 0.5% Triton X-100 for 5 min and blocked in 3% BSA/PBS with 0.1% human IgG and 0.3% Triton X-100 for 1 hr. Cells were then incubated overnight with the primary antibody diluted in blocking buffer. The following primary antibodies were used: anti-KRT7 (SCB, 1:50), anti-KRT7 (CST, 1:500), rabbit anti-hCG (1:100), mouse anti-hCG (1:100), anti-YAP (1:200), anti-TFAP2C (1:400), anti-P63 (1:600), anti-GATA3 (1:500), anti-TEAD4 (1:250), anti-CDX2 (1:300), anti-VE-Cadherin (1:400), anti-HLA-G (1:300), anti-syncytin (1:50). Corresponding isotype controls (rabbit polyclonal IgG, rabbit XP IgG, mouse IgG1, and mouse IgG2a) were used at primary antibody concentrations. ALEXA FLUOR 488- or ALEXA FLUOR 647-conjugated secondary antibodies were used as secondary antibodies. Nuclei were stained with DAPI and all samples were imaged using a Zeiss LSM 710 or 880 laser scanning confocal microscope (Carl Zeiss, Germany).

Confocal image analysis. Image analysis was conducted using an image processing algorithm created in MATLAB. First, the DAPI stain was isolated, binarized, and processed to accurately represent the number of cells in each image. The primary-antibody stain of interest was isolated and processed in the same manner. Only primary-antibody pixels that overlap DAPI pixels were considered for analysis, and the average intensities of those pixels were measured and correlated to the nearest nuclei. This was performed for one control image and multiple experimental images. Each cell in the experimental images was considered positively stained if the average intensity of that cell was greater than the average intensity of all of the cells in the control image. Statistical analysis was done using a two-tailed t-test evaluating percent positive cells from different treatment periods.

Flow cytometry analysis. For flow cytometry analysis, cells were dissociated with TrypLE™ for 5 min at 37° C. Cells were fixed in suspension in 2% paraformaldehyde in PBS for 5 minutes at room temperature. Cells were permeabilized and blocked in 1% BSA/PBS with 1 mg/mL Saponin (Sigma 47036-50G-F) for 15 minutes at room temperature. Cells were then incubated for one hour on ice with the primary antibody diluted in the blocking buffer. The corresponding isotype control was used at the primary antibody concentration. Subsequently, cells were incubated in an ALEXA FLUOR 488-conjugated secondary antibody on ice protected from light for one hour and analyzed immediately in a 1% BSA/PBS buffer. A BD Accuri C6 Plus Flow Cytometer was used for analysis. Data from 10,000 events were collected.

RNA sequencing analysis using next generation sequencing. Total RNA was extracted with TRIZOL™ reagent using manufacturer's protocol. RNA was purified using GeneJET RNA Purification Kit using manufacturer's protocol. Isolated RNA samples were then used to evaluate genome-wide mRNA expression profiles using next generation RNA-sequencing, conducted at GENEWIZ, LLC. (South Plainfield, NJ, USA). RNA samples received at GENEWIZ were quantified using Qubit 2.0 Fluorometer (Life Technologies, Carlsbad, CA, USA) and RNA integrity was checked using Agilent TapeStation 4200 (Agilent Technologies, Palo Alto, CA, USA).

RNA sequencing libraries were prepared using the NEBNext Ultra RNA Library Prep Kit for ILLUMINA following manufacturer's instructions (NEB, Ipswich, MA, USA). Briefly, mRNAs were first enriched with Oligo(dT) beads. Enriched mRNAs were fragmented for 15 minutes at 94° C. First strand and second strand cDNAs were subsequently synthesized. cDNA fragments were end repaired and adenylated at 3'ends, and universal adapters were ligated to cDNA fragments, followed by index addition and library enrichment by limited-cycle PCR. The sequencing libraries were validated on the Agilent TapeStation (Agilent Technologies, Palo Alto, CA, USA), and quantified by using Qubit 2.0 Fluorometer (Invitrogen, Carlsbad, CA) as well as by quantitative PCR (KAPA Biosystems, Wilmington, MA, USA).

The sequencing libraries were clustered on 4 lanes of a flowcell. After clustering, the flowcell was loaded on the ILLUMINA HiSeq™ 4000 instrument according to manufacturer's instructions. The samples were sequenced using a 2×150 bp Paired End (PE) configuration. Image analysis and base calling were conducted by the HiSeq™ Control Software (HCS). Raw sequence data (.bcl files) generated from ILLUMINA HiSeq™ was converted into fastq files and de-multiplexed using ILLUMINA's bcl2fastq 2.17 software. One mismatch was allowed for index sequence identification.

After investigating the quality of the raw data, sequence reads were trimmed to remove possible adapter sequences and nucleotides with poor quality using Trimmomatic v.0.36. The trimmed reads were mapped to the *Homo sapiens* GRCh38 reference genome available on ENSEMBL using the STAR aligner v.2.5.2b. The STAR aligner is a splice aligner that detects splice junctions and incorporates them to help align the entire read sequences. BAM files were generated as a result of this step. Unique gene hit counts were calculated by using feature Counts from the Subread package v.1.5.2. Only unique reads that fell within exon regions were counted.

Analysis of gene expression profiles. After extraction of gene hit counts, the gene hit counts table was used for downstream differential expression analysis. Genome-wide RNA sequencing count data were processed and statistically assessed using the DESeq2 package (v1.22.2) in R Software (3.6.0) (The R Foundation, 2019). Count data were first filtered to include transcripts expressed above background, requiring the median across samples to be greater than the overall median signal intensity, as implemented in DESeq2. Count data were then normalized by median signal intensity using algorithms enabled within DESeq2, resulting in variance stabilized expression values (Love et al., 2014). These normalized values were used to carry out a principal component analysis (PCA) comparing data-reduced global expression signatures across samples. Principal components were calculated and visualized using the prcomp function in R (R-core, 2019). The average gene expression levels of different cell types was compared using the Spearman rank correlation test. Transcriptome profiles obtained by single cell RNA sequencing of human embryos, and annotated as trophectoderm (Petropoulos et al., 2016), were combined for comparison with gene expression data from human trophectoderm cells. Heat maps were generated using Partek® Genomics Suite Software (v7.18.0723) and gene-specific plots using GraphPad Prism Software (v8.2.0)), based on normalized expression values.

Statistical and gene set enrichment analysis of differentially expressed genes. Genes that showed the greatest difference in expression between the day 3 differentiated hESCs and undifferentiated hESCs, and hPSC-TS$^{CDX2}$ and hPSC-TS cells were identified using an analysis of variance analysis (ANOVA) comparing the normalized expression levels between these two groups. Genes showing the greatest difference in expression between hPSC-TS$^{CDX2}$ and hPSC-TS cells were identified using the following statistical filters: (1) a false discovery rate-corrected q-value<0.05 (Storey, 2003), and (2) a fold change in expression (ratio of average across hPSC-TS$^{CDX2}$ and hPSC-TS cells samples) ±1.5. To evaluate the biological role of these genes, a gene set enrichment analysis was carried out on the genes identified as significantly differentially expressed between groups. Specifically, all Gene Ontology (GO) gene sets (n=9996) from the Molecular Signature Database (MSigDB) (The Broad Institute, 2019) were queried for using the right-tailed Fisher's Exact test, as enabled through the 'platform for integrative analysis of omics data' (PIANO) packing in R (Varemo et al., 2013). Gene sets were required to have an enrichment p-value<0.01 to be considered significant, consistent with previously published methods (Klaren et al., 2019; Rager et al., 2019). Genes that were identified at higher expression levels were evaluated separately from genes identified at significantly lower expression levels in day 3 differentiated hESCs vs. undifferentiated hESCs, and hPSC-TS$^{CDX2}$ vs. hPSC-TS cells.

TABLE 1

| Reagents and resources | | |
|---|---|---|
| REAGENT or RESOURCE | SOURCE | IDENTIFIER |
| Antibodies | | |
| Anti-KRT7 | Santa Cruz Biotechnology | Cat#sc-23876, RRID:AB_2265604 |
| Anti-KRT7 | Cell Signaling Technologies | Cat# 4465, RRID:AB_11178382 |
| Anti-hCG | Abcam | Cat# ab9582, RRID:AB_296507 |
| Anti-hCG | Abcam | Cat# ab9376, RRID:AB_307221 |
| Anti-P63 | Cell Signaling Technologies | Cat# 13109, RRID:AB_2637091 |
| Anti-GATA3 | Cell Signaling Technologies | Cat# 5852, RRID:AB_10835690 |
| Anti-TFAP2C | Cell Signaling Technologies | Cat# 2320, RRID:AB_2202287 |
| Anti-YAP | Cell Signaling Technologies | Cat# 4912, RRID:AB_2218911 |
| Anti-TEAD4 | Abcam | Cat# ab58310, RRID:AB_945789 |
| Anti-CDX2 | Abcam | Cat# ab76541, RRID:AB_1523334 |
| Anti-VE-Cadherin | Cell Signaling Technologies | Cat# 2500, RRID:AB_10839118 |
| Anti-HLA-G | Abcam | Cat# ab52455, RRID:AB_880552 |
| Anti-Syncytin | Santa Cruz Biotechnology | Cat# sc-50369, RRID:AB_2101536 |
| Rabbit Polyclonal IgG | R&D Systems | Cat# AB-105-C, RRID:AB_354266 |
| Rabbit XP IgG | Cell Signaling Technologies | Cat# 3900, RRID:AB_1550038 |
| Mouse IgG1 | Abcam | Cat# ab18447, RRID:AB_2722536 |
| Mouse IgG2a | Abcam | Cat# 554126, RRID:AB_479661 |
| Alexa Fluor 488-conjugated anti-rabbit IgG | Thermo Fisher Scientific | Cat# A-11034, RRID:AB_2576217 |
| Alexa Fluor 647-conjugated | Thermo Fisher Scientific | Cat# A-21052, |

TABLE 1-continued

Reagents and resources

| REAGENT or RESOURCE | SOURCE | IDENTIFIER |
|---|---|---|
| anti-rabbit IgG | | RRID:AB_2535719 |
| DAPI | R&D Systems | Cat#5748 |
| CellMask deep red plasma membrane stain | Invitrogen | Cat#C10046 |
| Chemicals, Peptides, and Recombinant Proteins | | |
| TrypLE ™ | Thermo Fisher Scientific | Cat#12604013 |
| Vitronectin | Thermo Fisher Scientific | Cat#A14700 |
| Laminin 521 | Stem Cell Technologies | Cat#77003 |
| Human FGF-10 | Stem Cell Technologies | Cat#78037 |
| TeSR-E8 ™ | Stem Cell Technologies | Cat#05990 |
| TeSR-E7 ™ | Stem Cell Technologies | Cat#05914 |
| TeSR-E6 ™ | Stem Cell Technologies | Cat#05946 |
| ReLeSR ™ | Stem Cell Technologies | Cat#05872 |
| Sphingosine-1-phosphate | Tocris | Cat#1370 |
| D-erythro-dihydrosphingosine-1-phosphate | Abcam | Cat#ab141750 |
| SB431542 | Tocris | Cat#1614 |
| BMP4 | Thermo Fisher Scientific | Cat#PHC9534 |
| CYM5442 hydrochloride | Tocris | Cat#3601 |
| CYM5520 | Tocris | Cat#5418 |
| CYM5541 | Tocris | Cat#4897 |
| Y-27632 dihydrochloride | Tocris | Cat#1254 |
| EGF | R&D Systems | Cat#236-EG |
| Doxycycline hyclate | Tocris | Cat#4090 |
| Puromycin dihydrochloride | Tocris | Cat#4089 |
| Activin A | R&D Systems | Cat#338-AC |
| Greiner Bio-one Cell View glass plates | Greiner Bio-one | Cat#627965 |
| 4% Paraformaldehyde in PBS | Thermo Fisher Scientific | Cat#R37814 |
| Triton X-100 | Sigma | Cat#T8787 |
| PBS w/o CaMg | Sigma | Cat#D5773 |
| PBS w/ CaMg | Sigma | Cat#D8662 |
| Human IgG | Immunoreagents | Cat#Hu-003-C |
| BSA | Fisher Scientific | Cat#BP9703 |
| 10% BSA fatty acid free in PBS | Sigma | Cat#A1595 |
| VPA | Sigma | Cat#P6273 |
| A83-01 | Tocris | Cat#2939 |
| 2-mercaptoethanol | Sigma | Cat#M3148 |
| FBS | Thermo Fisher Scientific | Cat#16141-061 |
| DMEM/F12 | Thermo Fisher Scientific | Cat#11320033 |
| ITS-X | Thermo Fisher Scientific | Cat#51500-056 |
| L-ascorbic acid | Sigma | Cat#A8960 |
| Pen/Strep | Thermo Fisher Scientific | Cat#15140122 |
| Forskolin | Tocris | Cat#1099 |
| Neuregulin | Cell Signaling Technologies | Cat#5218SC |
| Matrigel | Corning | Cat#354234 |
| KSR | Thermo Fisher Scientific | Cat#10828028 |
| TRIZOL ™ Reagent | Thermo Fisher Scientific | Cat#15596018 |
| DEPC | Sigma | Cat#95284 |
| Baseline Zero DNAase Kit | VWR | Cat#76081-624 |
| Oligo-dT | IDT | Cat#51-01-15-07 |
| dNTP mix | Thermo Fisher Scientific | Cat#10297018 |
| Superscript II RT | Thermo Fisher Scientific | Cat#18064014 |
| SYBR Green Supermix | Bio-rad | Cat#1725272 |
| Methanol | Fisher Scientific | Cat#A412-500 |
| Acetone | Fisher Scientific | Cat#A18-500 |
| Critical Commercial Kits | | |
| GeneJET RNA Purification Kit | Thermo Fisher Scientific | Cat#K0731 |
| Oligonucleotides | | |
| qPCR Primers | IDT | Methods S1 for primer sequences |
| Software and Algorithms | | |
| R (v3.6.0) | http://www.R-project.org/ | N/A |
| DESeq2 package (v1.22.2) | | |
| PCR package (v1.2.2) | | |
| SAS Software | | N/A |
| Zeiss Zen Software | https://www.zeiss.com/microscopy/us/products/microscope-sofware/zen-lite.html | N/A |

4. EXAMPLES

It will be readily apparent to those skilled in the art that other suitable modifications and adaptations of the methods of the present disclosure described herein are readily applicable and appreciable, and may be made using suitable equivalents without departing from the scope of the present disclosure or the aspects and embodiments disclosed herein. Having now described the present disclosure in detail, the same will be more clearly understood by reference to the following examples, which are merely intended only to illustrate some aspects and embodiments of the disclosure, and should not be viewed as limiting to the scope of the disclosure. The disclosures of all journal references, U.S. patents, and publications referred to herein are hereby incorporated by reference in their entireties.

The present disclosure has multiple aspects, illustrated by the following non-limiting examples.

Example 1

Figures 1A, 1B, 1C, 1D, 1E, 1F:
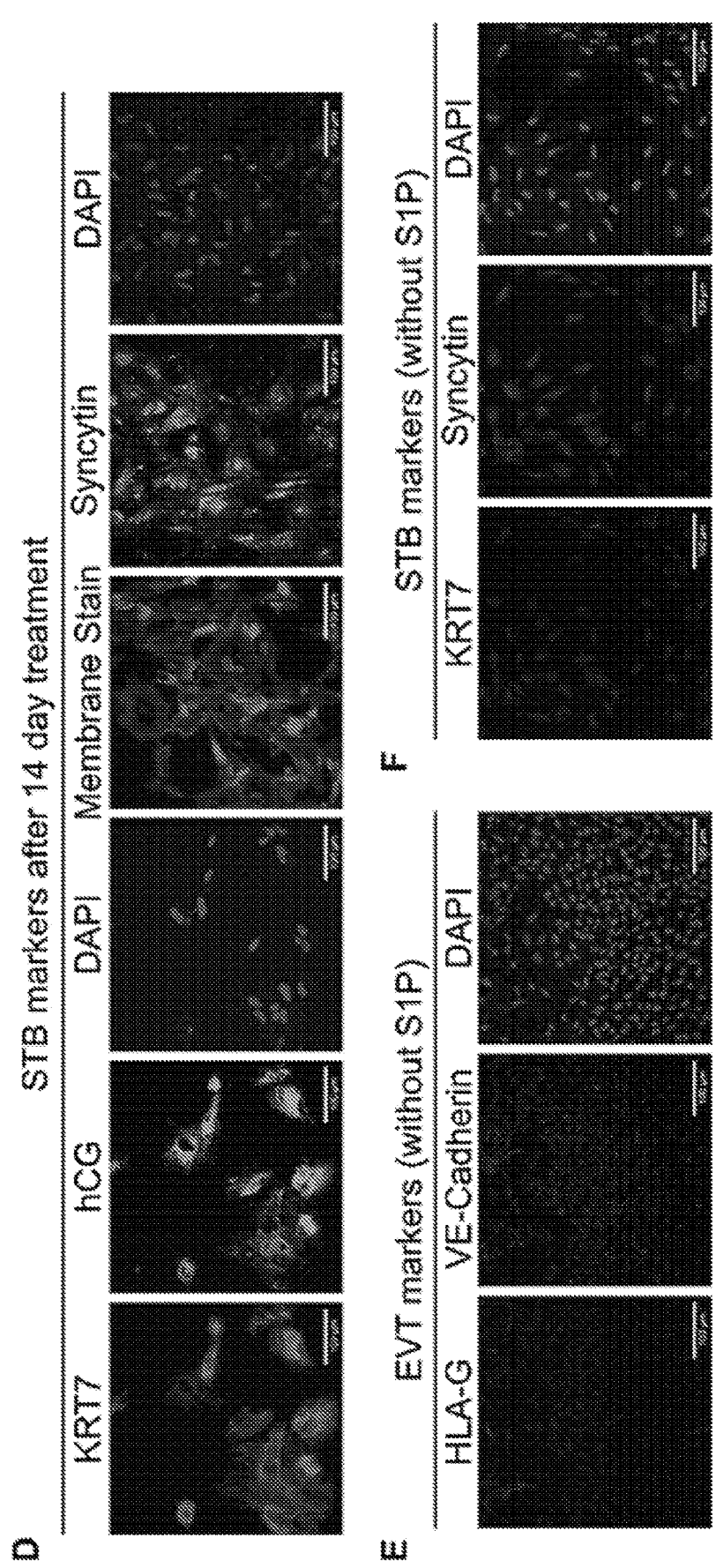
Figures 7A, 7B, 7C, 7D, 7E:
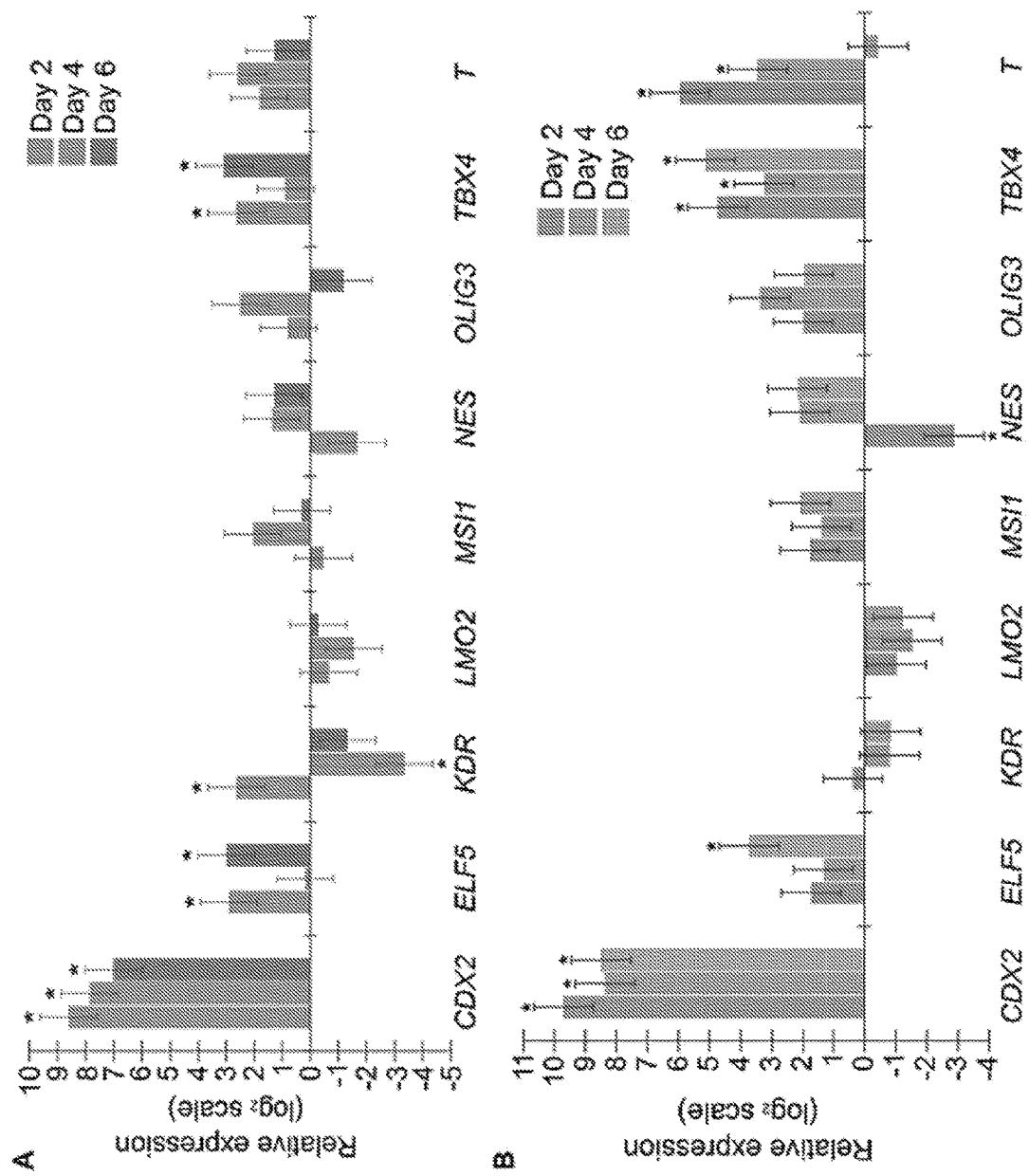
Figures 7A, 7B, 7C, 7D, 7E:
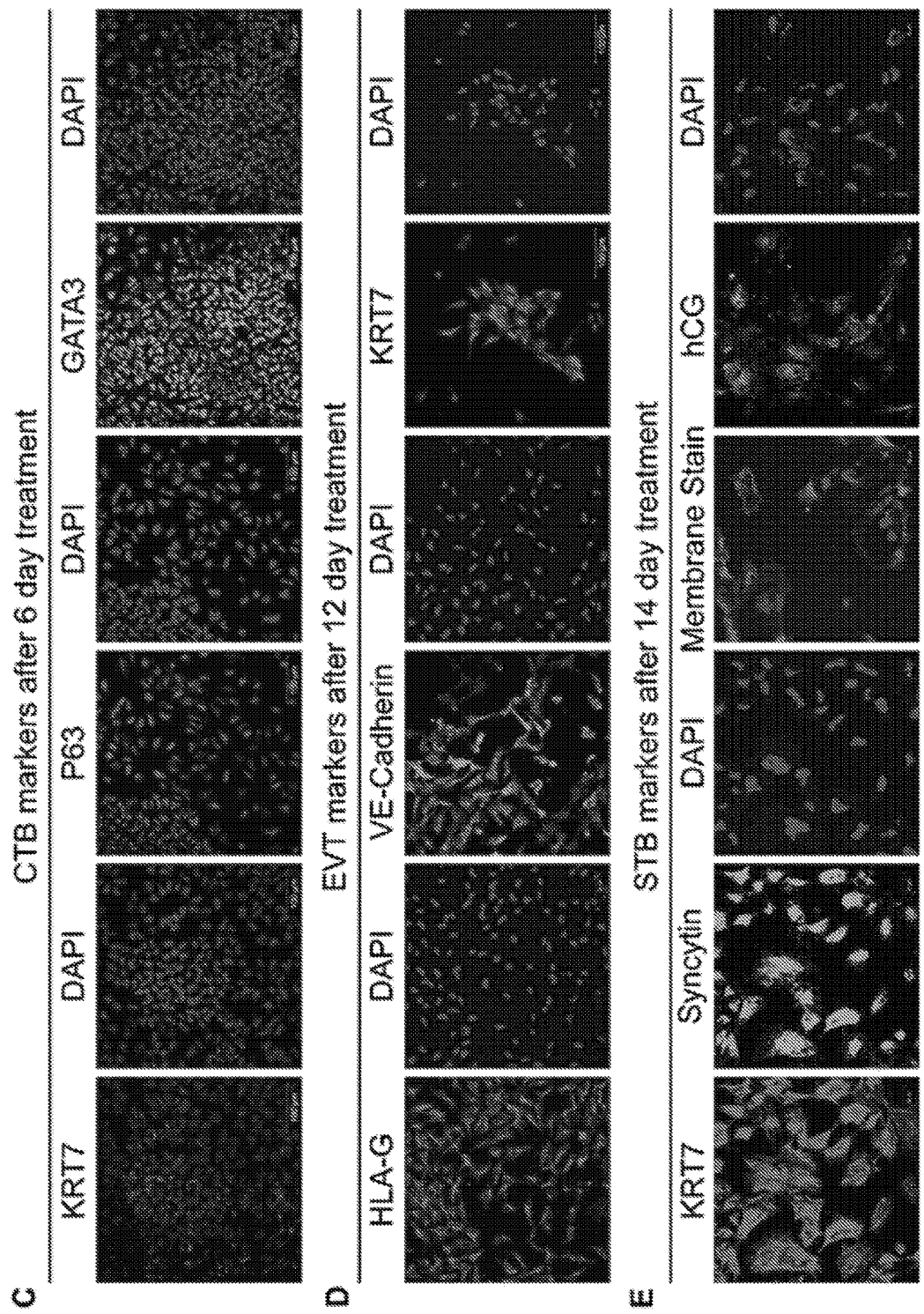

A chemically defined medium containing S1P enables differentiation of hESCs to CTB. Media formulations in previous studies on trophoblast differentiation of hESCs included components such as knockout serum replacement (KSR) or bovine serum albumin (BSA) that act as carriers for lipids. Albumin-associated lipids have been implicated in activation of G-protein coupled receptor (GPCR)-mediated signaling. For instance, the phospholipid sphingosine-1 phosphate (S1P) present in KSR can activate YAP signaling; YAP plays a critical role in specification of the trophectoderm in mouse. The use of S1P in the context of trophoblast differentiation of hESCs was investigated under chemically defined culture conditions, by modifying previous protocols that utilized KSR (Sarkar et al., 2016, 2015). H1 and H9 hESCs cultured in E8™ medium were differentiated for 6 days in E7™ medium (E8™ without transforming growth factor-beta1 (TGFβ1)) supplemented with S1P, by treatment with BMP4 and the activin/nodal inhibitor SB431542 (FIG. 1A). Under these conditions, upregulation of the CTB markers CDX2 and ELF5 was observed (FIGS. 7A-7B). Upregulation of TBX4 was observed after 6 days. However, overall there were no significant changes in markers associated with neural or mesodermal differentiation after 6 days suggesting that differentiation to these lineages did not occur (FIGS. 7A-7B). Immunofluorescence analysis at day 6 confirmed expression of the pan-trophoblast marker KRT7, and CTB markers P63 and GATA3 (FIG. 1B; FIG. 7C).

The putative CTB cells obtained at day 6 were investigated for their ability to differentiate to EVTs and STB, using protocols similar to those previously employed (Sarkar et al., 2015). Cells underwent an epithelial to mesenchymal transition over a 6-day period when passaged into E8™ medium supplemented with epidermal growth factor (EGF) and SB431542. Immunofluorescence analysis showed expression of KRT7 and the EVT markers VE-Cadherin and HLA-G (FIG. 1C; FIG. 7D). Alternatively, passaging CTB-like cells in E6™ medium (E8™ without TGFβ1 and fibroblast growth factor-2 (FGF2)) supplemented with activin and EGF resulted in formation of KRT7$^+$ multinucleate cells expressing the STB markers hCG and syncytin over an 8-day period (FIG. 1D; FIG. 7E). Removal of S1P from the medium during hESC differentiation to CTB-like cells abolished formation of EVTs that express HLA-G and VE-Cadherin (FIG. 1E; FIG. 8A) under identical differentiation conditions (FIG. 1A). Differentiation to STB also did not occur in the absence of S1P, as evidenced by lack of expression of syncytin and KRT7 (FIG. 1F; FIG. 8B). Also, downregulation of the CTB marker CDX2 and upregulation of transcripts of neural and mesoderm markers was observed in cells after 6 days of differentiation, upon removal of S1P (FIG. 8C).

Taken together, these results show that CTB-like cells can be obtained by differentiation of hESCs in a chemically defined medium containing S1P. Further, inclusion of S1P is important for hESC differentiation to trophoblast in the chemically defined culture medium of the present disclosure.

Example 2

S1P mediates its effects on trophoblast differentiation of hESCs through its receptors. S1P acts through both receptor-mediated and receptor-independent pathways. To investigate the specific mechanism of S1P action during hESC differentiation to trophoblast, S1P was replaced with D-erythro-dihydrospingosine-1-phosphate (dhS1P). dhS1P acts as an agonist for the S1P receptors (S1PRs) but does not mediate an intracellular effect (Van Brocklyn et al., 1998). Replacing S1P with dhS1P yielded similar results—CTB-like cells showed expression of CDX2, GATA3, P63, and TEAD4 (FIG. 2A; FIG. 9A). Upon further differentiation as previously described (FIG. 1A), STB expressing KRT7 and hCG, and EVT expressing HLA-G and VE-Cadherin were obtained (FIGS. 2B-2C; FIGS. 9B-9C).

S1P acts extracellularly through S1PR1-5, however TBs have been shown to only express S1PR1-3. To identify specific S1PRs involved in trophoblast differentiation of hESCs in the culture systems used herein, selective chemical agonists were used for S1PR1-3—CYM5442 hydrochloride, CYM5520 and CYM5541, respectively—to replace S1P in differentiation protocols previously discussed. Expression of CDX2, GATA3, P63, and TEAD4 was observed in CTB-like cells for all three agonists (FIG. 2A; FIG. 9A). Similarly, use of each agonist resulted in expression of the EVT markers HLA-G and VE-Cadherin, and formation of multinucleate STB expressing KRT7 and hCG (FIGS. 2B-2C; FIGS. 9B-9C). However, the intensity of CDX2 and P63 expression was higher with S1PR1 and S1PR3 agonists rather than the S1PR2 agonist. Further, nuclear P63 expression was strongest for the S1PR1 agonist compared to the S1PR3. Notably, use of the S1PR2 agonist resulted in lower expression of CDX2, strong cytoplasmic expression of P63, and high heterogeneity in staining at day 6 relative to the other agonists. Formation of large multinucleated STB was more pronounced when the S1PR2 or S1PR3 agonists were used, as compared to the S1PR1 agonist. On the other hand, the S1PR1 and S1PR3 agonists enhanced formation of mesenchymal EVTs, relative to the S1PR2 agonist.

Taken together, these results show that receptor-mediated effects of exogenous S1P are sufficient for trophoblast differentiation of hESCs in the culture systems used herein. Since these qualitative observations showed that use of the S1PR3 agonist resulted in high CDX2 expression, and both multinucleate STB and mesenchymal EVTs could be obtained when the S1PR3 agonist was used, the S1PR3 agonist was chosen for subsequent studies.

Example 3

Figures 3A, 3B, 3C, 3D, 3E, 3F:
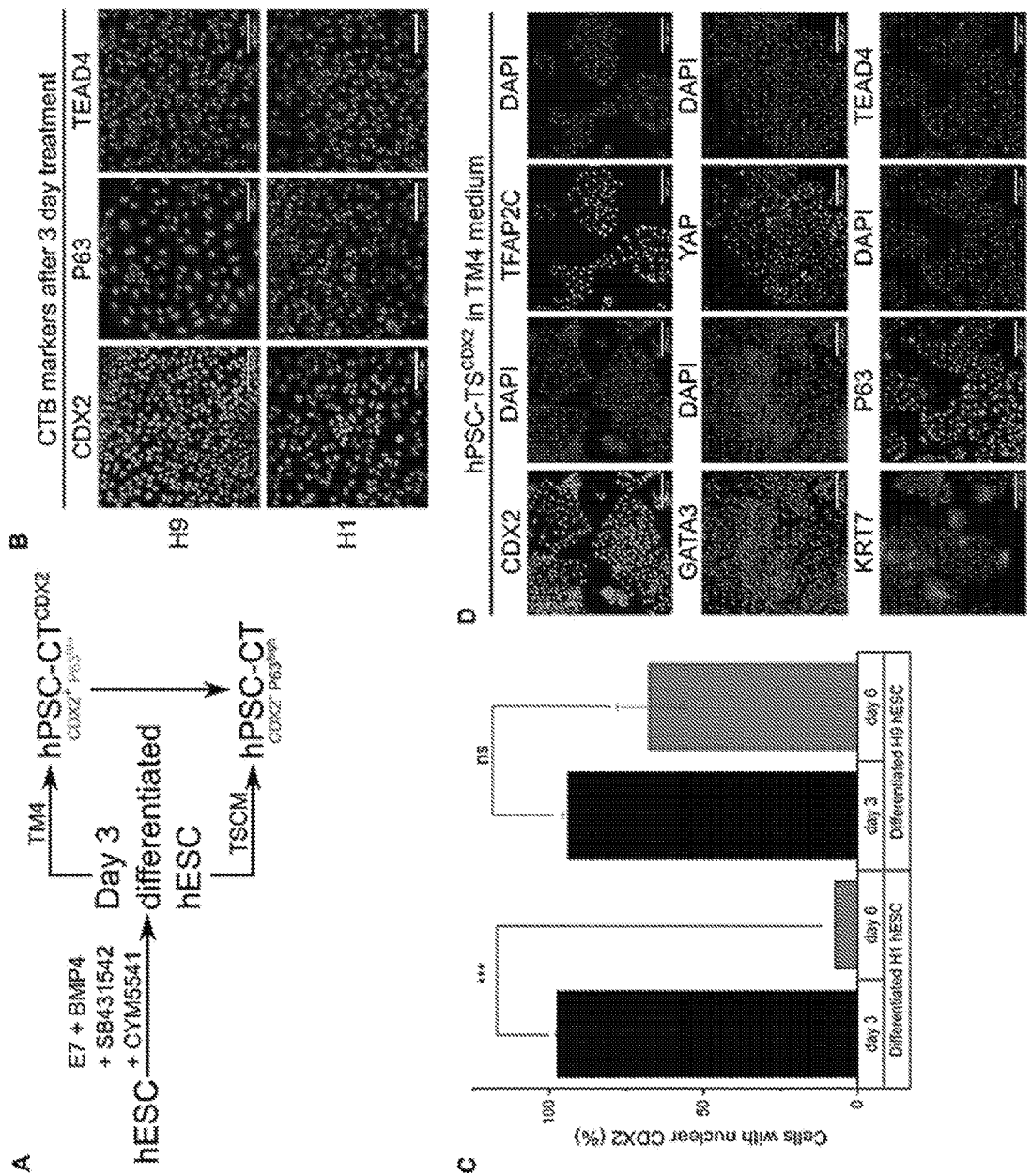
FIGS. 3A-3F: Optimizing timing of hESC differentiation enables derivation of hPSC-TS$^{CDX2}$ cells. (A) Schematic of differentiation protocol for establishment of hPSC-TS$^{CDX2}$ and hPSC-TS from hESCs. (B) Confocal images of 3-day treated H9 and H1 hESCs, staining for CDX2, P63, and TEAD4. Nuclei were stained with DAPI. Scale bars are 100 μm. (C) Quantitative analysis of cells expressing nuclear CDX2 after 3-day and 6-day differentiation treatment of H1 (day 3, n=5455; day 6, n=2448) and H9 (day 3, n=5552; day 6, n=6448) hESCs. Analysis was performed in MATLAB and at least 2 biological replicates were used. Error bars are S.E., ***$p<0.05$. (D) Confocal images of H9 hPSC-TS$^{CDX2}$ in TM4, staining for CDX2, TFAP2C, GATA3, YAP, TEAD4, and P63. Nuclei were stained with DAPI. Scale bars are 200 μm. (E) Confocal images of STB from H9 hPSC-TS$^{CDX2}$ staining for hCG and KRT7. Nuclei were stained with DAPI. Scale bars are 100 μm. (F) Confocal images of EVTs from H9 hPSC-TS$^{CDX2}$, staining for HLA-G (red) and VE-Cadherin (green) as well as KRT7 (red) and hCG (green). Nuclei were stained with DAPI. Scale bars are 200 μm.

Optimizing timing of hESC differentiation enables derivation of CDX2$^+$ TS cells. The question of whether CTB-like cells obtained by treatment of hESCs with BMP4 and SB431542 in E7™ medium supplemented with the S1PR3 agonist CYM5541 for 6 days could be passaged and maintained under conditions used for culture of blastocyst- and placenta-derived primary TS cells was investigated. Upon plating in trophoblast stem cell medium (TSCM) developed by Okae et al. (2018), hESC-derived CTB-like cells underwent differentiation, and epithelial colonies could not be retained after a single passage. CDX2 expression is upregulated significantly in as little as 2 days after initiation of hESC differentiation, but decreases by day 6 (FIGS. 7A-7B). Additionally, previous studies have reported differentiation of hESCs to CDX2$^+$/p63$^+$ cells upon treatment with BMP for 4 days (Horii et al., 2016). Therefore, the use of a shorter differentiation step for obtaining CTB-like cells was explored (FIG. 3A). After 3 days of differentiation, H9 and H1 hESCs expressed nuclear CDX2, P63, and TEAD4 uniformly (FIG. 3B). Quantitative image analysis showed that nearly all cells are CDX2$^+$ at day 3, in contrast to CTB-like cells at day 6. Notably, use of a 6-day protocol resulted in significantly reduced fraction CDX2$^+$ cells in the case of H1 hESCs in comparison to H9 hESCs; H9 cells retained CDX2$^+$ cells longer (FIG. 3C). Transcriptome analysis using RNA sequencing identified 291 genes with significantly higher expression levels, and 330 genes with significantly lower expression levels, in day 3 differentiated hESCs vs. undifferentiated hESCs (data not shown but can be available upon request). In addition to CDX2, expression of other trophectoderm-associated markers such as HAND1, GATA3, and TFAP2A was upregulated in differentiated hESCs at day 3, whereas expression of pluripotency-associated NANOG was downregulated. Gene set enrichment analysis of differentially expressed genes identified 567 and 202 gene ontology (GO) categories (out of 9996 queried categories) associated with higher and lower gene expression in day 3 differentiated cells vs. undifferentiated hESCs, respectively (data not shown but can be available upon request). Consistent with differentiation to epithelial trophoblast, genes associated with the GO terms for epithelium development, epithelial cell proliferation, and epithelial cell differentiation were upregulated in day 3 differentiated hESCs. Additionally, genes associated with Wnt signaling were upregulated in day 3 differentiated hESCs, among other enriched GO categories.

CDX2$^+$ cells at day 3 were passaged into a chemically defined medium containing four major components (denoted TM4)—the S1PR3 agonist CYM5541, the GSK30 inhibitor CHIR99021, the TGFβ inhibitor A83-01, and FGF10. CHIR99021 and A83-01 are components of TSCM used for culture of primary TS cells; FGF10 was included because FGFR2b signaling is active in blastocyst- and placenta-derived TS cells and the early placenta. Cells in TM4 could be maintained as epithelial colonies for 30$^+$ passages over the course of 5 months. In TM4 medium, cells derived from H9 and H1 hESCs retained expression of the trophoblast markers CDX2, TFAP2C, YAP, TEAD4, and GATA3 (FIG. 3D; FIG. 10). Additionally, cells expressed the pan-trophoblast marker KRT7, and low levels of P63. Notably, CDX2 expression has been strongly associated with the trophectoderm and is lost once placental villi are formed (Blakeley et al., 2015; Hemberger et al., 2010; Horii et al., 2016; Knofler et al., 2019). To indicate that these cells are derived from hPSCs, and to distinguish these cells from TS cells that do not express CDX2, these cells are denoted as hPSC-TS$^{CDX2}$ cells.

The differentiation potential of hPSC-TS$^{CDX2}$ cells was further evaluated using same protocols as those used by Okae et al. (2018) for differentiation of primary TS cells to EVTs and STB (Okae et al., 2018). Cells were able to form multinucleate STB that expressed hCG and KRT7 (FIG. 3E). Surprisingly, however, upon EVT treatment, cells did not form mesenchymal elongated cells but acquired a flattened morphology. Upon passage, cells showed no HLA-G and minimal VE-Cadherin expression (FIG. 3F). Further, cells maintained an epithelial flattened morphology with KRT7 expression, but sparse hCG expression. It is notable that the trophectoderm forms the CTB and STB upon implantation and not EVTs; this is similar to the behavior of hPSC-TS$^{CDX2}$ cells (vide infra).

Example 4

Figures 11A, 11B, 11C, 11D, 11E:
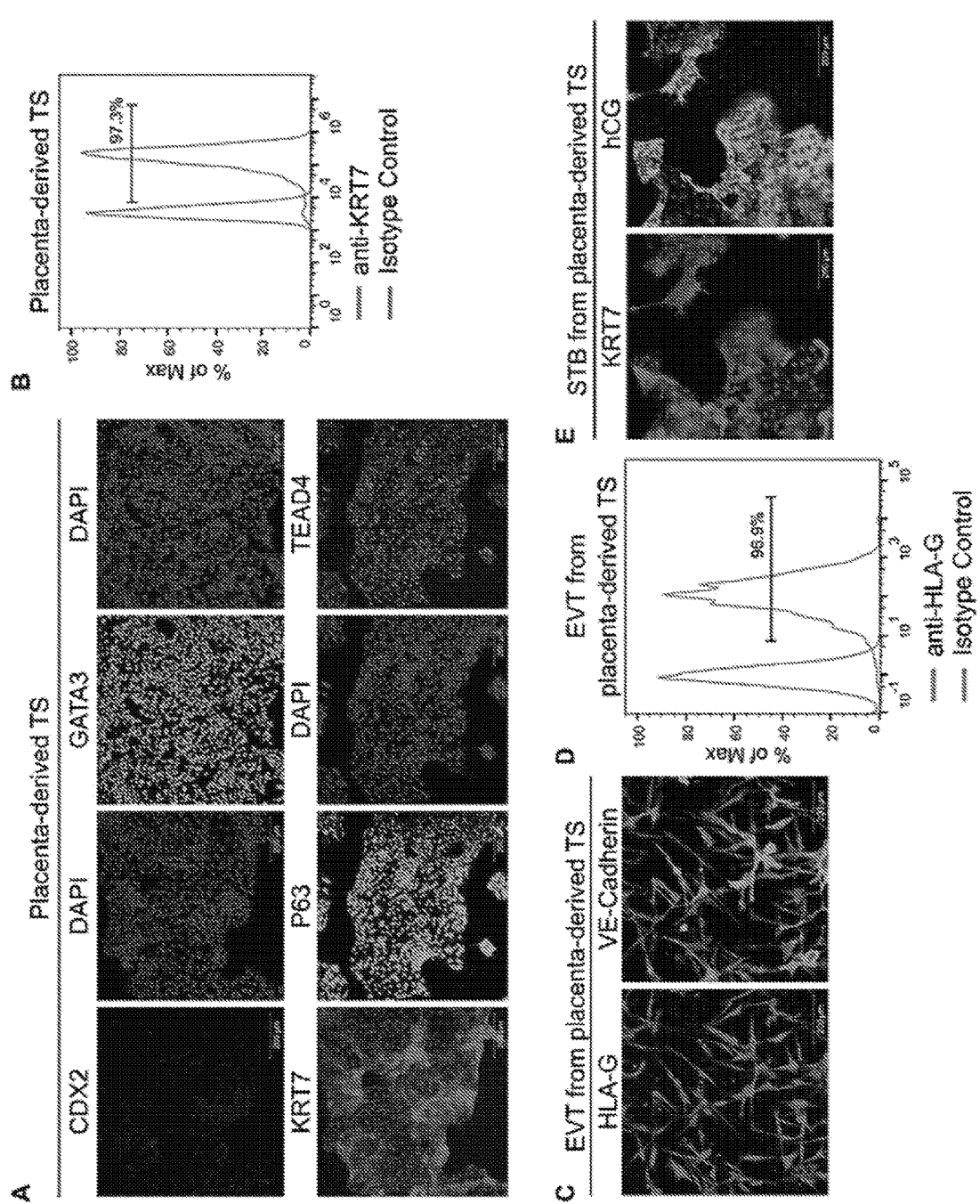

CDX2$^-$/P63$^+$ TS cells derived from hESCs can be maintained in medium used for primary TS cells. The question of whether hPSC-TS$^{CDX2}$ cells could be maintained in TSCM used for culturing primary TS cells was evaluated (FIG. 3A). When hPSC-TS$^{CDX2}$ cells cultured in TM4 for 5$^+$ passages were directly passaged into TSCM, cells underwent a change in colony morphology over ~3 passages; however, very little differentiation was observed. Notably, cell morphology of the hESC-derived cells closely resembled that of placenta-derived TS cells in TSCM that was used as a control (FIG. 11). Surprisingly, hPSC-TS$^{CDX2}$ cells lost expression of CDX2 and gained higher expression of P63 in TSCM. As discussed earlier, cells could be maintained as epithelial colonies when hESCs after 3 days of differentiation were passaged into TM4. In contrast, passaging day-3 differentiated hESCs into TSCM resulted in extensive differentiation, although a few epithelial colonies could be observed. Further passaging resulted in similar morphological changes in the epithelial colonies as those observed for hPSC-TS$^{CDX2}$ cells transitioning to TSCM. After ~6 passages, only epithelial colonies remained, and they closely resembled both the hPSC-TS$^{CDX2}$ cells transitioned into TSCM and placenta-derived TS cells. H9 and H1 hPSC-TS$^{CDX2}$ cells—passaged directly into TSCM after 3 days of differentiation or transitioned from TM4 (FIG. 3A)—showed high expression of YAP, TEAD4, TFAP2C, and GATA3, similar to cells in TM4, but no expression of CDX2 (FIG. 4A; FIG. 12A). Further, they expressed the pan-CTB marker KRT7 (FIGS. 4A-4B; FIGS. 12A-12B). The hESC-derived cells cultured in TSCM exhibit similar expression profile of trophoblast markers as placenta-derived TS cells (FIGS. 11A-11B). Therefore, these cells are denoted as hPSC-TS cells to indicate that they are derived from hPSCs.

Figures 4A, 4B, 4C, 4D, 4E, 4F, 4G:
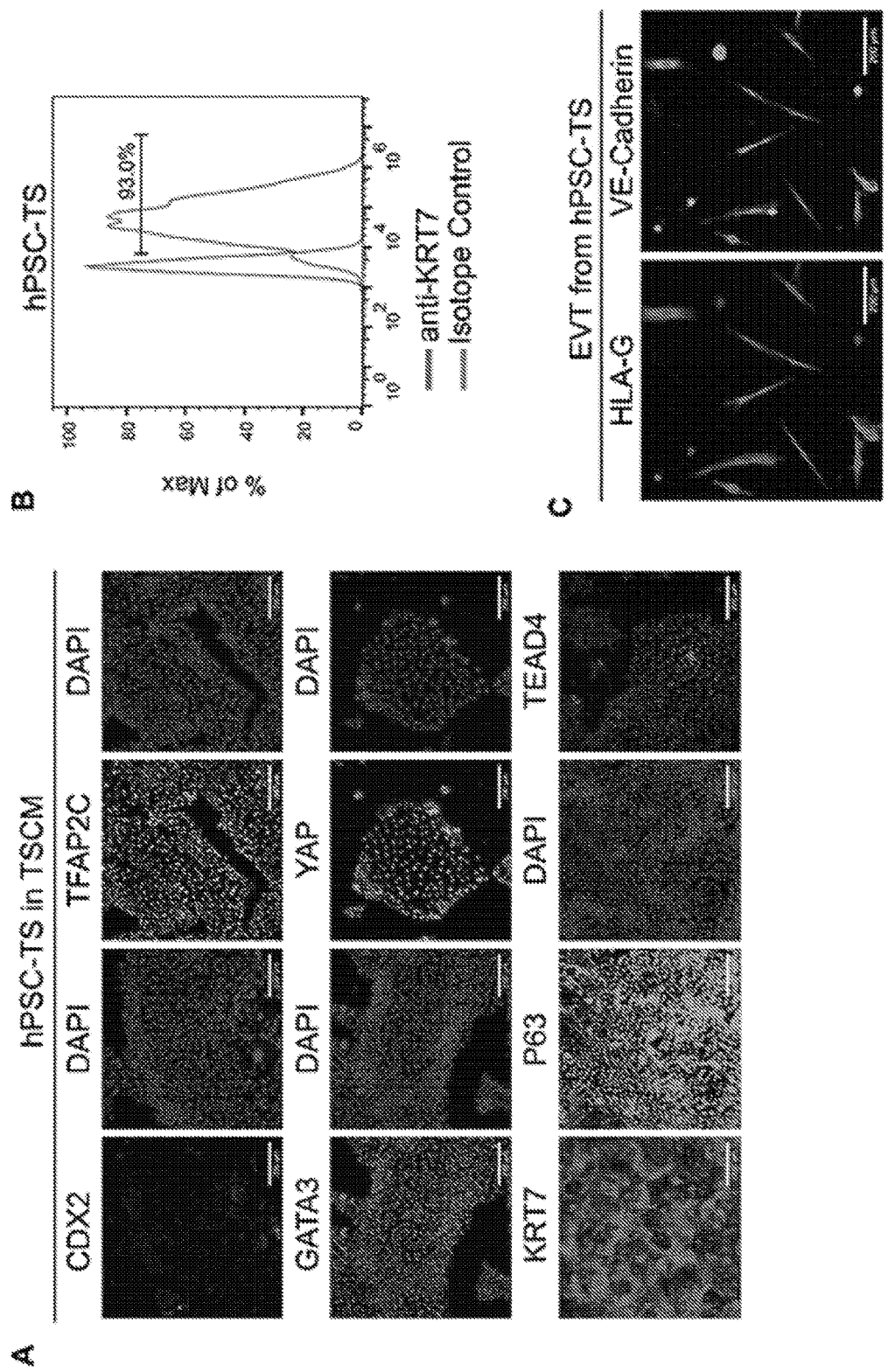
FIGS. 4A-4G: Formation of hPSC-TS cells. (A) Confocal images of H9 hPSC-TS in TSCM, staining for CDX2, TFAP2C, GATA3, YAP, TEAD4, and P63. Nuclei were stained with DAPI. Scale bars are 200 μm. (B) Flow cytometry histogram of KRT7 expression of H9 hPSC-TS cells in TSCM compared to an isotype control. (C) Confocal images of EVTs from H9 hPSC-TS cells, staining for HLA-G and VE-Cadherin. Nuclei were stained with DAPI. Scale bars are 200 μm. (D) Flow cytometry histogram of HLA-G expression of EVTs from H9 hPSC-TS cells compared to an isotype control. (E) Gene expression of CGβ, SDC1, CSH1/2, HLA-G, MMP2, TEAD4, and TP63 of EVTs from H9 hPSC-TS- and placenta-derived TS (CT30 and CT29, respectively) cells. Four biological replicates were used. Error bars, S.E., *$p<0.05$ from TS cells. (F) Confocal images of STB from H9 hPSC-TS, staining for hCG and KRT7. Nuclei were stained with DAPI. Scale bars are 100 μm. (G) Gene expression of CGβ, SDC1, CSH1/2, HLA-G, MMP2, TEAD4, and TP63 of STB from H9 hPSC-TS and placenta-derived TS (CT30 and CT29, respectively) cells. Four biological replicates were used. Error bars, S.E., *$p<0.05$ from TS cells.

The differentiation potential of hPSC-TS cells was further evaluated using the same protocols as those used by Okae et al. (2018) for differentiation of primary TS cells to EVTs and STB (Okae et al., 2018). Similar to placenta-derived TS cell controls (FIGS. 11C-11E), hPSC-TS cells could be differentiated into mesenchymal EVTs expressing HLA-G and VE-Cadherin (FIGS. 4C-4D; FIGS. 12C-12D), and multinucleate STB expressing hCG and KRT7 (FIG. 4F; FIG. 12E). Additionally, expression profile of transcripts corresponding to CTB, STB, and EVT markers upon differentiation of hPSC-TS cells was similar to those seen in case of placenta-derived TS cell controls (FIGS. 4E-4G). Further, hPSC-TS cells retained their ability to differentiate into STB- and EVTs after 30 passages in TSCM.

Taken together along with differences in culture conditions for maintenance, differentiation behavior, and expression of the trophectoderm marker CDX2, these results suggest that hPSC-TS$^{CDX2}$ and hPSC-TS cells represent two distinct stem cell populations, with hPSC-TS$^{CDX2}$ being a more primitive cell type.

Example 5

Figures 5A, 5B, 5C, 5D:
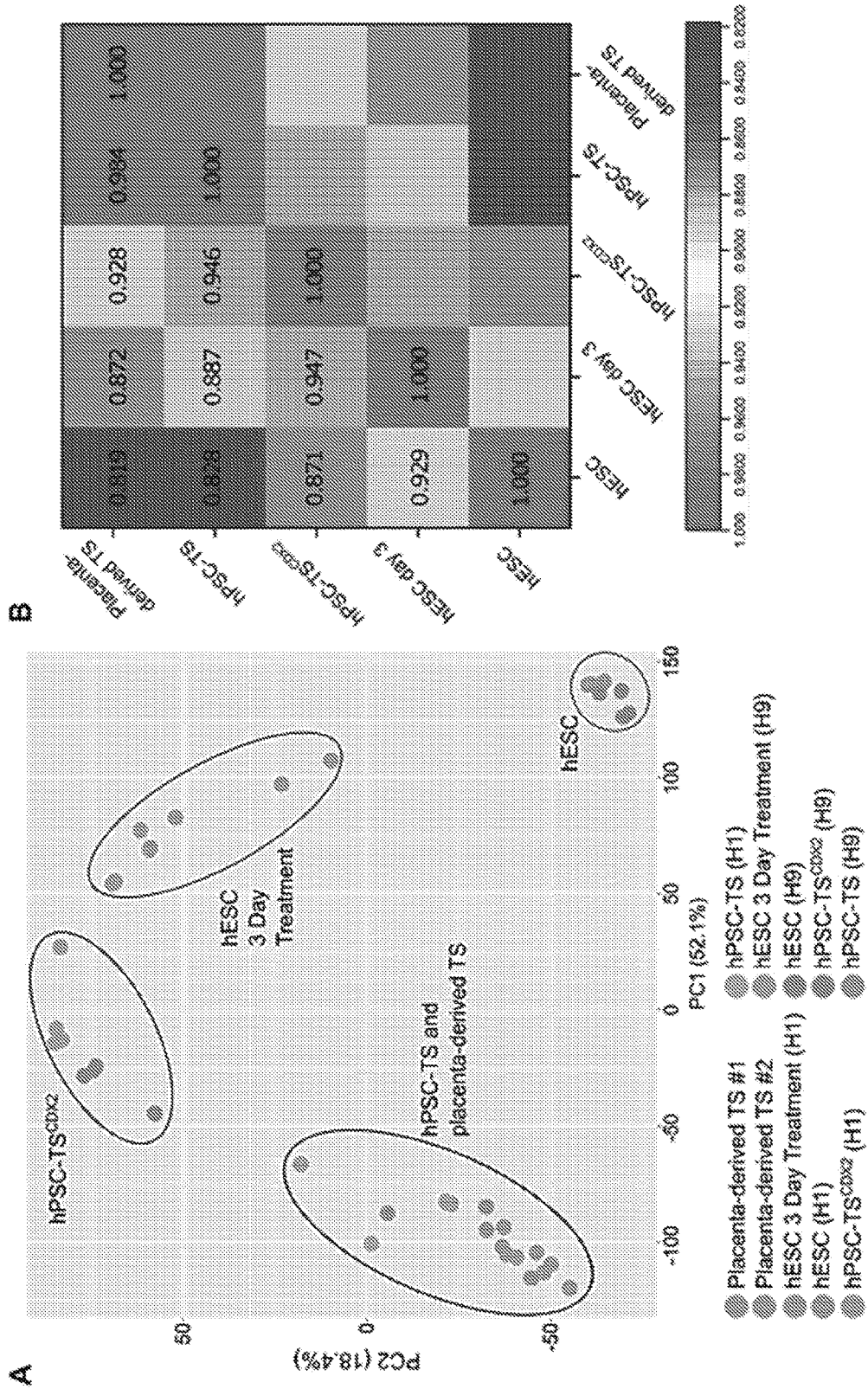
FIGS. 5A-5D: Transcriptome analysis confirms equivalence of hESC-derived and primary TS cells and reveal differences between hPSC-TS and hPSC-TS$^{CDX2}$. (A) Principal component analysis (PCA) of transcriptome data on H1 and H9 hESCs, H1 and H9 hESCs after 3-day treatment, H1 and H9 hESC-derived hPSC-TS$^{CDX2}$ cultured in TM4, H1 and H9 hESC-derived hPSC-TS and placenta-derived TS (CT30 and CT29, respectively) cultured in TSCM. (B)
Figures 5A, 5B, 5C, 5D:
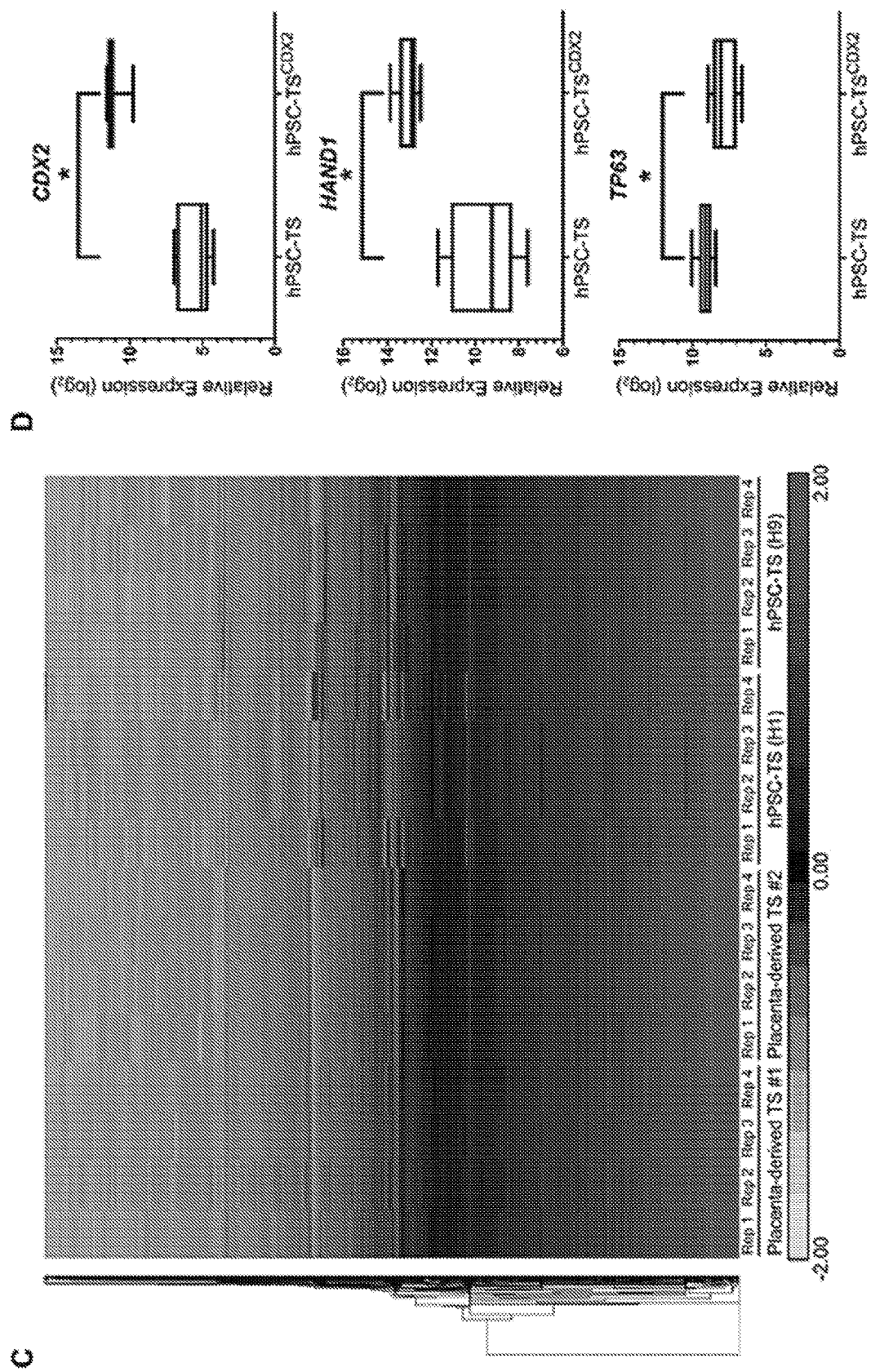

Transcriptome analysis confirms high similarity between hPSC-TS cells and placenta-derived TS cells and reveals differences between hPSC-TS$^{CDX2}$ and hPSC-TS cells. Genome wide transcriptome analysis was performed on hPSC-TS$^{CDX2}$, hPSC-TS and placenta-derived TS (control) cells using RNA sequencing. Note that since hPSC-TS and placenta-derived TS cells are cultured under identical conditions, the analysis represents a direct comparison between transcriptome profiles across these two cell types. Principal component analysis (PCA) of transcriptomic signatures showed that hESC-derived and primary TS cells cluster together, indicating similarities in overall gene expression (FIG. 5A). A Spearman Rank correlation test correlating average expression levels per gene between hPSC-TS and placenta-derived TS cells (FIG. 5B), and hierarchical clustering analysis (FIG. 5C), showed very high transcriptome similarity between hPSC-TS and placenta-derived TS cells. Thus, in conjunction with similarities in marker expression and culture conditions for maintenance and differentiation, these results confirm that hPSC-TS are analogous to placenta-derived TS cells.

PCA also showed that hPSC-TS$^{CDX2}$ cells are a distinct cell type that cluster differently from hPSC-TS cells and hESCs differentiated to the trophoblast lineage for 3 days (FIG. 5A). Higher expression of the trophectoderm-associated markers CDX2 and HAND1 is observed in hPSC-TS$^{CDX2}$ cells relative to hPSC-TS cells that are analogous to placenta-derived TS cells. On the other hand, expression of TP63—associated with villous CTB—is higher in hPSC-TS relative to hPSC-TS$^{CDX2}$ (FIG. 5D). Statistical analysis of gene expression profiles identified genes that were significantly differentially expressed between hPSC-TS$^{CDX2}$ and hPSC-TS. Specifically, 269 genes showed significantly higher expression levels, and 275 genes showed significantly lower expression levels in hPSC-TS$^{CDX2}$ vs. hPSC-TS cells (data not shown but can be available upon request). Gene set enrichment analysis of these genes identified 300 and 47 gene ontology (GO) categories (out of 9996 queried categories) associated with genes showing higher and lower expression in hPSC-TS$^{CDX2}$ vs. hPSC-TS, respectively (data not shown but can be available upon request). Interestingly, consistent with differences in colony morphology between hPSC-TS$^{CDX2}$ and hPSC-TS cells, genes associated with extracellular matrix, biological adhesion, and cell-cell adhesion were upregulated in hPSC-TS$^{CDX2}$ cells. Taken together along with distinct medium requirements for maintenance in cell culture, and differences in EVT differentiation under identical assay conditions, these results show that hPSC-TS and hPSC-TS$^{CDX2}$ represent distinct stem cell populations.

Additionally, the transcriptome profiles of hPSC-TS$^{CDX2}$, hPSC-TS, and placenta-derived TS cells were compared with the transcriptome of trophectoderm cells from human embryos. The Spearman Rank correlation test was used to correlate gene expression levels between primary trophectoderm cells and hPSC-TS$^{CDX2}$, hPSC-TS, or placenta-derived TS cells (data not shown but can be available upon request). The correlation R values were similar for all three TS cell types, and lower than those generating when comparing between hPSC-TS cells and placenta-derived TS cells or hPSC-TS$^{CDX2}$ and hPSC-TS cells. The lower correlation R values are likely due to the differences between cells in culture and primary human embryos and experimental protocols for transcriptome analysis; trophectoderm cells from human embryos were analyzed using single cell RNA sequencing, as opposed to bulk RNA sequencing in the present disclosure.

Figures 6A, 6B, 6C, 6D, 6E, 6F, 6G, 6H:
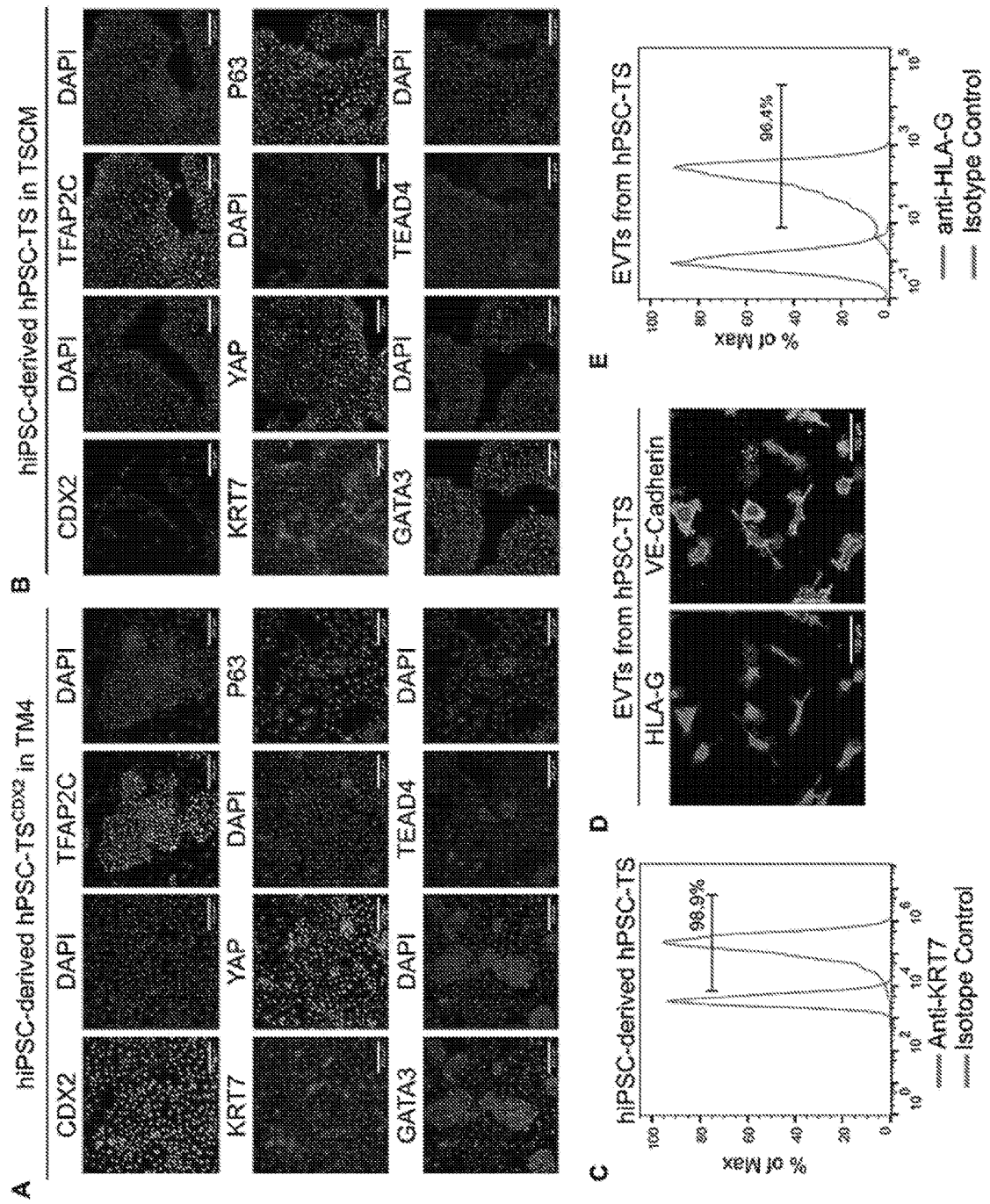
Figures 6A, 6B, 6C, 6D, 6E, 6F, 6G, 6H:
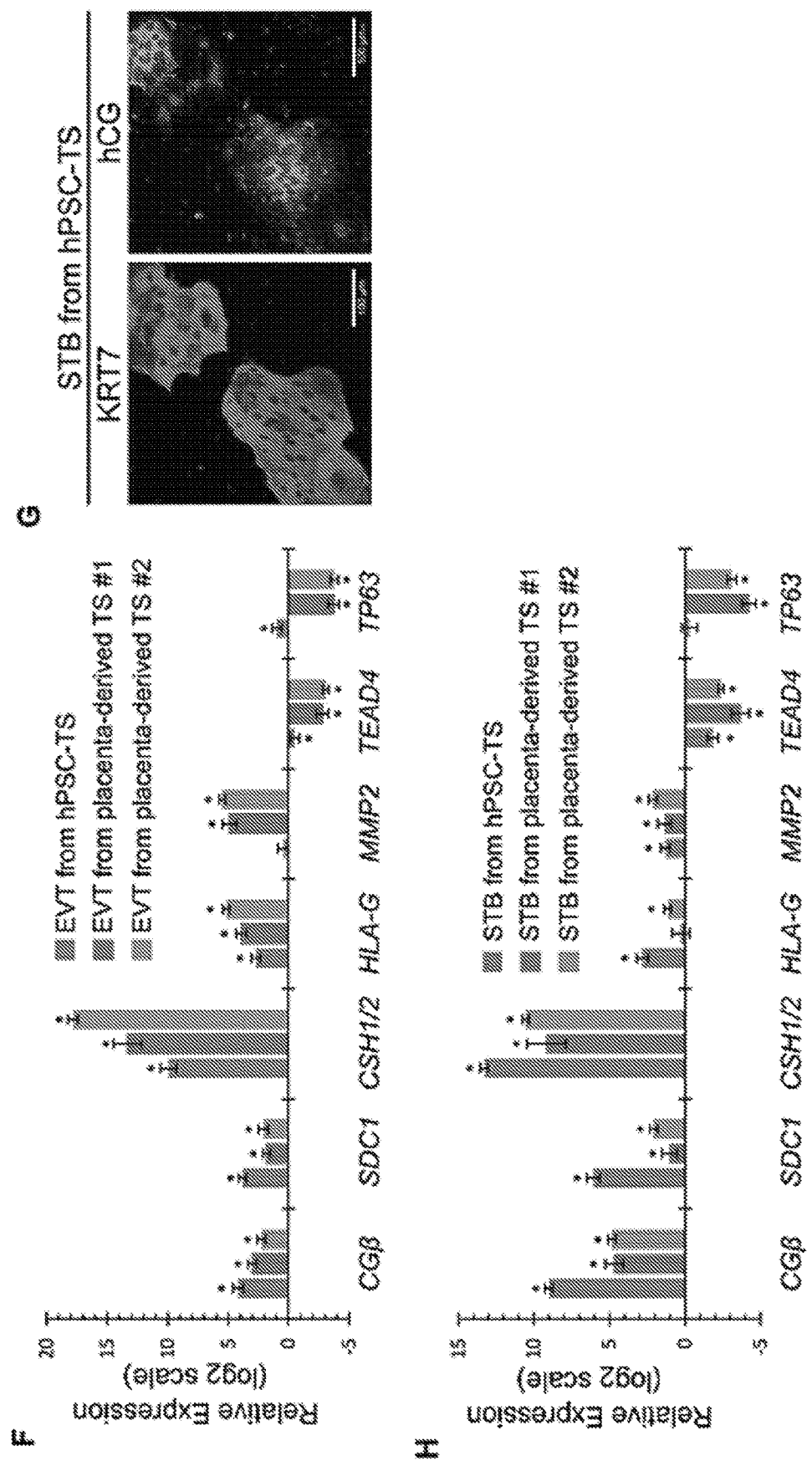

Example 6 hPSC-TS$^{CDX2}$ and hPSC-TS cells can be generated from hiPSCs. Experiments were also conducted to test whether the results obtained on derivation of hPSC-TS$^{CDX2}$ and hPSC-TS cells from hESCs could be extended to hiPSCs. Accordingly, previously described protocols were used (FIG. 3A) to derive hPSC-TS$^{CDX2}$ and hPSC-TS cells from the hiPSC line SBli006-A. hPSC-TS$^{CDX2}$ cells derived from SBli006-A hiPSCs maintained expression of CDX2, TFAP2C, GATA3, YAP KRT7, and TEAD4, along with low expression level of P63 in TM4 medium (FIG. 6A). Similarly, hPSC-TS cells derived from SBli006-A hiPSCs expressed KRT7, P63, TEAD4, TFAP2C, YAP, and GATA3 in TSCM (FIGS. 6B-6C). hPSC-TS cells lost expression of CDX2 but gained higher expression levels of P63 and KRT7 in TSCM. Differentiation of hPSC-TS cells derived from SBli006-A hiPSCs using protocols described by Okae et al. (2018), resulted in formation of mesenchymal EVTs with high expression of HLA-G and VE-Cadherin (FIGS. 6D-6E), and multinucleate STB expressing hCG and KRT7 (FIG. 6G). Expression profile of transcripts corresponding to CTB, STB, and EVT markers upon differentiation of hiPSC-derived TS cells was also similar to those seen in case of placenta-derived TS cell controls (FIGS. 4E-4G). These results confirm that two distinct TS cell populations can also be derived from hiPSCs.

Example 7 hTSC$^{CDX2}$ and hTSC$^{P63}$ can be generated from human iPSCs. Lastly, whether the results on derivation of hTSCs from hESCs could be extended to human iPSCs was investigated. Accordingly, the previously described protocols were used to derive hTSC$^{CDX2}$ and hTSC$^{P63}$ the human iPSC line SBli006-A. hTSC$^{CDX2}$ derived from SBli006-A hiPSCs maintained expression of CDX2, TFAP2C, GATA3, YAP KRT7, and TEAD4, along with low expression level of P63 (FIG. 5A). Similarly, hTSC$^{P63}$ derived from SBli006-A iPSCs expressed KRT7, P63, TEAD4, TFAP2C, YAP, and GATA3 TSCM (FIG. 5B). Similar to the case with hESC-derived hTSC$^{P63}$, cells lost expression of CDX2 but gained higher expression levels of P63 and KRT7. Differentiation of hTSC$^{P63}$ derived from SBli006-A iPSCs using protocols described by Okae et al. (Okae et al., 2018), resulted in formation of mesenchymal EVTs with high expression of HLA-G and VE-Cadherin (FIG. 5C), and multinucleate STB expressing hCG and KRT7 (FIG. 5D). These results show that two distinct hTSCs can also be derived from human iPSCs.

Example 8

Cells in TM4 medium express markers consistent with a putative trophectoderm stem cell. Previous studies have proposed that putative trophectodermal stem cells are characterized by expression of the markers CDX2, HAND1, and TEAD4. Immunofluorescence and RNA-seq analysis confirms expression of CDX2 and HAND1 in hTSC$^{CDX2}$ (cultured in TM4) but not in hTSC$^{P63}$ (FIGS. 12A-12C). Note that expression of P63, a marker of villous cytotrophoblast, is higher in TSCM.

Example 9

Spherical structures representative of the trophectoderm in the blastocyst-stage embryo can be obtained from TM4 cells but not cells in TSCM. Spherical structures—termed trophectoderm spheres—that correspond to empty blastocyst shells can be obtained using the protocol in the Materials and Methods. In the protocol used, 50-100 cells are cultured in suspension, in E6™ medium supplemented with A83-01 (2-8 µM), FGF10 (0-25 ng/ml), Y-27632 (5 µM), and 2% MATRIGEL. Note that, this medium is similar to TM4 but has key differences, namely, the GSK3-beta inhibitor CHIR99021 is absent. The ROCK inhibitor Y-27632 is included. MATRIGEL was included in the medium. The extracellular matrix components in MATRIGEL (e.g., laminin, collagen) are likely involved in formation of the trophectoderm spheres. MATRIGEL also contains growth factors (e.g., EGF and TGFβ). The addition of the TGFβ inhibitor A83-01 may also be involved (e.g., to counterbalance the effect of MATRIGEL addition). These spherical structures were not formed using cells cultured in TSCM, which further confirms differences between cells cultured in TSCM vs. TM4. Thus, the ability of cells cultured TM4 medium to form trophectoderm underscores their physiological relevance to in vivo settings and provides a useful model of implantation.

Example 10

Transcriptome analysis confirms equivalence of hESC-derived and primary hTSCs and reveal differences between hTSC$^{CDX2}$ and hTSC$^{P63}$. Genome wide transcriptome analysis was conducted on hTSC$^{CDX2}$ and hESC-derived and primary hTSCs (hTSC$^{P63}$) using RNA sequencing. Principal component analysis (PCA) of transcriptome data showed that hESC-derived and primary hTSC$^{P63}$ cluster together, indicating similarities in overall gene expression (FIGS. 5A-5B). Hierarchical clustering analysis further confirmed the very high transcriptome similarity between hESC-derived and primary hTSC$^{P63}$ (FIG. 5C). In conjunction with similarities in marker expression and culture conditions for maintenance and differentiation, these results establish the equivalence of hESC-derived and primary hTSCs.

PCA also showed that hTSC$^{CDX2}$ are a distinct population of cells that cluster differently from hTSC$^{P63}$ and hESCs differentiated to the trophoblast lineage for 3 days. Higher expression of the trophectoderm-associated markers CDX2 and HAND1 is observed in hTESCs relative to hTSCs. On the other hand, expression of TP63, which is associated with villous CTB, is higher in hTSCs relative to hTESCs (FIGS. 5A-5D). Statistical analysis of gene expression profiles identified genes that were significantly differentially expressed between hTSC$^{CDX2}$ and hTSC$^{P63}$. Specifically, 269 genes showed significantly higher expression levels, and 275 genes showed significantly lower expression levels in hTSC$^{CDX2}$ vs hTSC$^{P63}$ (data not shown but can be provided upon request). Gene set enrichment analysis of these genes identified 300 and 47 gene ontology (GO) categories (out of 9996 queried categories) associated with genes showing higher and lower expression in hTSC$^{CDX2}$ vs hTSC$^{P63}$ respectively (data not shown but can be provided upon request). Consistent with differences in colony morphology between hTSC$^{CDX2}$ and hTSC$^{P63}$, genes associated with the GO categories extracellular matrix, biological adhesion, and cell-cell adhesion were upregulated in hTESCs.

Taken together, along with distinct medium requirements for maintenance in cell culture, and differences in EVT differentiation under identical assay conditions, these results demonstrate that hTSC$^{CDX2}$ and hTSC$^{P63}$ represent distinct stem cell populations.

Example 11

Generation of trophectospheres from hiPSCs. Treatment of hiPSCs for 3 days with BMP4, S1PR3 agonist and the activin/nodal inhibitor SB431532 in chemically defined medium, resulted in formation of CDX2$^+$ cells (denoted here as day 3 cells). Subsequently, day 3 cells are cultured in TM4 medium to obtain CDX2T putative hTESCs. Further culture of hTESCs under conditions described by Okae et al., results in formation of CDX2$^-$/p63$^+$ hTSCs.

In the present disclosure, data demonstrates that culture of day 3 cells or hTESCs at very low initial seeding density (e.g., 1-5 cells per well in Aggrewell™ plates) in TM4 medium in the presence of soluble extracellular matrix protein (MATRIGEL), results in the formation of empty blastocyst like structures termed trophectospheres (FIG. 13A). Surprisingly, trophectospheres are not obtained from CDX2$^-$/p63$^+$ hTSCs under identical conditions; rather, a clump of cells is obtained (FIG. 13A). Trophectospheres can be efficiently and reproducibly generated using Aggrewell™ plates and express trophectoderm-associated markers such as CDX2 and GATA3 (FIG. 13B).

Figures 4A, 4B, 4C, 4D, 4E, 4F, 4G:
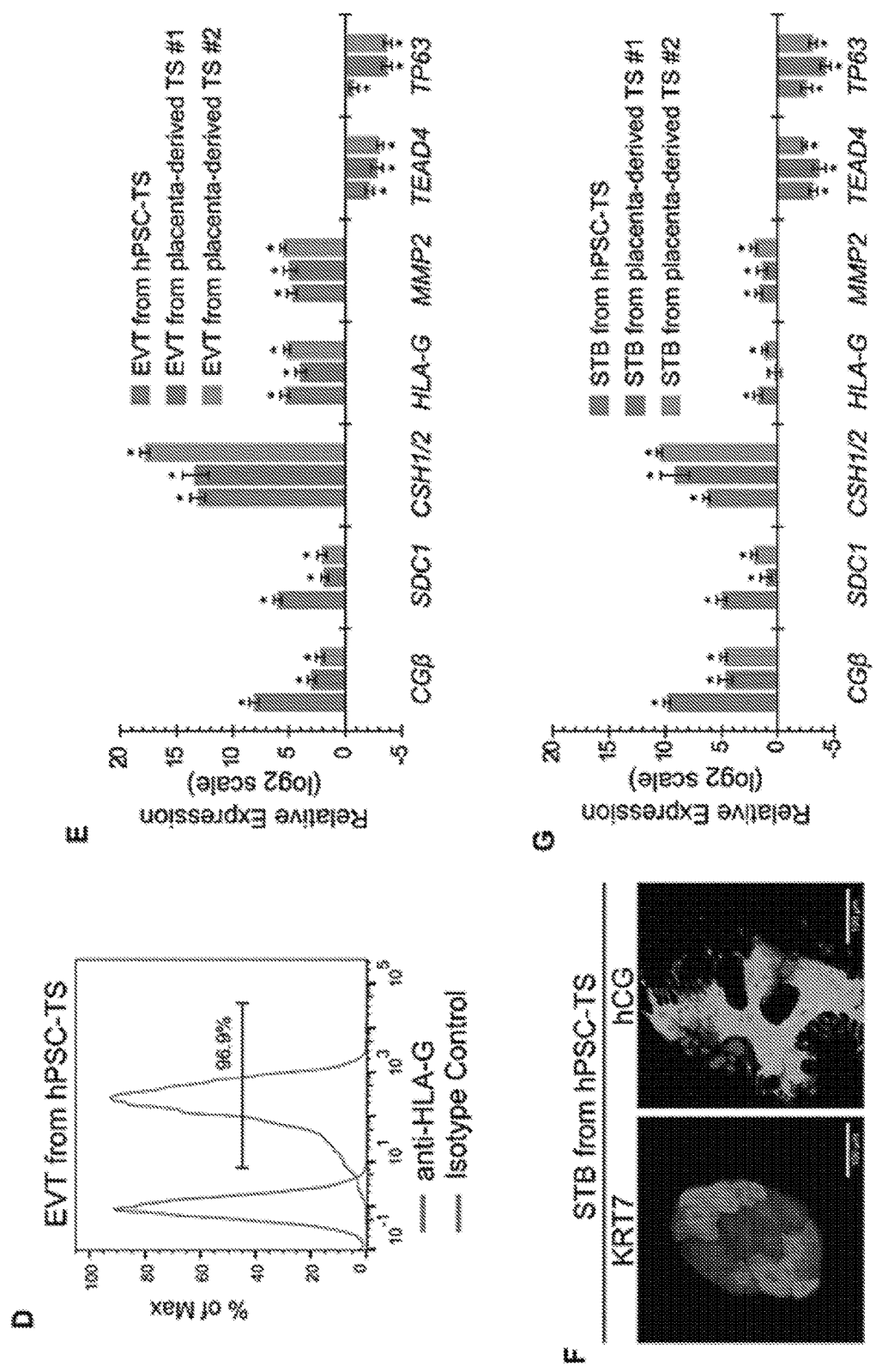

Experiments were conducted to determine whether trophectospheres can attach to a cell-free surface on tissue culture plates. As shown in FIG. 14, data demonstrated attachment of trophectospheres to tissue culture plates. Under these conditions, formation of multinucleate cells expressing the syncytiotrophoblast marker SDC1 were observed (FIG. 14), consistent with the observation that human embryos form syncytial cells upon attachment to cell-free surfaces. Mononuclear cells that stain positive for HLA-G and Notch1 were also observed, consistent with a migratory trophoblast phenotype observed upon culture of human embryos (FIG. 4).

Experiments were also conducted to determine whether trophectospheres attach to confluent Ishikawa cells. Trophectospheres were co-cultured with a confluent monolayer of Ishikawa cells using medium for culture of Ishikawa cells. Under these conditions, data indicated attachment of trophectospheres using staining for the pan-trophoblast marker KRT7 (FIG. 15). Strikingly, the trophectospheres "push aside" or disperse the Ishikawa cells as they attach, reminiscent of invasion of the endometrial epithelium (FIG. 15; white arrows).

Additionally, results indicated that the sphere structures can be made from both the day 3 cells (e.g., hiPSCs treated as described) and before establishment of the CDX2+ stem cell line cultured in TM4. Furthermore, the concentration of glucose in TM4 medium for CDX2+ stem cell culture affects sphere formation. For example, as shown in FIG. 16, under certain experimental conditions, trophectosphere formation in low glucose medium (about 5 mM glucose in TM4 medium) is more efficient. In some cases, results indicated that use of a GSK3 beta inhibitor (e.g., CHIR99021) can be omitted in low glucose medium.

5. SEQUENCES

Sequences referenced in accordance with the various embodiments of the present disclosure are provided below, as well as in a contemporaneously filed sequence listing.

TABLE 2

| Gene | Primer | Sequence | SEQ ID NO: |
|---|---|---|---|
| CDX2 | Forward | GGC AGC CAA GTG AAA ACC AG | 1 |
| CDX2 | Reverse | GGT GAT GTA GCG ACT GTA GTG AA | 2 |
| CGB | Forward | CAG CAT CCT ATC ACC TCC TGG T | 3 |
| CGB | Reverse | CTG GAA CAT CTC CAT CCT TGG T | 4 |
| CSH1/2 | Forward | CAT GAC TCC CAG ACC TCC TTC T | 5 |
| CSH1/2 | Reverse | ATT TCT GTT GCG TTT CCT CCA T | 6 |
| ELF5 | Forward | GCT GCG ACC AGT ACA AGT TG | 7 |
| ELF5 | Reverse | CTG CCT CGA CGA ACT CCT C | 8 |
| GAPDH | Forward | CTC CAC GAC GTA CTC AGC G | 9 |
| GAPDH | Reverse | TGT TGC CAT CAA TGA CCC CTT | 10 |
| HLA-G | Forward | CCA CCA CCC TGT CTT TGA CTA T | 11 |
| HLA-G | Reverse | ACG TCC TGG GTC TGG TCC T | 12 |
| KDR | Forward | GGC CCA ATA ATC AGA GTG GCA | 13 |
| KDR | Reverse | CCA GTG TCA TTT CCG ATC ACT TT | 14 |
| LMO2 | Forward | GGC CAT CGA AAG GAA GAG CC | 15 |
| LMO2 | Reverse | GGC CCA GTT TGT AGT AGA GGC | 16 |
| MMP2 | Forward | TGG CAC CCA TTT ACA CCT ACA C | 17 |
| MMP2 | Reverse | ATG TCA GGA GAG GCC CCA TAG A | 18 |
| MSI1 | Forward | TAA AGT GCT GGC GCA ATC G | 19 |
| MSI1 | Reverse | TCT TCT TCG TTC GAG TCA CCA | 20 |
| NES | Forward | CTG CTA CCC TTG AGA CAC CTG | 21 |
| NES | Reverse | GGG CTC TGA TCT CTG CAT CTA C | 22 |
| OLIG3 | Forward | AGC CGT CTC AAC TCG GTC T | 23 |
| OLIG3 | Reverse | CAT GGC TAG GTT CAG GTC GTG | 24 |
| SDC1 | Forward | CTA TTC CCA CGT CTC CAG AAC C | 25 |
| SDC1 | Reverse | GGA CTA CAG CCT CTC CCT CCT T | 26 |
| T | Forward | CTG GGT ACT CCC AAT GGG G | 27 |
| T | Reverse | GGT TGG AGA ATT GTT CCG ATG A | 28 |
| TBX4 | Forward | TGT TCC CCA GCT ACA AGG TAA | 29 |
| TBX4 | Reverse | GCA GGG ACA ATG TCA ATC AGC | 30 |
| TEAD4 | Forward | CAG GTG GTG GAG AAA GTT GAG A | 31 |
| TEAD4 | Reverse | GTG CTT GAG CTT GTG GAT GAA G | 32 |
| TP63 | Forward | AGA AAC GAA GAT CCC CAG ATG A | 33 |
| TP63 | Reverse | CTG TTG CTG TTG CCT GTA CGT T | 34 |

What is claimed is:

1. A method for inducing differentiation of human embryonic stem cells (hESCs) into cytotrophoblasts (CTBs) or CTB-like cells, the method comprising:
   culturing the hESCs in a chemically defined cell culture medium comprising a sphingosine 1-phosphate receptor (S1PR) agonist, an activin/nodal inhibitor, and at least one growth factor; and
   assessing the hESCs for one or more phenotypic characteristics of CTBs or CTB-like cells.

2. The method of claim 1, wherein the S1PR agonist is an agonist of S1PR1, S1PR2, or S1PR3.

3. The method of claim 1, wherein the S1PR agonist is an agonist of S1PR3.

4. The method of claim 1, wherein the S1PR agonist is selected from the group consisting of CYM5442, CYM5541, CYM55220, A971432, Ceralifimod, CS2100, CYM50260, CYM50308, FTY720, GSK2018682, RP001, SEW2871, TC-G1006, and TC-SP14.

5. The method of claim 1, wherein the activin/nodal inhibitor is SB431542 or A83-01.

6. The method of claim 1, wherein the at least one growth factor is bone morphogenic protein-4 (BMP4).

7. The method of claim 1, wherein the medium further comprises ascorbic acid at a concentration ranging from about 0.5 µg/ml to about 40 µg/ml.

8. The method of claim 1, wherein the medium further comprises glucose at a concentration of 20 mM or less.

9. The method of claim 1, wherein the CTBs or CTB-like cells exhibit altered expression of one or more of CDX2, TFAP2C, YAP, ELF5, TEAD4, KRT7, p63, GATA3, and HAND1.

10. The method of claim 1, wherein the CTBs or CTB-like cells are capable of forming a spherical structure.

* * * * *

SEQUENCE LISTING

<160> NUMBER OF SEQ ID NOS: 34

<210> SEQ ID NO 1
<211> LENGTH: 20
<212> TYPE: DNA
<213> ORGANISM: Artificial Sequence
<220> FEATURE:
<223> OTHER INFORMATION: Synthetic

<400> SEQUENCE: 1
ggcagccaag tgaaaaccag                                                   20

<210> SEQ ID NO 2
<211> LENGTH: 23
<212> TYPE: DNA
<213> ORGANISM: Artificial Sequence
<220> FEATURE:
<223> OTHER INFORMATION: Synthetic

<400> SEQUENCE: 2
ggtgatgtag cgactgtagt gaa                                               23

<210> SEQ ID NO 3
<211> LENGTH: 22
<212> TYPE: DNA
<213> ORGANISM: Artificial Sequence
<220> FEATURE:
<223> OTHER INFORMATION: Synthetic

```
<400> SEQUENCE: 3
cagcatccta tcacctcctg gt                                          22

<210> SEQ ID NO 4
<211> LENGTH: 22
<212> TYPE: DNA
<213> ORGANISM: Artificial Sequence
<220> FEATURE:
<223> OTHER INFORMATION: Synthetic

<400> SEQUENCE: 4
ctggaacatc tccatccttg gt                                          22

<210> SEQ ID NO 5
<211> LENGTH: 22
<212> TYPE: DNA
<213> ORGANISM: Artificial Sequence
<220> FEATURE:
<223> OTHER INFORMATION: Synthetic

<400> SEQUENCE: 5
catgactccc agacctcctt ct                                          22

<210> SEQ ID NO 6
<211> LENGTH: 22
<212> TYPE: DNA
<213> ORGANISM: Artificial Sequence
<220> FEATURE:
<223> OTHER INFORMATION: Synthetic

<400> SEQUENCE: 6
atttctgttg cgtttcctcc at                                          22

<210> SEQ ID NO 7
<211> LENGTH: 20
<212> TYPE: DNA
<213> ORGANISM: Artificial Sequence
<220> FEATURE:
<223> OTHER INFORMATION: Synthetic

<400> SEQUENCE: 7
gctgcgacca gtacaagttg                                             20

<210> SEQ ID NO 8
<211> LENGTH: 19
<212> TYPE: DNA
<213> ORGANISM: Artificial Sequence
<220> FEATURE:
<223> OTHER INFORMATION: Synthetic

<400> SEQUENCE: 8
ctgcctcgac gaactcctc                                              19

<210> SEQ ID NO 9
<211> LENGTH: 19
<212> TYPE: DNA
<213> ORGANISM: Artificial Sequence
<220> FEATURE:
<223> OTHER INFORMATION: Synthetic

<400> SEQUENCE: 9
ctccacgacg tactcagcg                                              19

<210> SEQ ID NO 10
<211> LENGTH: 21
```

```
<212> TYPE: DNA
<213> ORGANISM: Artificial Sequence
<220> FEATURE:
<223> OTHER INFORMATION: Synthetic

<400> SEQUENCE: 10
tgttgccatc aatgacccct t                                            21

<210> SEQ ID NO 11
<211> LENGTH: 22
<212> TYPE: DNA
<213> ORGANISM: Artificial Sequence
<220> FEATURE:
<223> OTHER INFORMATION: Synthetic

<400> SEQUENCE: 11
ccaccaccct gtctttgact at                                           22

<210> SEQ ID NO 12
<211> LENGTH: 19
<212> TYPE: DNA
<213> ORGANISM: Artificial Sequence
<220> FEATURE:
<223> OTHER INFORMATION: Synthetic

<400> SEQUENCE: 12
acgtcctggg tctggtcct                                               19

<210> SEQ ID NO 13
<211> LENGTH: 21
<212> TYPE: DNA
<213> ORGANISM: Artificial Sequence
<220> FEATURE:
<223> OTHER INFORMATION: Synthetic

<400> SEQUENCE: 13
ggcccaataa tcagagtggc a                                            21

<210> SEQ ID NO 14
<211> LENGTH: 23
<212> TYPE: DNA
<213> ORGANISM: Artificial Sequence
<220> FEATURE:
<223> OTHER INFORMATION: Synthetic

<400> SEQUENCE: 14
ccagtgtcat ttccgatcac ttt                                          23

<210> SEQ ID NO 15
<211> LENGTH: 20
<212> TYPE: DNA
<213> ORGANISM: Artificial Sequence
<220> FEATURE:
<223> OTHER INFORMATION: Synthetic

<400> SEQUENCE: 15
ggccatcgaa aggaagagcc                                              20

<210> SEQ ID NO 16
<211> LENGTH: 21
<212> TYPE: DNA
<213> ORGANISM: Artificial Sequence
<220> FEATURE:
<223> OTHER INFORMATION: Synthetic

<400> SEQUENCE: 16
```

```
ggcccagttt gtagtagagg c                                              21
```

<210> SEQ ID NO 17
<211> LENGTH: 22
<212> TYPE: DNA
<213> ORGANISM: Artificial Sequence
<220> FEATURE:
<223> OTHER INFORMATION: Synthetic

<400> SEQUENCE: 17

```
tggcacccat ttacacctac ac                                             22
```

<210> SEQ ID NO 18
<211> LENGTH: 22
<212> TYPE: DNA
<213> ORGANISM: Artificial Sequence
<220> FEATURE:
<223> OTHER INFORMATION: Synthetic

<400> SEQUENCE: 18

```
atgtcaggag aggccccata ga                                             22
```

<210> SEQ ID NO 19
<211> LENGTH: 19
<212> TYPE: DNA
<213> ORGANISM: Artificial Sequence
<220> FEATURE:
<223> OTHER INFORMATION: Synthetic

<400> SEQUENCE: 19

```
taaagtgctg gcgcaatcg                                                 19
```

<210> SEQ ID NO 20
<211> LENGTH: 21
<212> TYPE: DNA
<213> ORGANISM: Artificial Sequence
<220> FEATURE:
<223> OTHER INFORMATION: Synthetic

<400> SEQUENCE: 20

```
tcttcttcgt tcgagtcacc a                                              21
```

<210> SEQ ID NO 21
<211> LENGTH: 21
<212> TYPE: DNA
<213> ORGANISM: Artificial Sequence
<220> FEATURE:
<223> OTHER INFORMATION: Synthetic

<400> SEQUENCE: 21

```
ctgctaccct tgagacacct g                                              21
```

<210> SEQ ID NO 22
<211> LENGTH: 22
<212> TYPE: DNA
<213> ORGANISM: Artificial Sequence
<220> FEATURE:
<223> OTHER INFORMATION: Synthetic

<400> SEQUENCE: 22

```
gggctctgat ctctgcatct ac                                             22
```

<210> SEQ ID NO 23
<211> LENGTH: 19
<212> TYPE: DNA
<213> ORGANISM: Artificial Sequence
<220> FEATURE:
<223> OTHER INFORMATION: Synthetic

<400> SEQUENCE: 23
agccgtctca actcggtct                    19

<210> SEQ ID NO 24
<211> LENGTH: 21
<212> TYPE: DNA
<213> ORGANISM: Artificial Sequence
<220> FEATURE:
<223> OTHER INFORMATION: Synthetic

<400> SEQUENCE: 24
catggctagg ttcaggtcgt g                 21

<210> SEQ ID NO 25
<211> LENGTH: 22
<212> TYPE: DNA
<213> ORGANISM: Artificial Sequence
<220> FEATURE:
<223> OTHER INFORMATION: Synthetic

<400> SEQUENCE: 25
ctattcccac gtctccagaa cc                22

<210> SEQ ID NO 26
<211> LENGTH: 22
<212> TYPE: DNA
<213> ORGANISM: Artificial Sequence
<220> FEATURE:
<223> OTHER INFORMATION: Synthetic

<400> SEQUENCE: 26
ggactacagc ctctccctcc tt                22

<210> SEQ ID NO 27
<211> LENGTH: 19
<212> TYPE: DNA
<213> ORGANISM: Artificial Sequence
<220> FEATURE:
<223> OTHER INFORMATION: Synthetic

<400> SEQUENCE: 27
ctgggtactc ccaatgggg                    19

<210> SEQ ID NO 28
<211> LENGTH: 22
<212> TYPE: DNA
<213> ORGANISM: Artificial Sequence
<220> FEATURE:
<223> OTHER INFORMATION: Synthetic

<400> SEQUENCE: 28
ggttggagaa ttgttccgat ga                22

<210> SEQ ID NO 29
<211> LENGTH: 21
<212> TYPE: DNA
<213> ORGANISM: Artificial Sequence
<220> FEATURE:
<223> OTHER INFORMATION: Synthetic

<400> SEQUENCE: 29
tgttccccag ctacaaggta a                 21

```
<210> SEQ ID NO 30
<211> LENGTH: 21
<212> TYPE: DNA
<213> ORGANISM: Artificial Sequence
<220> FEATURE:
<223> OTHER INFORMATION: Synthetic

<400> SEQUENCE: 30
gcagggacaa tgtcaatcag c                                                 21

<210> SEQ ID NO 31
<211> LENGTH: 22
<212> TYPE: DNA
<213> ORGANISM: Artificial Sequence
<220> FEATURE:
<223> OTHER INFORMATION: Synthetic

<400> SEQUENCE: 31
caggtggtgg agaaagttga ga                                                22

<210> SEQ ID NO 32
<211> LENGTH: 22
<212> TYPE: DNA
<213> ORGANISM: Artificial Sequence
<220> FEATURE:
<223> OTHER INFORMATION: Synthetic

<400> SEQUENCE: 32
gtgcttgagc ttgtggatga ag                                                22

<210> SEQ ID NO 33
<211> LENGTH: 22
<212> TYPE: DNA
<213> ORGANISM: Artificial Sequence
<220> FEATURE:
<223> OTHER INFORMATION: Synthetic

<400> SEQUENCE: 33
agaaacgaag atccccagat ga                                                22

<210> SEQ ID NO 34
<211> LENGTH: 22
<212> TYPE: DNA
<213> ORGANISM: Artificial Sequence
<220> FEATURE:
<223> OTHER INFORMATION: Synthetic

<400> SEQUENCE: 34
ctgttgctgt tgcctgtacg tt                                                22
```